(12) United States Patent
Zheng et al.

(10) Patent No.: US 9,529,791 B1
(45) Date of Patent: Dec. 27, 2016

(54) TEMPLATE AND CONTENT AWARE DOCUMENT AND TEMPLATE EDITING

(71) Applicant: Google Inc., Mountain View, CA (US)

(72) Inventors: Wentao Zheng, Jersey City, NJ (US); Micah Lemonik, Great Neck, NY (US)

(73) Assignee: GOOGLE INC., Mountain View, CA (US)

( * ) Notice: Subject to any disclaimer, the term of this patent is extended or adjusted under 35 U.S.C. 154(b) by 463 days.

(21) Appl. No.: 14/104,401

(22) Filed: Dec. 12, 2013

(51) Int. Cl.
  *G06F 17/22* (2006.01)
  *G06F 17/24* (2006.01)
  *G06F 17/30* (2006.01)

(52) U.S. Cl.
  CPC ......... *G06F 17/248* (2013.01); *G06F 17/2247* (2013.01); *G06F 17/30893* (2013.01)

(58) Field of Classification Search
  CPC ............... G06F 17/248; G06F 17/2247; G06F 17/30905; G06F 17/30896; G06F 17/3089; G06F 17/30893
  See application file for complete search history.

(56) References Cited

U.S. PATENT DOCUMENTS

| | | | |
|---|---|---|---|
| 5,280,367 A | 1/1994 | Zuniga | |
| 5,448,695 A | 9/1995 | Douglas et al. | |
| 5,493,692 A | 2/1996 | Theimer et al. | |
| 5,544,049 A | 8/1996 | Henderson et al. | |
| 5,600,778 A | 2/1997 | Swanson et al. | |
| 5,613,163 A | 3/1997 | Marron et al. | |
| 5,721,849 A | 2/1998 | Amro | |
| 5,790,127 A | 8/1998 | Anderson et al. | |
| 5,821,928 A | 10/1998 | Melkus et al. | |
| 5,826,015 A | 10/1998 | Schmidt | |
| 5,845,300 A | 12/1998 | Comer et al. | |
| 5,859,640 A | 1/1999 | de Judicibus | |
| 5,877,763 A | 3/1999 | Berry et al. | |
| 5,883,626 A | 3/1999 | Glaser et al. | |

(Continued)

FOREIGN PATENT DOCUMENTS

| WO | 2012057726 A1 | 5/2012 |
|---|---|---|
| WO | WO2014072767 A1 | 5/2014 |

OTHER PUBLICATIONS

Jourdan, Guy-Vincent, CSI 3140 WWW Structures, Techniques and Standards, Cascading Style Sheets, power point slides, published Feb. 16, 2010.

(Continued)

*Primary Examiner* — Maikhanh Nguyen
(74) *Attorney, Agent, or Firm* — Young Basile Hanlon & MacFarlane, P.C.

(57) ABSTRACT

A method and apparatus for performing template and content aware document and template editing is provided. Template and content aware document and template editing may include identifying a current document template, the current document template including a plurality of rules, generating a current document based on the current document template, wherein generating the current document includes, identifying a rule from the plurality of rules, the rule indicating an object and an object definition for the object, the object definition including a dynamic content definition, and including dynamic content in the current document based on the dynamic content definition, and storing or transmitting the current document.

16 Claims, 31 Drawing Sheets

(56) References Cited

U.S. PATENT DOCUMENTS

| | | |
|---|---|---|
| 5,905,991 A | 5/1999 | Reynolds |
| 5,966,121 A | 10/1999 | Hubbell et al. |
| 6,005,575 A | 12/1999 | Colleran et al. |
| 6,018,341 A | 1/2000 | Berry et al. |
| 6,272,490 B1 | 8/2001 | Yamakita |
| 6,295,542 B1 | 9/2001 | Corbin |
| 6,301,573 B1 | 10/2001 | McIlwaine et al. |
| 6,377,965 B1 | 4/2002 | Hachamovitch et al. |
| 6,421,678 B2 | 7/2002 | Smiga et al. |
| 6,463,078 B1 | 10/2002 | Engstrom et al. |
| 6,546,393 B1 | 4/2003 | Khan |
| 6,564,213 B1 | 5/2003 | Ortega et al. |
| 6,647,383 B1 | 11/2003 | August et al. |
| 6,654,038 B1 | 11/2003 | Gajewska et al. |
| 6,751,604 B2 | 6/2004 | Barney et al. |
| 6,789,251 B1 | 9/2004 | Johnson |
| 6,820,075 B2 | 11/2004 | Shanahan et al. |
| 6,865,714 B1 | 3/2005 | Liu et al. |
| 6,889,337 B1 | 5/2005 | Yee |
| 6,907,447 B1 | 6/2005 | Cooperman et al. |
| 6,980,977 B2 | 12/2005 | Hoshi et al. |
| 7,003,506 B1 | 2/2006 | Fisk et al. |
| 7,003,737 B2 | 2/2006 | Chiu et al. |
| 7,031,963 B1 | 4/2006 | Bae |
| 7,039,658 B2 * | 5/2006 | Starkey ............. G06F 17/30893 |
| 7,047,318 B1 * | 5/2006 | Svedloff ............. G06F 17/3089 707/E17.116 |
| 7,051,277 B2 | 5/2006 | Kephart et al. |
| 7,073,129 B1 | 7/2006 | Robarts et al. |
| 7,103,835 B1 | 9/2006 | Yankovich et al. |
| 7,111,231 B1 * | 9/2006 | Huck ................ G06F 17/30867 715/205 |
| 7,127,674 B1 | 10/2006 | Carroll et al. |
| 7,131,063 B2 * | 10/2006 | Mateos ............. G06F 17/30893 707/999.003 |
| 7,146,422 B1 | 12/2006 | Marlatt et al. |
| 7,295,995 B1 | 11/2007 | York et al. |
| 7,353,252 B1 | 4/2008 | Yang et al. |
| 7,353,397 B1 | 4/2008 | Herbach |
| 7,356,768 B1 * | 4/2008 | Levy ................. G06F 17/248 709/203 |
| 7,370,274 B1 | 5/2008 | Stuple et al. |
| 7,380,218 B2 | 5/2008 | Rundell |
| 7,386,789 B2 | 6/2008 | Chao et al. |
| 7,392,249 B1 | 6/2008 | Harris et al. |
| 7,395,507 B2 | 7/2008 | Robarts et al. |
| 7,406,659 B2 | 7/2008 | Klein et al. |
| 7,451,389 B2 | 11/2008 | Huynh et al. |
| 7,480,715 B1 | 1/2009 | Barker et al. |
| 7,487,145 B1 | 2/2009 | Gibbs et al. |
| 7,499,919 B2 | 3/2009 | Meyerzon et al. |
| 7,499,940 B1 | 3/2009 | Gibbs |
| 7,647,312 B2 | 1/2010 | Dai |
| 7,664,786 B2 | 2/2010 | Oh et al. |
| 7,685,144 B1 | 3/2010 | Katragadda |
| 7,685,516 B1 | 3/2010 | Fischer |
| 7,716,236 B2 | 5/2010 | Sidhu et al. |
| 7,734,627 B1 | 6/2010 | Tong |
| 7,756,935 B2 | 7/2010 | Gaucas |
| 7,761,788 B1 | 7/2010 | McKnight et al. |
| 7,769,579 B2 | 8/2010 | Zhao et al. |
| 7,774,328 B2 | 8/2010 | Hogue et al. |
| 7,779,355 B1 | 8/2010 | Erol et al. |
| 7,783,965 B1 | 8/2010 | Dowd et al. |
| 7,818,678 B2 | 10/2010 | Massand |
| 7,836,044 B2 | 11/2010 | Kamvar et al. |
| 7,917,848 B2 | 3/2011 | Harmon et al. |
| 8,020,003 B2 | 9/2011 | Fischer |
| 8,020,112 B2 | 9/2011 | Ozzie et al. |
| 8,027,974 B2 | 9/2011 | Gibbs |
| 8,051,088 B1 | 11/2011 | Tibbetts et al. |
| 8,086,960 B1 | 12/2011 | Gopalakrishna et al. |
| 8,091,020 B2 | 1/2012 | Kuppusamy et al. |
| 8,117,535 B2 | 2/2012 | Beyer et al. |
| 8,185,448 B1 | 5/2012 | Myslinski |
| 8,224,802 B2 | 7/2012 | Hogue |
| 8,229,795 B1 | 7/2012 | Myslinski |
| 8,239,751 B1 | 8/2012 | Rochelle et al. |
| 8,260,785 B2 | 9/2012 | Hogue et al. |
| 8,261,192 B2 | 9/2012 | Djabarov |
| 8,346,620 B2 | 1/2013 | King et al. |
| 8,346,877 B2 | 1/2013 | Turner |
| 8,359,550 B2 | 1/2013 | Meyer et al. |
| 8,370,275 B2 | 2/2013 | Bhattacharya et al. |
| 8,386,914 B2 | 2/2013 | Baluja et al. |
| 8,434,134 B2 | 4/2013 | Khosrowshahi et al. |
| 8,453,066 B2 | 5/2013 | Ozzie et al. |
| 8,458,046 B2 | 6/2013 | Myslinski |
| 8,572,388 B2 | 10/2013 | Boemker et al. |
| 8,595,174 B2 | 11/2013 | Gao et al. |
| 8,621,222 B1 | 12/2013 | Das |
| 8,667,394 B1 | 3/2014 | Spencer |
| 8,782,516 B1 | 7/2014 | Dozier |
| 8,799,765 B1 | 8/2014 | MacInnis et al. |
| 8,856,640 B1 | 10/2014 | Barr et al. |
| 8,856,645 B2 | 10/2014 | Vandervort et al. |
| 8,904,284 B2 | 12/2014 | Grant et al. |
| 9,092,414 B2 * | 7/2015 | Levy ..................... G06F 17/248 |
| 2001/0025287 A1 | 9/2001 | Okabe et al. |
| 2002/0010725 A1 | 1/2002 | Mo |
| 2002/0029337 A1 | 3/2002 | Sudia et al. |
| 2002/0035714 A1 | 3/2002 | Kikuchi et al. |
| 2002/0059327 A1 * | 5/2002 | Starkey ............. G06F 17/30893 |
| 2002/0069223 A1 | 6/2002 | Goodisman et al. |
| 2002/0070977 A1 | 6/2002 | Morcos et al. |
| 2002/0103914 A1 | 8/2002 | Dutta et al. |
| 2002/0129100 A1 | 9/2002 | Dutta et al. |
| 2002/0152255 A1 | 10/2002 | Smith, Jr. et al. |
| 2002/0161839 A1 | 10/2002 | Colasurdo et al. |
| 2002/0187815 A1 | 12/2002 | Deeds et al. |
| 2003/0014443 A1 * | 1/2003 | Bernstein ................ G06F 8/427 715/234 |
| 2003/0046263 A1 | 3/2003 | Castellanos et al. |
| 2003/0050995 A1 * | 3/2003 | Mateos ............. G06F 17/30893 709/217 |
| 2003/0058286 A1 | 3/2003 | Dando |
| 2003/0069877 A1 | 4/2003 | Grefenstette et al. |
| 2003/0156130 A1 | 8/2003 | James et al. |
| 2003/0172353 A1 | 9/2003 | Cragun |
| 2003/0200192 A1 | 10/2003 | Bell et al. |
| 2003/0234822 A1 | 12/2003 | Spisak |
| 2004/0061716 A1 | 4/2004 | Cheung et al. |
| 2004/0062213 A1 | 4/2004 | Koss |
| 2004/0122846 A1 | 6/2004 | Chess et al. |
| 2004/0139465 A1 | 7/2004 | Matthews, III et al. |
| 2004/0140901 A1 | 7/2004 | Marsh |
| 2004/0145607 A1 | 7/2004 | Alderson |
| 2004/0153973 A1 | 8/2004 | Horwitz |
| 2004/0164991 A1 | 8/2004 | Rose |
| 2004/0177319 A1 | 9/2004 | Horn |
| 2005/0024487 A1 | 2/2005 | Chen |
| 2005/0028081 A1 | 2/2005 | Arcuri et al. |
| 2005/0034060 A1 | 2/2005 | Kotler et al. |
| 2005/0039191 A1 | 2/2005 | Hewson et al. |
| 2005/0044132 A1 | 2/2005 | Campbell et al. |
| 2005/0044369 A1 | 2/2005 | Anantharaman |
| 2005/0055416 A1 | 3/2005 | Heikes et al. |
| 2005/0120308 A1 | 6/2005 | Gibson et al. |
| 2005/0144162 A1 | 6/2005 | Liang |
| 2005/0144573 A1 | 6/2005 | Moody et al. |
| 2005/0160065 A1 | 7/2005 | Seeman |
| 2005/0183001 A1 | 8/2005 | Carter et al. |
| 2005/0183006 A1 | 8/2005 | Rivers-Moore et al. |
| 2005/0198589 A1 | 9/2005 | Heikes et al. |
| 2005/0210256 A1 | 9/2005 | Meier et al. |
| 2005/0246653 A1 | 11/2005 | Gibson et al. |
| 2006/0005142 A1 | 1/2006 | Karstens |
| 2006/0010865 A1 | 1/2006 | Walker |
| 2006/0041836 A1 | 2/2006 | Gordon et al. |
| 2006/0047682 A1 | 3/2006 | Black et al. |
| 2006/0080303 A1 | 4/2006 | Sargent et al. |
| 2006/0106778 A1 | 5/2006 | Baldwin |
| 2006/0136552 A1 | 6/2006 | Krane et al. |
| 2006/0150087 A1 | 7/2006 | Cronenberger et al. |

(56) References Cited

U.S. PATENT DOCUMENTS

| | | | |
|---|---|---|---|
| 2006/0190435 A1 | 8/2006 | Heidloff et al. | |
| 2006/0213993 A1 | 9/2006 | Tomita | |
| 2006/0248070 A1 | 11/2006 | Dejean et al. | |
| 2006/0253783 A1* | 11/2006 | Vronay | G06F 17/248 715/730 |
| 2007/0005581 A1 | 1/2007 | Arrouye et al. | |
| 2007/0005697 A1 | 1/2007 | Yuan et al. | |
| 2007/0033200 A1 | 2/2007 | Gillespie | |
| 2007/0143317 A1 | 6/2007 | Hogue et al. | |
| 2007/0150800 A1 | 6/2007 | Betz et al. | |
| 2007/0156761 A1 | 7/2007 | Smith | |
| 2007/0162907 A1 | 7/2007 | Herlocker et al. | |
| 2007/0168355 A1 | 7/2007 | Dozier et al. | |
| 2007/0198952 A1 | 8/2007 | Pittenger | |
| 2007/0220259 A1 | 9/2007 | Pavlicic | |
| 2007/0280205 A1 | 12/2007 | Howell et al. | |
| 2007/0291297 A1 | 12/2007 | Harmon et al. | |
| 2008/0022107 A1 | 1/2008 | Pickles et al. | |
| 2008/0028284 A1 | 1/2008 | Chen | |
| 2008/0034213 A1 | 2/2008 | Boemker et al. | |
| 2008/0059539 A1 | 3/2008 | Chin et al. | |
| 2008/0077571 A1 | 3/2008 | Harris et al. | |
| 2008/0082907 A1 | 4/2008 | Sorotokin et al. | |
| 2008/0120319 A1 | 5/2008 | Drews et al. | |
| 2008/0172608 A1 | 7/2008 | Patrawala et al. | |
| 2008/0208969 A1 | 8/2008 | Van Riel | |
| 2008/0239413 A1 | 10/2008 | Vuong et al. | |
| 2008/0243807 A1* | 10/2008 | Gaucas | G06F 17/248 707/999.005 |
| 2008/0320397 A1 | 12/2008 | Do et al. | |
| 2009/0006936 A1 | 1/2009 | Parker et al. | |
| 2009/0013244 A1 | 1/2009 | Cudich et al. | |
| 2009/0044143 A1 | 2/2009 | Karstens | |
| 2009/0044146 A1 | 2/2009 | Patel et al. | |
| 2009/0083245 A1 | 3/2009 | Ayotte et al. | |
| 2009/0094178 A1 | 4/2009 | Aoki | |
| 2009/0132560 A1 | 5/2009 | Vignet | |
| 2009/0192845 A1 | 7/2009 | Gudipaty et al. | |
| 2009/0198670 A1 | 8/2009 | Shiffer et al. | |
| 2009/0204818 A1 | 8/2009 | Shin et al. | |
| 2009/0282144 A1 | 11/2009 | Sherrets et al. | |
| 2009/0292673 A1 | 11/2009 | Carroll | |
| 2010/0070448 A1 | 3/2010 | Omoigui | |
| 2010/0070881 A1 | 3/2010 | Hanson et al. | |
| 2010/0076946 A1 | 3/2010 | Barker et al. | |
| 2010/0100743 A1 | 4/2010 | Ali et al. | |
| 2010/0121888 A1 | 5/2010 | Cutting et al. | |
| 2010/0131523 A1 | 5/2010 | Yu et al. | |
| 2010/0180200 A1 | 7/2010 | Donneau-Golencer et al. | |
| 2010/0191744 A1 | 7/2010 | Meyerzon et al. | |
| 2010/0198821 A1 | 8/2010 | Loritz et al. | |
| 2010/0223541 A1 | 9/2010 | Clee et al. | |
| 2010/0251086 A1 | 9/2010 | Haumont et al. | |
| 2010/0268700 A1 | 10/2010 | Wissner et al. | |
| 2010/0269035 A1 | 10/2010 | Meyer et al. | |
| 2010/0275109 A1 | 10/2010 | Morrill | |
| 2010/0281353 A1 | 11/2010 | Rubin | |
| 2011/0016106 A1 | 1/2011 | Xia | |
| 2011/0023022 A1 | 1/2011 | Harper et al. | |
| 2011/0043652 A1 | 2/2011 | King et al. | |
| 2011/0060584 A1 | 3/2011 | Ferrucci et al. | |
| 2011/0072338 A1 | 3/2011 | Caldwell | |
| 2011/0082876 A1 | 4/2011 | Lu et al. | |
| 2011/0087973 A1 | 4/2011 | Martin et al. | |
| 2011/0126093 A1 | 5/2011 | Ozzie et al. | |
| 2011/0173210 A1 | 7/2011 | Ahn et al. | |
| 2011/0179378 A1 | 7/2011 | Wheeler et al. | |
| 2011/0191276 A1 | 8/2011 | Cafarella et al. | |
| 2011/0209064 A1 | 8/2011 | Jorgensen et al. | |
| 2011/0209075 A1 | 8/2011 | Wan | |
| 2011/0219291 A1 | 9/2011 | Lisa | |
| 2011/0225482 A1 | 9/2011 | Chan et al. | |
| 2011/0225490 A1 | 9/2011 | Meunier | |
| 2011/0252312 A1 | 10/2011 | Lemonik et al. | |
| 2011/0276538 A1 | 11/2011 | Knapp et al. | |
| 2011/0296291 A1 | 12/2011 | Melkinov et al. | |
| 2011/0306028 A1 | 12/2011 | Galimore | |
| 2012/0078826 A1 | 3/2012 | Ferrucci et al. | |
| 2012/0084644 A1 | 4/2012 | Robert et al. | |
| 2012/0095979 A1 | 4/2012 | Aftab et al. | |
| 2012/0116812 A1 | 5/2012 | Boone et al. | |
| 2012/0124053 A1 | 5/2012 | Ritchford et al. | |
| 2012/0166924 A1 | 6/2012 | Larson et al. | |
| 2012/0185473 A1 | 7/2012 | Ponting et al. | |
| 2012/0203734 A1 | 8/2012 | Spivack et al. | |
| 2012/0226646 A1 | 9/2012 | Donoho et al. | |
| 2012/0254730 A1 | 10/2012 | Sunderland et al. | |
| 2012/0284602 A1 | 11/2012 | Seed et al. | |
| 2012/0304046 A1 | 11/2012 | Neill et al. | |
| 2012/0317046 A1 | 12/2012 | Myslinski | |
| 2013/0036344 A1 | 2/2013 | Ahmed et al. | |
| 2013/0041685 A1 | 2/2013 | Yegnanarayanan | |
| 2013/0132566 A1 | 5/2013 | Olsen et al. | |
| 2013/0165086 A1 | 6/2013 | Doulton | |
| 2013/0212062 A1* | 8/2013 | Levy | G06F 17/248 707/608 |
| 2013/0246346 A1 | 9/2013 | Khosrowshahi et al. | |
| 2013/0268830 A1 | 10/2013 | Khosrowshahi et al. | |
| 2014/0013197 A1 | 1/2014 | McAfee et al. | |
| 2014/0032913 A1 | 1/2014 | Tenenboym et al. | |
| 2014/0040249 A1 | 2/2014 | Ploesser et al. | |
| 2014/0236958 A1 | 8/2014 | Vaughn | |
| 2015/0012805 A1 | 1/2015 | Bleiweiss et al. | |

OTHER PUBLICATIONS

W3C, Cascading Style sheets Level 2 Revision 1 Specification, Apr. 15, 2011, 487 pages.

Ashman. "Electronic Document Addressing: Dealing with Change." ACM Computing Surveys, vol. 32, No. 3, Sep. 2000, pp. 201-212.

ISR and Written Opinion of the International Searching Authority in PCT Application No. PCT/US2011/037862, dated Oct. 31, 2011, 64 pages.

Electronic Signatures and Infrastructures ESI; PDF Advanced Electronic Signature Profiles; Part 4: PAdES Long Ter PAdES-LTV Profile, ETSI TS 102 778-4, V1.1.1, Jul. 2009, 19 pages.

Fox. "Maps API Blog: Creating Dynamic Client-side Maps Mashups with Google Spreadsheets." Mar. 2007, [retrieved on Dec. 5, 2011]. Retrieved from the Internet: <URL:http://googlemapsapi.blogspot.com/2007/03/creating-dynamic-client-side-maps.html>. 2 pages.

GeekRant.org' [online]. "How to Embed a Word Document in Another Word Document," Sep. 14, 2005, [retrieved on Dec. 5, 2011]. Retrieved from the Internet: <URL:http://www.geekrant.org/2005/09/14/word-embed-document/>. 6 pages.

Herrick. "Google this Using Google Apps for Collaboration and Productivity." Proceedings of the ACM Siguccs Fall Conference on User Services Conference, Siguccs '09, Jan. 2009, p. 55.

Kappe. "Hyper-G: A Distributed Hypermedia System." Proceedings of the International Networking Conference, 1993, [retrieved on Oct. 20, 2011]. Retrieved from the Internet: <URL:http://ftp.iicm.tugraz.at/pub/papers/inet93.pdf>. 9 pages.

Kircher. "Lazy Acquisition." Proceedings of the 6th European Conference on Pattern Languages of Programs, Jul. 2011, pp. 1-11.

Microsoft Support' [online]. "How to Embed and Automate Office Documents with Visual Basic," Mar. 27, 2007, [retrieved on Dec. 5, 2011]. Retrieved from the Internet: <URLhttp://support.microsoft.com/kb/242243>. 6 pages.

Microsoft Support' [online]. "OLE Concepts and Requirements Overview," Oct. 27, 1999, [retrieved on Dec. 2, 2011]. Retrieved from the Internet: <URL:http://support.microsoft.com/kb/86008>. 3 pages.

Oracle Provider for OLE DB—Developer's Guide. 10g Release 1 (10.1) Dec. 2003, Oracle Corp., 90 pages.

Pinkas et al. "CMS Advanced Electrponic Signatures," Request for Comments 5126, Feb. 2008, 142 pages.

WebArchive' [online]. "Supplementary Notes for MFC Programming Module 23 and Module 27: Interfaces, COM.COM+ and OLE" in: http://www.tenouk.com/visualcplusmfc/mfcsupp/ole.

(56) References Cited

OTHER PUBLICATIONS html, Jan. 6, 2008, [retrieved on Dec. 5, 2011]. Retrieved from the Internet: <URL:http://web.archive.org/web/20091125073542/http://www.tenouk.com/visualcplusmfc/mfcsupp/ole.html>. 4 pages.

David Sawyer McFarland, "CSS the missing manual", O'Reilly, Aug. 2009, pp. 7-101, 134-138, 428-429.

Herb Tyson, Microsoft Word 2010 Bible, John Wiley & Sons, pp. 221, 757, 833, Jun. 21, 2010.

Timestamp from Wikipedia, accessed from https://en.wikipedialcorg/wiki/Timestamp, archived by WaybackMachine on Sep. 15, 2012, pp. 1-2.

"Bohman, P. ""Introduction to Web Accessibility"", Oct. 2003, ebAIM, printed Apr. 17, 2004,<http://www.webaim.org/intro/?templatetype=3> (p. 1-6)".

"Caldwell et al., ""Web Content Accessibility Guidelines 2.0, W3C Working Draft Mar. 11, 2004"", Mar. 11, 2004, WorldWide Web Consortium (p. 1-56)".

Francik, E., Computer-& screen-based interfaces: Universal design filter, Human Factors Engineering, Pacific Bell Version 2, Jun. 6, 1996.

Griesser, A., "A generic editor Full text," pp. 50-55, 1997 ACM Press NewYork, NY, USA.

Jacobs, Ian, et al., "User Agent Accessibility Guidelines 1.0, W3C Recommendation Dec. 17, 2002", World Wide Web Consortium, 115 pages.

Treviranus, Jutta, et al., "Authoring Tool Accessibility Guidelines 1.0, W3C Recommendation Feb. 3, 2000", World Wide Web Consortium (p. 1-22).

https://en.wikipedia.org/wiki/Backus%E2%80%93Naur_Form.

http://en.wikipedia.org/wiki/Regular_expression.

\* cited by examiner

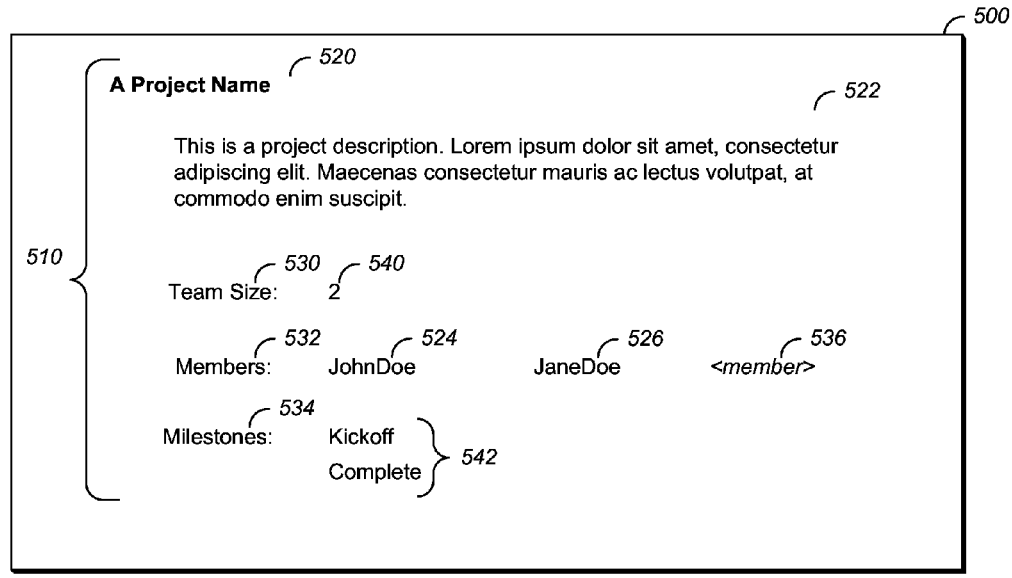

FIG. 5

[Proejct][Name][text]A Proejct Name [Description][text]This is a proejct description. Lorem ipsum dolor sit amet, consectetur adipiscing elit. Maecenas consectetur mauris ac lectus volutpat, at commodo enim suscipit.[Size][SizeLabel][text]Team Size:[Value][text]2 [Members][MembersLabel][text]Members: [Member][text]JohnDoe [Member][text]JaneDoe [Milestones][MilestonesLabel][text]Milestones: [Milestone][text]Kickoff [Milestone][text]Complete

FIG. 6

Template 2 {
Article = Title AuthorList Content
Title = text["Title"]
AuthorList = Author+
Author = text["Author"]
Content = Section+
Section = text["Section"] Description?
Description = text+
}

Template 3 {
Resume = Name ContactInfo Education Experience Section+
Name = text ["Your Name"]
ContactInfo = Email Phone Address?
Email = text ["Email"]
Phone = text ["Phone"]
Address = text["Address"]
Education = EducationTitle EducationItem+
EducationTitle = "Education"
EducationItem = Duration Degree College
Duration = text["Time duration"]
Degree = text["Degree"]
College = text["College"]
Experience = ExperianceTitle Job+
ExperienceTitle = "Work Experience"
Job = Duration JobTitle Company Description?
Duration = text["Time duration"]
JobTitle = text ["Job Title"]
Company = text ["Company"]
Description = text+
Section = Title Item+
Title = text["Section"]
Item = Duration Subject
Duration = text["Time duration"]
Subject = text["Subject"]
}

FIG. 9

```
                                                              ┌─ 1400
                          A. User
      auser@%.com              (123) 456-7890
              ┌─ 1320
     Education
              ┌─ 1412                  ┌─ 1414            ┌─ 1416
1410 { 2000 - 2004             Bachelor Degree      │ First University │
              ┌─ 1422                  ┌─ 1424            ┌─ 1426
1420 { 2004 - 2007             Masters Degree         Second University Work Experience <Time Duration>          <Job Title>            <Company>

<Section>

<Time Duration>          <Subject>
```

```
                                                              ┌─ 1450
                          A. User
      auser@%.com              (123) 456-7890

Education
              ┌─ 1422                  ┌─ 1424            ┌─ 1426
1420 { 2004 - 2007             Masters Degree         Second University
              ┌─ 1412                  ┌─ 1414            ┌─ 1416
1410 { 2000 - 2004             Bachelor Degree      │ First University │

Work Experience

<Time Duration>          <Job Title>            <Company>

<Section>

<Time Duration>          <Subject>
```

*FIG. 14*

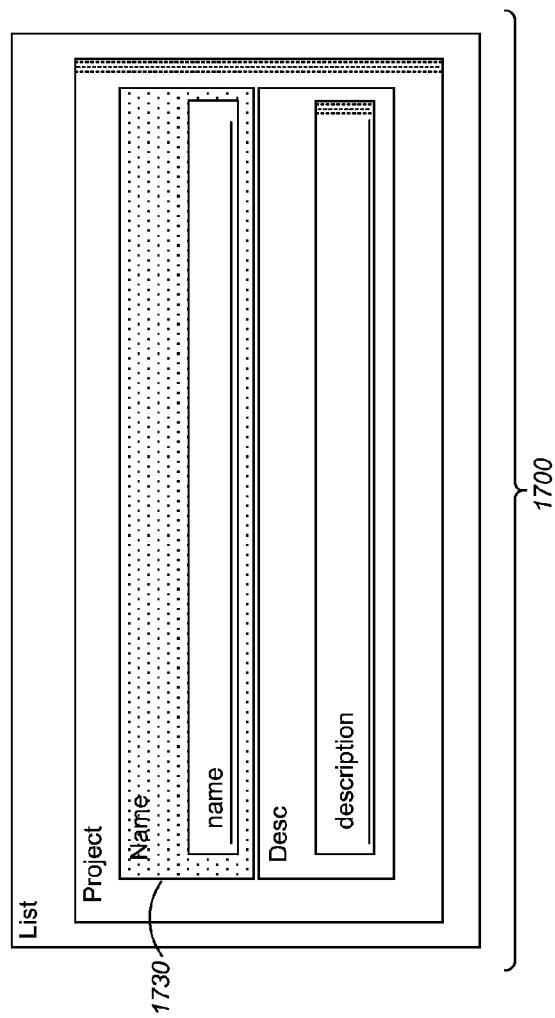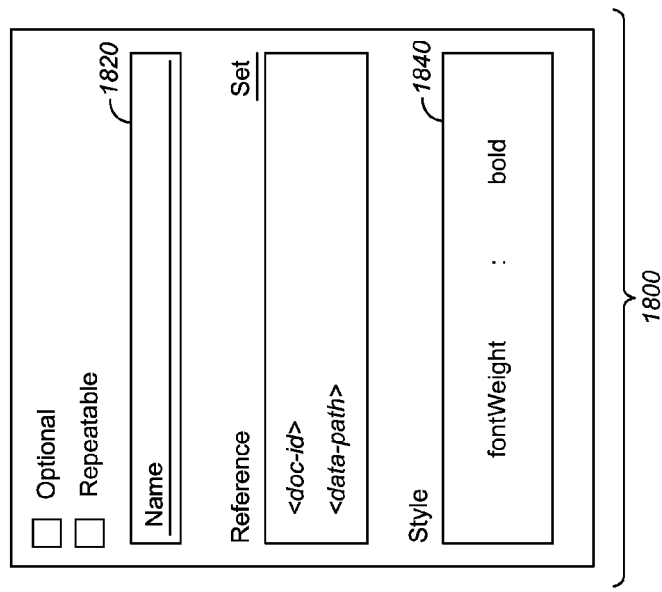
FIG. 20

```
2500 — List = Project + {
          font-family: palatino;
          font-size: 12pt;
          line-height: 1.2;
       };
2510 — Project = Name Desc Size Members {
          padding : 10px;
          clear : both;  ⌐2522
       };
2520 — Name = text["name"] {
          font-weight:bold;
       };           ⌐2532
2530 — Desc = text+["description"] {
          font-style: italic;
          color:#333;
       };
2540 — Size = SizeLabel value
2542 — SizeLabel = "Team size:" {
          float:left;
          width:100px;
          textAlign:right; ⌐2546              ⌐2560
       };
2544 — Value = text["team size"] (Length List.Projects.Members.Employee) {
          float:left;
       };
2550 — Members = MemberLabel Employee*
2552 — MemberLabel = "Members:" {
          float:left;
          width:100px;
          textAlign:right; ⌐2566
       };
2554 — Employee = text["UserIdentifier"] {
          float:left;
       };
```

Template 5

FIG. 25

A Project Name ⟵ 2710

This is a project description. lorem ipsum dolor sit amet, consectetur adipiscing elit. maecenas consectetur mauris ac lectus volutpat, at commodo emim suscipit.

Team size: 4 ⟵ 2714

Members: JohnDoe JaneDoe JimDoe JuneDoe
                                2712

A Second Project Name ⟵ 2720

This is a second project description. integer placerat, orci nec accumsan commodo, quam orci cusus nunc, quis convallis nisl est in sem. in blandit mefesuada porta.

Team size: 2 ⟵ 2724

Members: JohnDoe JuneDoe
                    2722

A Third Project Name ⟵ 2730

This is a third project description. done in actor locus. in id dam nc denim lacerate portia ut a odious. fuse consequent. letups beget aliquant lacerate, eliot rises gluteus ism, veal factious nasa erato sit amt dam.

Teamsize: 3 ⟵ 2734

Members: JohnDoe JessicaDoe JaneDoe
                        2732

*FIG. 27*

```
2910 ─ Resume = UserIdentifire Projects Section* {
          font-family: Palatino;
          font-size: 12pt;
          line-height: 1.2;
       };                        ┌ 2920
2912 ─ UserIdentifier = text["Your User Identifier"] {
          font-weight: bold;
       };
2914 ─ Projects = Header Project* {
          padding: 10px;
          clear: both;
       };
2922 ─ Header = text+ {
          font-style: italic;
          color: #333;
       };
2930 ─ Project = (
          d2ad2abb-57db-478b-8c9c-3f99fabed6a
          List.Project
          if
2940 ─ Project.Members.Employee.text = this.Resume.UserIdentifier.text) {
          float:left;
       };
2916 ─ Section = text["Section Title"] {
          float:left;
       };
```

Template 6

TEMPLATE AND CONTENT AWARE DOCUMENT AND TEMPLATE EDITING

TECHNICAL FIELD

This application relates to computer implemented applications, particularly creating, modifying, and displaying information in an electronic representation of a document.

BACKGROUND

Productivity applications, such as word processing applications and spreadsheet applications, may execute on a local computing device. Networked productivity applications may process and store documents at a central location, may reduce resource utilization at the local computing device, and may allow access from multiple devices and device types. Accordingly, it would be advantageous to provide template and content aware document and template editing.

SUMMARY

Disclosed herein are aspects of systems, methods, and apparatuses for template and content aware document and template editing.

An aspect is a method for template and content aware document and template editing. Template and content aware document and template editing may include identifying a current document template, the current document template including a plurality of rules, generating a current document based on the current document template, wherein generating the current document includes, identifying a rule from the plurality of rules, the rule indicating an object and an object definition for the object, the object definition including a dynamic content definition, and including dynamic content in the current document based on the dynamic content definition, and storing or transmitting the current document.

Another aspect is a method for template and content aware document and template editing. Template and content aware document and template editing may include identifying a current document template, the current document template including a plurality of rules, generating a current document based on the current document template, wherein generating the current document includes identifying a rule from the plurality of rules, the rule indicating an object and an object definition for the object, the object definition including a dynamic content definition, identifying a data source indicated in the dynamic content definition, identifying a functor indicated in the dynamic content definition, generating dynamic content based on the data source and the functor, including the dynamic content in the current document, and storing or transmitting the current document.

Another aspect is a method for template and content aware document and template editing. Template and content aware document and template editing may include identifying a current document template, the current document template including a plurality of rules, generating a current document based on the current document template, wherein generating the current document includes identifying a rule from the plurality of rules, the rule indicating an object and an object definition for the object, the object definition including a dynamic content definition, identifying a source document indicated in the dynamic content definition, wherein the source document and the current document differ, identifying a data source indicated in the dynamic content definition, the data source indicating content included in the source document, identifying a source criterion indicated in the dynamic content definition, the source criterion indicating content included in the data source, identifying a target criterion indicated in the dynamic content definition, the target criterion include content included in the current document, including a portion of the content included in the data source as dynamic content in the current document based on an evaluation of the source criterion and the target criterion, and storing or transmitting the current document.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein:

FIG. 5 shows a diagram of an example of a portion of an interface for template and content aware document and template editing of a document generated based on a template in accordance with implementations of this disclosure;

FIG. 6 shows a diagram of an example of a portion of a document model 600 in accordance with implementations of this disclosure;

FIG. 9 shows examples of template implementations for template and content aware document and template editing in accordance with implementations of this disclosure;

FIG. 14 shows another diagram of an example of a portion of an interface for template and content aware document and template editing of a document generated based on a template in accordance with implementations of this disclosure;

FIG. 20 shows an example of an interface for template and content aware document and template editing of a template in accordance with implementations of this disclosure;

FIG. 25 shows an example of an implementation of a document template for template and content aware document and template editing dynamic content generation in accordance with implementations of this disclosure;

FIG. 27 shows a diagram of an example of a portion of an interface for template and content aware document and template editing of a document generated based on a template in accordance with implementations of this disclosure;

FIG. 29 shows an example of an implementation of a document template for template and content aware document and template editing dynamic content filtering in accordance with implementations of this disclosure;

DETAILED DESCRIPTION

Productivity applications, such as word processing applications and spreadsheet applications may allow for the creation and modification of documents and document templates. Document templates may provide guidance for organizing and presenting information in documents. However, the content, organization, and presentation of the information in a document created based on a template may vary from the structure and style indicated by the template and the content of a document may not be automatically included or updated.

Productivity applications implementing template and content aware document and template editing may allow for the creation and modification of document templates and for the creation and modification documents in conformity with the document templates. Document templates may include rules describing objects, and object definitions. Rules may describe relationships between objects, and may include content, such as string data that may be incorporated into documents generated based on the respective template.

A productivity application may generate a document based on a template, and may provide an interface for presenting and modifying documents and templates. The presentation, organization, and validation of the document may be based on input data received by the productivity application, such as user input data, the content of the document, and the rules described by the template. The productivity application may automatically generate document content based on other document content, the document template, or the content of other documents.

Figure 1:
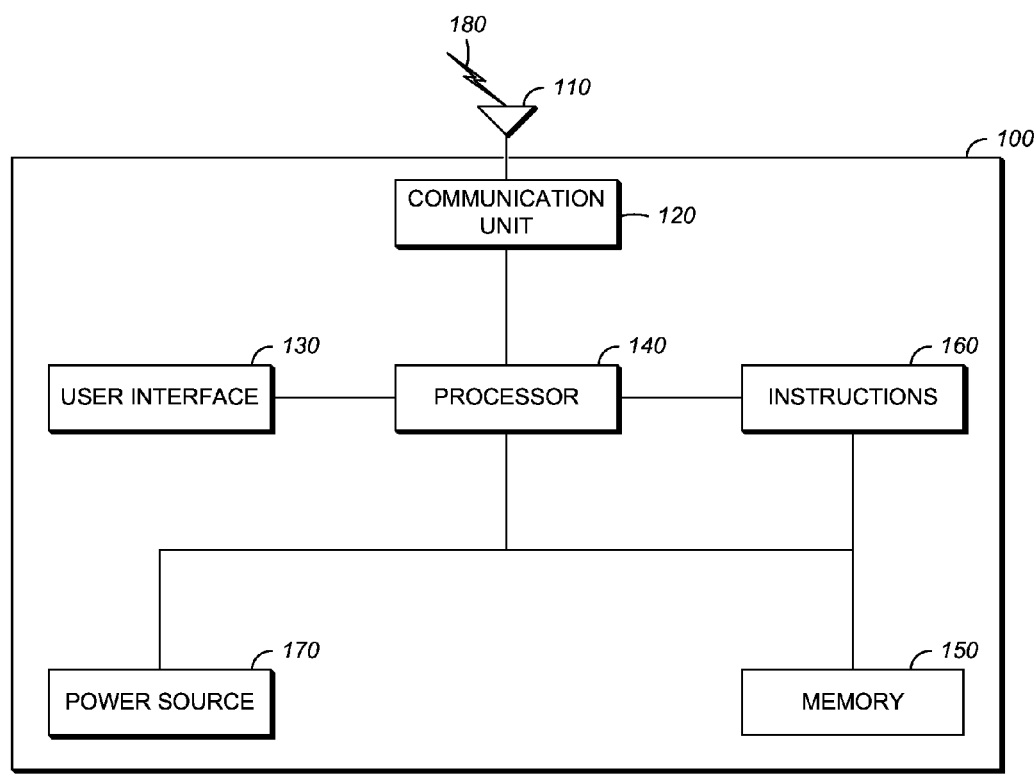
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
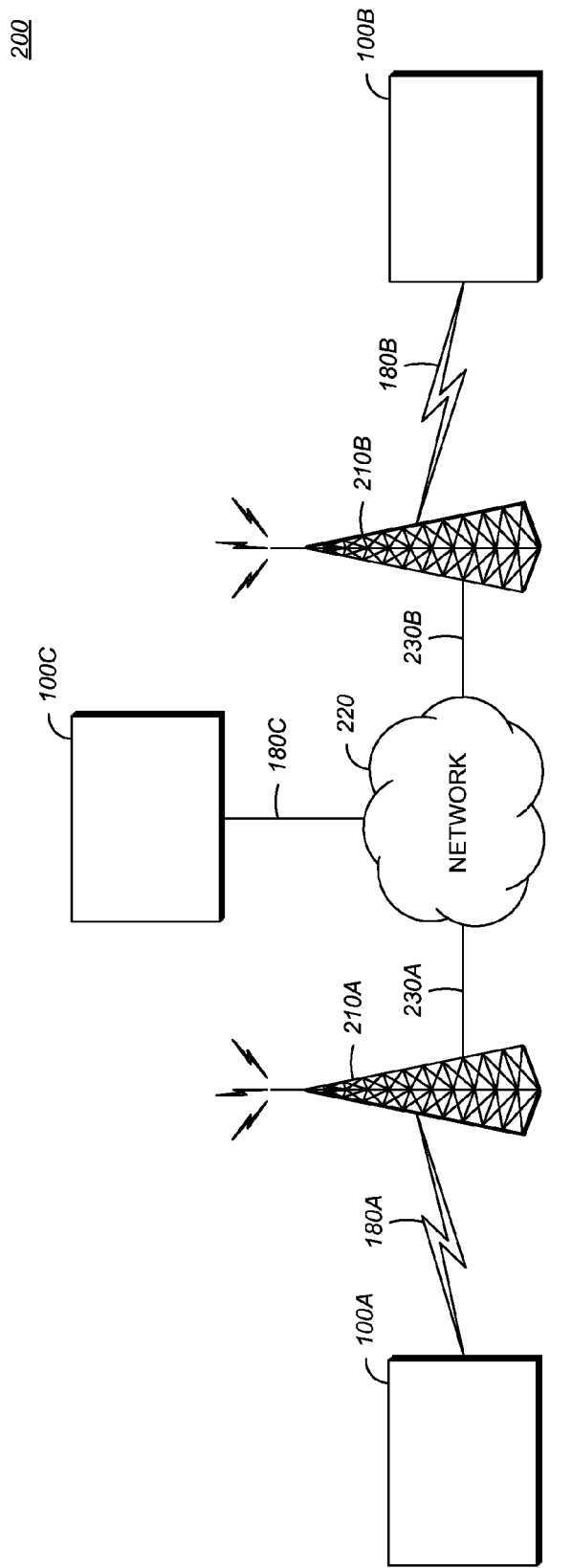
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
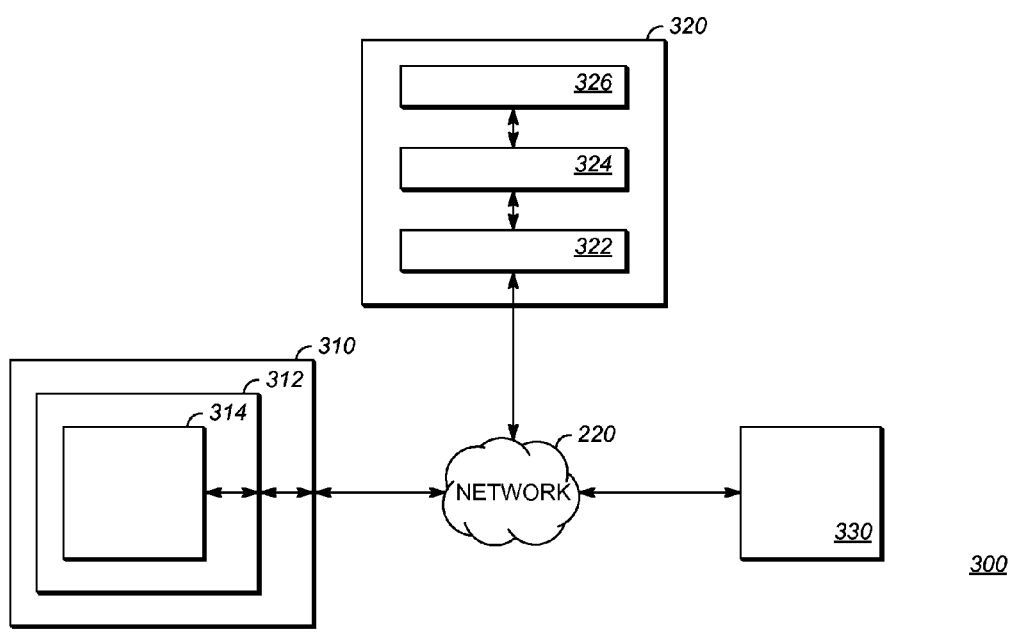
FIG. 3 is a diagram of a communication system for a networked application in accordance with implementations of this disclosure.

FIG. 3 is a diagram of a communication system for a networked application 300 in accordance with implementations of this disclosure. Executing the networked application 300 may include a user device 310, which may be a computing device, such as the computing device 100 shown in FIG. 1 or the computing and communication devices 100A/100B shown in FIG. 2, communicating with a server 320, which may be a computing device, such as the computing device 100 shown in FIG. 1 or computing and communication device 100C shown in FIG. 2, via a network 330, such as the network 220 shown in FIG. 2.

In some implementations, the server 320 may execute a portion or portions of the networked application 300, which may include, for example, generating, modifying, and storing documents and information related to the documents, such as metadata, and providing information for displaying and interacting with the networked application 300 to the user device 310. In some implementations, the server 320 may include one or more logical units 322/324/326. For example, the server 320 may include a web server 322 for receiving and processing requests, such as HTTP requests, from user devices; an application server 324 for executing applications, such as a spreadsheet application or a word processing application; and a database 326 for storing and managing data, such as documents or information about documents, such as metadata. In some implementations, the server 320 may provide information for the networked application 300 to the user device 310 using one or more protocols, such as HyperText Markup Language (HTML), Cascading Style Sheets (CSS), Extensible Markup Language (XML), or JavaScript Object Notation (JSON).

The user device 310 may execute a portion or portions of the networked application 300. For example, the user device 310 may execute a local application 312, such as a browser application, which may receive information from the server 320 and may present a representation of an interface 314 for displaying the networked application 300 and user interactions therewith. For example, the user device 310, may execute a browser application, the browser application may send a request, such as an HTTP request, for the networked application 300 to the server 320, the browser may receive information for presenting the networked application 300, such as HTML and XML data, and the browser may present an interface for the networked application 300. The user device 310 may execute portions of the networked application 300, which may include executable instructions, such as JavaScript, received from the server 320. The user device 310 may receive user input data for the networked application 300, may update the interface 314 for the networked application 300 in response to the user input data, and may send information for the networked application 300, such as information indicating the user input data, to the server 320.

In some implementations, a portion or portions of the networked application may be cashed at the user device 310. For example, the user device 310 may execute a portion or portions of the networked application 300 using information previously received from the server 320 and stored on the user device 310. Although the user device 310 and the server 320 are shown separately, they may be combined. For example, a physical device, such as the computing device 100 shown in FIG. 1 may execute the user device 310 as a first logical device and may execute the server 320 as a second logical device.

In some implementations, the networked application 300 may generate files, folders, or documents, such as spreadsheets or word processing documents. The files, folders, or documents, may be created and stored on the user device 310, the server 320, or both. For example, a document may be created and stored on the server 320 and a copy of the document may be transmitted to the user device 310. Modifications to the document may be made on the user device 310 and transmitted to the server 320. In another example, a document may be created and stored on the user device 310 and the document, or modifications to the document, may be transmitted to the server 320.

In some implementations, a networked application, or an element thereof, may be accessed by multiple user devices. For example, the networked application 300 may be executed by a first user device 310 in communication with the server 32, and a document may be stored at the server 320. The networked application 300 may be executed by a second user device 340, which may be a computing device, such as the computing device 100 shown in FIG. 1 or the computing and communication devices 100A/100B shown in FIG. 2, a user may input modifications to the document at the second user device 340, and the modifications may be saved to the server 320.

In some implementation, a networked application, or an element thereof, may be collaboratively accessed by multiple user devices. For example, a first user device 310 may execute a first instance of the networked application 300 in communication with the server 320, and a document may be stored at the server 320. The first user device 310 may continue to display or edit the document. The second user device 340 may concurrently, or substantially concurrently, execute a second instance of the networked application 300, and may display or edit the document. User interactions with the document at one user device may be propagated to collaborating user devices. For example, one or both of the user devices 310/340 may transmit information indicating user interactions with the document to the server 320, and the server may transmit the information, or similar information, to the other user device 310/340. Although FIG. 3 shows two user devices, any number of user devices may collaborate. User interactions with the networked application 300 at one user device may be propagated to collaborating user devices in real-time, or near real-time. Some user interactions with the networked application 300 may not be transmitted to the server 320 and may not be propagated to the collaborating user devices.

Figure 4:
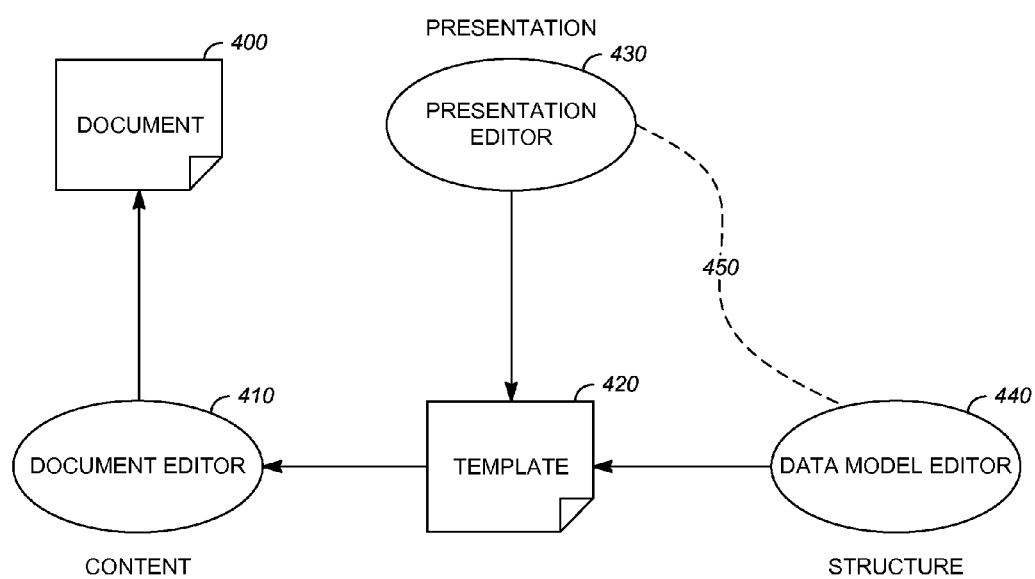
FIG. 4 is a diagram of an example of a template and content aware document and template editing architecture in accordance with implementations of this disclosure.

FIG. 4 is a diagram of an example of a template and content aware document and template editing architecture in accordance with implementations of this disclosure. In some implementations, a template and content aware document and template editing architecture may include creating, accessing, or editing one or more documents via a productivity application, which may be a networked application, such as the networked application 300 shown in FIG. 3, and may be implemented in one or more devices, such as the computing device 100 shown in FIG. 1 or the computing and communication devices 100A/100B/100C shown in FIG. 2.

In some implementations, a template and content aware document and template editing architecture may include a document 400, a document editor 410, a template 420, a presentation editor 430, a data model editor 440, or a combination thereof. Although shown separately, elements of the template and content aware document and template editing architecture may be combined. For example, a template and content aware document and template editing architecture may include a template editor 450, which may include a combination of the presentation editor 430 and the data model editor 440.

In some implementations, a document 400 may be created, accessed, and edited in a document editor 410. For example, a document editor 410 may include an interface for generating, presenting, and modifying a document 400, such as the interface shown in FIGS. 5, 10-16, 27, and 31.

In some implementations, creating, accessing, or editing a document 400 in a document editor 410 may include controlling the generation, presentation, or modification of the document 400 based on a template 420. For example, the template 420 may indicate one or more rules for generating, modifying, or presenting the content of the document 400.

In some implementations, a template 420 may be created, accessed, and edited in an editor, such as the presentation editor 430, the data model editor 440, or a template editor 450. For example, a template editor 450 may include an interface for generating, presenting, and modifying a template 420, such as the interface shown in FIGS. 17-23, 25, and 30. In some implementations, a template 420 may include presentation rules, which may control the presentation of the content of the document 400, and the presentation rules may be created, accessed, or edited in a presentation editor 430. In another example, the template 420 may include structural rules, which may control the structure and content of the document 400, and the structural rules may be created, accessed, and edited in the data model editor 440.

FIG. 5 shows a diagram of an example of a portion of an interface for template and content aware document and template editing of a document 500 generated based on a template in accordance with implementations of this disclosure. In some implementations, a document 500, such as the document 400 shown in FIG. 4, may be associated with a template, such as the template 420 shown in FIG. 4, and may be created, accessed, or modified in a document editor, such as the document editor 410 shown in FIG. 4. For example, the document editor may include the interface shown in FIG. 5.

In some implementations, a document 500 may include a discrete collection of information, such as content 510, control information (not shown), or any other information capable of being included in a document. In some implementations, the content 510 may include text, images, or any other content capable of being presented in a document 500, and the control information may include information for controlling the structure, content, and presentation of the document 500.

In some implementations, a document 500 may include direct content 520/522/524/526, which may be content input or modified in the document 500 directly, such as content input using a document editor interface. For example, in FIG. 5, the text "A Project Name" may be direct content 520. In some implementations, direct content 530/532/534/536 may be created, modified, or deleted in the document 500 in response to input, such as user input.

In some implementations, a document 500 may include indirect content 530/532/534/536, such as express content 530/532/534 or placeholder content 536, which may be included in the document 500 indirectly. For example, indirect content 530/532/534/536 may be included in the document 500 based on the document template, a state of the document, the productivity application, or a combination thereof.

In some implementations, a document 500 may include express content 530/532/534, which may be indirect content and may include content specified as express content in a template associated with the document 500. For example, in FIG. 5, the text "Members:" may be express content. In some implementations, the express content 530/532/534 may be static, constant, or otherwise protected from modification in the document 500.

In some implementations, a document 500 may include placeholder content 536, which may include content specified as placeholder content in a template associated with the document 500. For example, in FIG. 5, the text "<member>" may be placeholder content. In some implementations, the placeholder content 536 may be omitted from the document 500 and may be included in an interface for viewing or editing the document 500.

In some implementations, a document 500 may include dynamic content 540/542. For example, the dynamic content 540 may include content generated for and included in the document 500 based on the document 500, the associated document template, or a combination of the document 500 and the associated document template. In some implementations, the productivity application may generate the dynamic content 540. For example, in FIG. 5 the direct content 524/526 may indicate member identifiers, such as member names, and the dynamic content 540 may be generated by the productivity application based on the member identifier direct content and may indicate a count of the members.

In some implementations, a document 500 may include filtered content 542, which may be dynamic content and may include content identified in another document and included in the current document 500. In some implementations, the productivity application may identify content in another document and may include the identified content as the dynamic content 542 in the current document. For example, the dynamic content 542 shown in FIG. 5 may include content from a milestones document. In another example, the content, or a portion of the content, of the document 500 may be included in another document as dynamic content.

In some implementations, dynamic content may be associated with a data source, which may indicate a source of content for use as the dynamic content. For example, an object definition may include data source, or reference, information indicating a data source for the object. In some implementations, the data source information may include an indication of content other than content indicated directly in the object definition and the indicated content may be included in the current document as dynamic content. For example, the data source information may indicate another object in the current document or an object in another document.

FIG. 6 shows a diagram of an example of a portion of a document model 600 in accordance with implementations of this disclosure. In some implementations, a document, such as the document 500 shown in FIG. 5, may be modeled as a sequence of object tokens, which may be delimited using a pair of square brackets, or any other symbol, including whitespace, capable of delimiting tokens. For example, the document 500 shown in FIG. 5, or a portion thereof, may be modeled as a sequence of object tokens 600 as shown in FIG. 6.

Figure 7:
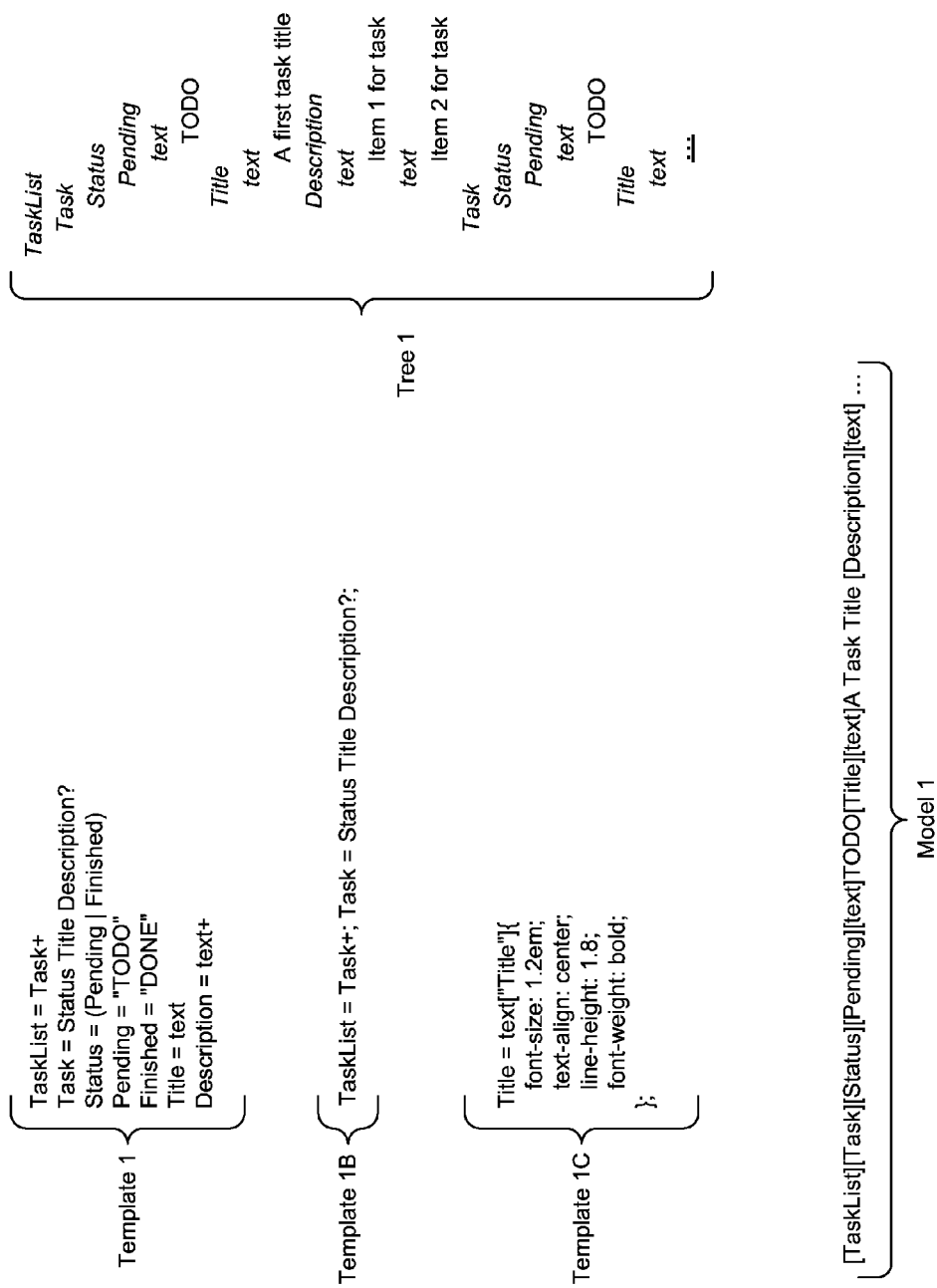
FIG. 7 shows examples of implementations of a document template, a document model, and a document tree for template and content aware document and template editing in accordance with implementations of this disclosure.

FIG. 7 shows examples of implementations of a document template, a document model, and a document tree for template and content aware document and template editing in accordance with implementations of this disclosure. In some implementations, a document template may include a template specification or data model, or schema, which may indicate the structure and semantics of the content of documents generated based on the template. In some implementations, a template specification may describe the organization and presentation of the template and of the content of documents generated based on the template. For example, the template specification may include template rules.

For example, Template 1 shows an example of a portion of a task list template using a whitespace, such as a carriage return, to delimit rules. Although each rule is delimited on an individual line, rules may be delimited using any symbol, or combination of symbols, which may include whitespace, capable of distinguishing rules. For example, a semicolon may be used to delimit rules, such that the first two rules of the template specification shown in Template 1 may be expressed as shown in Template 1B.

In some implementations, a rule, such as the first rule in a template specification may include an identifier of the template, such as a name of the template. For example, in Template 1, the first rule "TaskList=Task+" includes a name, 'TaskList', for the template.

In some implementations, a rule may indicate an object and an object definition, or replacement setting, for the object. For example, in Template 1, the first rule "TaskList=Task+" may indicate an object, 'TaskList', and an object definition, "Task+". In some implementations, an object, which may represent a discrete collection of information, may be expressed as a symbol, such as 'TaskList', which may be a terminal or nonterminal symbol. In some implementations, an object definition may be expressed as an expression that may include one or more symbols, such as objects and modifiers. Although rules are described herein using the equality operator (=) to distinguish an object from an object definition, any symbol, or combination of symbols, which may include whitespace, capable of distinguishing an object from an object definition may be used. For example, the first rule shown in Template 1 may be expressed as "TaskList:Task+".

In some implementations, an object definition may include one or more objects, such as system objects, which may be expressed as terminal symbols, or custom objects, which may be expressed as nonterminal symbols. For example, a template specification may include the rule "Task=Title" and the rule "Title=text". The object definition indicated in the rule "Task=Title" includes the 'Title' object, which may be a custom object, such as an object that is defined in another rule in the template specification, such as the rule "Title=text". The object definition indicated in the rule "Title=text" includes the 'text' object, which may be a system object.

In some implementations, a custom object may be defined in the template specification. For example, in Template 1, the custom object 'Task' may be defined by the second rule "Task=Status Title Description?", which may indicate that the 'Task' object may include a 'Status' object, a 'Title' object, and a 'Description' object. In some implementations, a template specification may include a rule defining each custom object included in the template.

In some implementations, an object definition for a system object may be omitted from a template specification. For example, in Template 1, the rule "Title=text" may indicate that the object 'Title' may include the system object 'text'. In some implementations, the template and content aware document and template editing system, or a portion thereof, such as the productivity application, may define one or more system objects. For example, the system object 'text' may be defined by the productivity application as a paragraph of text.

In some implementations, an object indicated in an object definition may be associated with one or more modifiers. For example, the one-or-more modifier, which may be expressed as using, for example, the plus symbol (+), may be associated with an object and may indicate that a document generated based on the template may include one-or-more of the object. For example, the rule "Task Template=Task+" may indicate that the 'TaskList' object may include one or more 'Task' objects.

In some implementations, the zero-or-more modifier, which may be expressed using, for example, the asterisk (*), may be associated with an object and may indicate that a document generated based on the template may include zero or more of the object. For example, the rule "Task=text*", may indicate that the 'Task' object may include zero-or-more 'text' objects. In some implementations, a modifier may indicate the minimum and maximum instances of an object in a document generated based on a template. For example, the modifier {2,4} may indicate that a document may include two, three, or four instances of an object.

In some implementations, the optional modifier, which may be expressed using, for example, the question mark (?), may be associated with an object and may indicate that the object is optional. For example, in Template 1, the second rule "Task=Status Title Description?", may indicate that the 'Task' object may include a 'Status' object, a 'Title' object, and an optional 'Description' object.

In some implementations, the set modifier, which may be expressed using an opening parenthesis and a closing parenthesis (( )), may be associated with a set of objects and may indicate that the objects are related. In some implementations, the alternate modifier, which may be expressed using, for example, a vertical line (|) may be associated with a set of objects and may indicate that the objects are alternates. For example, in Template 1, the third rule "Status=(Pending|Finished)" may indicate that the 'status' object may include a 'Pending' object or a 'Finished' object. In some implementations, the alternates modifier may be used in combination with the set modifier, as shown in the third rule of Template 1. In some implementations, the alternates modifier may be used independently of the set modifier. For example, the third rule of Template 1 may be expressed as "Status=Pending|Finished". Although the objects associated with the alternates modifier are shown in Template 1 as having object definitions that include express content, objects associated with the alternate modifier may have object definitions that include placeholder content or that do not include content.

In some implementations, an object definition may include content, such as express content, which may be included as express content in a document associated with the template, or placeholder content, which may be omitted from a document associated with the template and may be included in a user interface for accessing the document. In some implementations, the content may be defined as a string of text using the string modifier, which may be expressed as a pair of quotation marks (" ").

In some implementations, an object definition may include express content as a string that is not associated with, or proximate to, an object in the object definition. For example, a template may include the rule "Pending="TODO"", which may indicate that the 'Pending' object includes an implicit 'text' object that is associated with the express content "TODO", and a document generate based on the Template 1 may include the express content "TODO". In some implementations, express content may be included in a document as static, or constant, content, and a document editor may prevent modification or deletion of the express content.

In some implementations, an object definition may include content implicitly specified as placeholder content. For example, in some implementations, an object definition may include placeholder content as a string that is associated with, or proximate to, an object in the object definition. For example, a template may include the rule "Title=text[Title]", which may indicate that the 'Title' object includes a 'text' object that is associated with the placeholder content "Title". In some implementations, placeholder content may be included in a document as placeholder content. In some implementations, placeholder content may be omitted from a document and a user interface, such as a document editing interface, for the document may include the placeholder content as a placeholder token. In some implementations, a placeholder token may be expressed using a pair of angle brackets, or any other symbol, including whitespace, capable of delimiting a content placeholder. For example, a template may include the rule "Title=text["Title"]", which may indicate that the 'Title' object includes a 'text' object associated with the placeholder content "Title", and a placeholder token for an instance of the 'Title' object may be expressed as "<Title>".

In some implementations, an object definition may include presentation information, such as cascading style sheet information, or any other information capable of describing the presentation of content. For example, a rule including style information may be expressed as shown in Template 1C in FIG. 7.

In some implementations, a document generated based on a template may be modeled as a sequence of object tokens corresponding to the rules indicated in the associated template specification. In some implementations, the objects indicated in the template specification may be included in the document as object instances and may be represented by object tokens. In some implementations, an object token may be delimited using a pair of square brackets, or any other symbol, including whitespace, capable of delimiting object tokens. For example, a document associated with Template 1 may be expressed, in part, as shown in Model 1 in FIG. 7.

In some implementations, an object instance may be associated with content, such as direct content, indirect content, dynamic content, or a combination thereof. For example, a document generated based on a template that includes the rule "Pending="TODO"" may include a 'Pending' token, representing an instance of a 'Pending' object, which may include a 'text' token, representing an instance of a 'text' object, which may include the express content "TODO".

In some implementations, objects, such as objects associated with the optional modifier or objects associated with the zero-or-more modifier, may be omitted from a document. For example, in Template 1, the 'Description' object is associated with the optional modifier, and generating, presenting, or modifying a document based on Template 1 may include omitting an object token representing an instance of the 'Description' object. In some implementations, omitting an object may include omitting objects defined in the object definition for the omitted object. In some implementations, objects associated with the optional modifier or the zero-or-more modifier may be included in a document. For example, an instance of an object associated with the optional modifier may be associated with content and may be included in the document.

In some implementations, objects, such as objects that are not associated with a modifier or objects associated with the one-or-more modifier, may be included in the document. For example, as shown in Model 1, an instance of an object, such as the 'Title' object may be included in the document as an object token, such as the 'Title' token.

In some implementations, creating, accessing, or modifying a document may include generating or modifying a document tree based on the document, the template, a state of the productivity application, or a combination thereof. For example, a partial document tree for a document associated with Template 1 may be expressed as shown in Tree 1 in FIG. 7. For clarity, in Tree 1, object instances are shown in italic font, placeholder content is shown underlined, and document content, such as direct content and express content, is shown in normal font.

Figure 8:
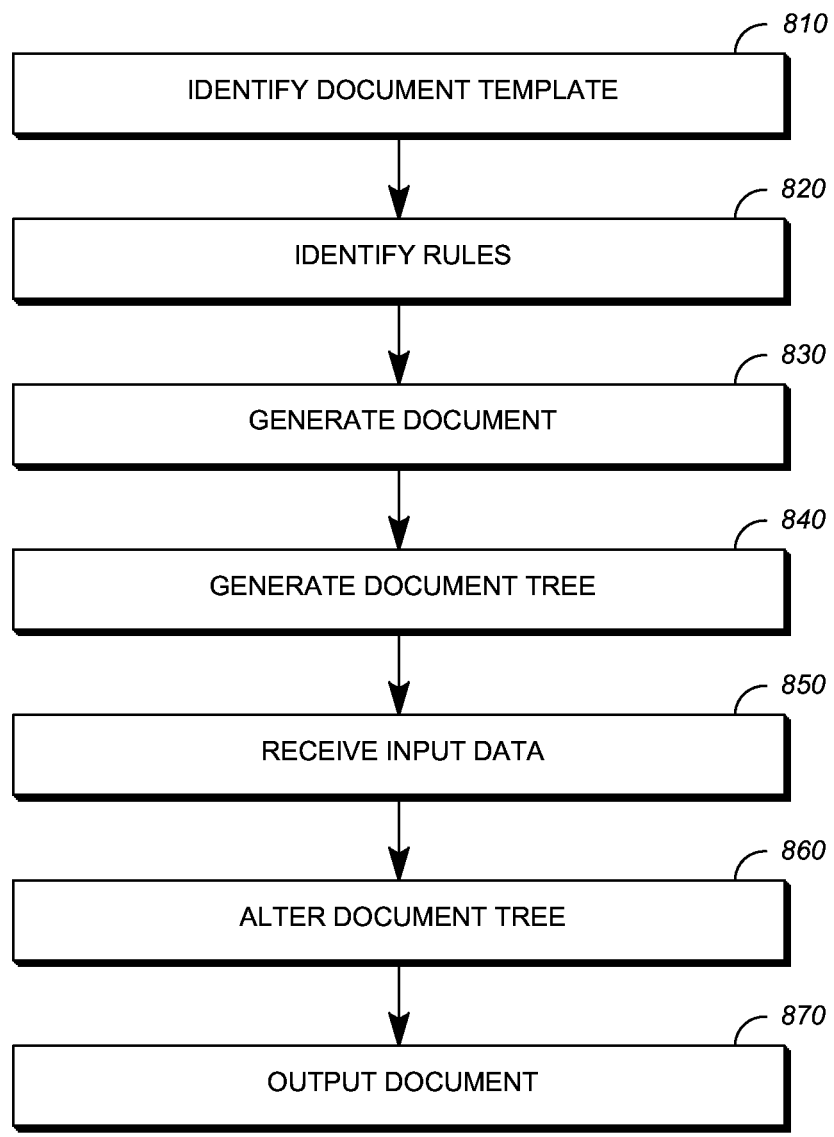
FIG. 8 is a block diagram of template and content aware document and template editing of a document generated based on a template in accordance with implementations of this disclosure.

FIG. 8 is a block diagram of template and content aware document and template editing of a document generated based on a template in accordance with implementations of this disclosure. Implementations of template and content aware document and template editing of a document generated based on a template may include one or more user devices, such as the computing device 100 shown in FIG. 1 or the computing and communication devices 100A/100B shown in FIG. 2, creating, accessing, or editing one or more documents via a productivity application, which may be a networked application, such as the networked application 300 shown in FIG. 3, executed by a server, which may be a computing device, such as the computing device 100 shown in FIG. 1 or the computing and communication devices 100C shown in FIG. 2. Implementations of template and content aware document and template editing of a document generated based on a template can include identifying a document template at 810, identifying rules at 820; generating a document at 830, generating a document tree at 840, receiving input data at 850, altering the document tree at 860, outputting the document at 870, or a combination thereof.

In some implementations, a document template may be identified at 810. For example, a user may initiate a productivity application, such as a networked productivity application, and a document template may be identified in response to user input indicating the document template, such as the selection of a document template from a list of document templates. In some implementations, identifying a document template may include identifying a document associated with the template, and identifying the template based on the document. In some implementations, identifying a document template may include identifying a template specification associated with the document template.

In some implementations, template rules may be identified at 820. For example, a template identified at 810 may be associated with a template specification that may include a sequence of template rules. For example, a 'task' template may include rules that may be expressed as shown in Template 1 in FIG. 7.

In some implementations, a document may be generated at 830. For example, generating a document may include creating a file in a file system, creating a document record in a database, or otherwise creating a discrete container for containing document information. In some implementations, generating a document at 830 may include associating the document with the template. For example, a template identifier indicating the template may be included in the document information, such as in metadata, or an association between the document and the template may be stored in a table, such as a database table. In some implementations, a document generated based on a template may be modeled as a sequence of object tokens as shown in Model 1 in FIG. 7.

In some implementations, a document associated with a template may be validated for conformity with the corresponding template specification. For example, the validation may include performing a deserialization analysis.

In some implementations, a document tree may be generated at 840. For example, a partial document tree for a document associated with Template 1 may be expressed as shown in Tree 1 in FIG. 7. In some implementations, generating a document tree at 840 may include identifying content from a document, such as the document generated at 830, and applying rules included in a template specification, such as the rules identified at 820, to the document content. For example, the template may include the objects associated with the alternate modifier, such as the 'Pending' object and the 'Finished' object indicated in Template 1, and generating the document tree may include identifying content in the document that is associated with the 'Pending' object or the 'Finished' object, and including the identified content in the document tree.

In some implementations, the template specification may include an object that is associated with placeholder content, and generating the document tree at 840 may include generating a placeholder token for an instance of the object. In some implementations, the template specification may include an object that does not include placeholder content, such as the 'Title' object shown in Template 1 ("Title=text"), and generating the document tree at 840 may include using an ellipsis, or any other symbol, including whitespace, capable of expressing a content placeholder.

In some implementations, input data may be received at 850. For example, the productivity application may generate and present an interface, such as a user interface, for interacting with the document generated at 830, which may include using the document tree generated at 840, and may receive input data via the interface. In some implementations, the productivity application may receive input data indicating, for example, a mouse click on a text field, a change of focus, a keystroke, such as the enter key or the tab key, a combination of keystrokes, such as shift-tab, alt-up, or alt-down, or any other input data related to the document.

In some implementations, the document tree may be altered at 860. For example, the document tree may be altered in response to the input data received at 850. In some implementations, alterations to the document tree may be based on a current state of the productivity application interface, the input data received at 850, the template specification, or a combination thereof. For example, content may be added, modified, or removed from the document tree. In some implementations, the document may not include an instance of an object indicated in the corresponding template specification, such as the 'Description' object, and updating the document tree may include inserting the omitted object, corresponding content, or both, into the document tree.

In some implementations, the document may be output at 870. For example, the document may be stored on a memory, such as memory 150 shown in FIG. 1, or transmitted via a communication network, such as the network 220 shown in FIG. 2. In some implementations, outputting the document may include presenting an interface, such as a user interface, for viewing and interacting with the document. In some implementations, the document may be output based on the content of the document, the template, or both.

FIG. 9 shows examples of template implementations for template and content aware document and template editing in accordance with implementations of this disclosure. For example, Template 2 shows an example of a portion of an 'Article' template, and Template 3 shows an example of a portion of a 'Resume' template.

Figure 10:
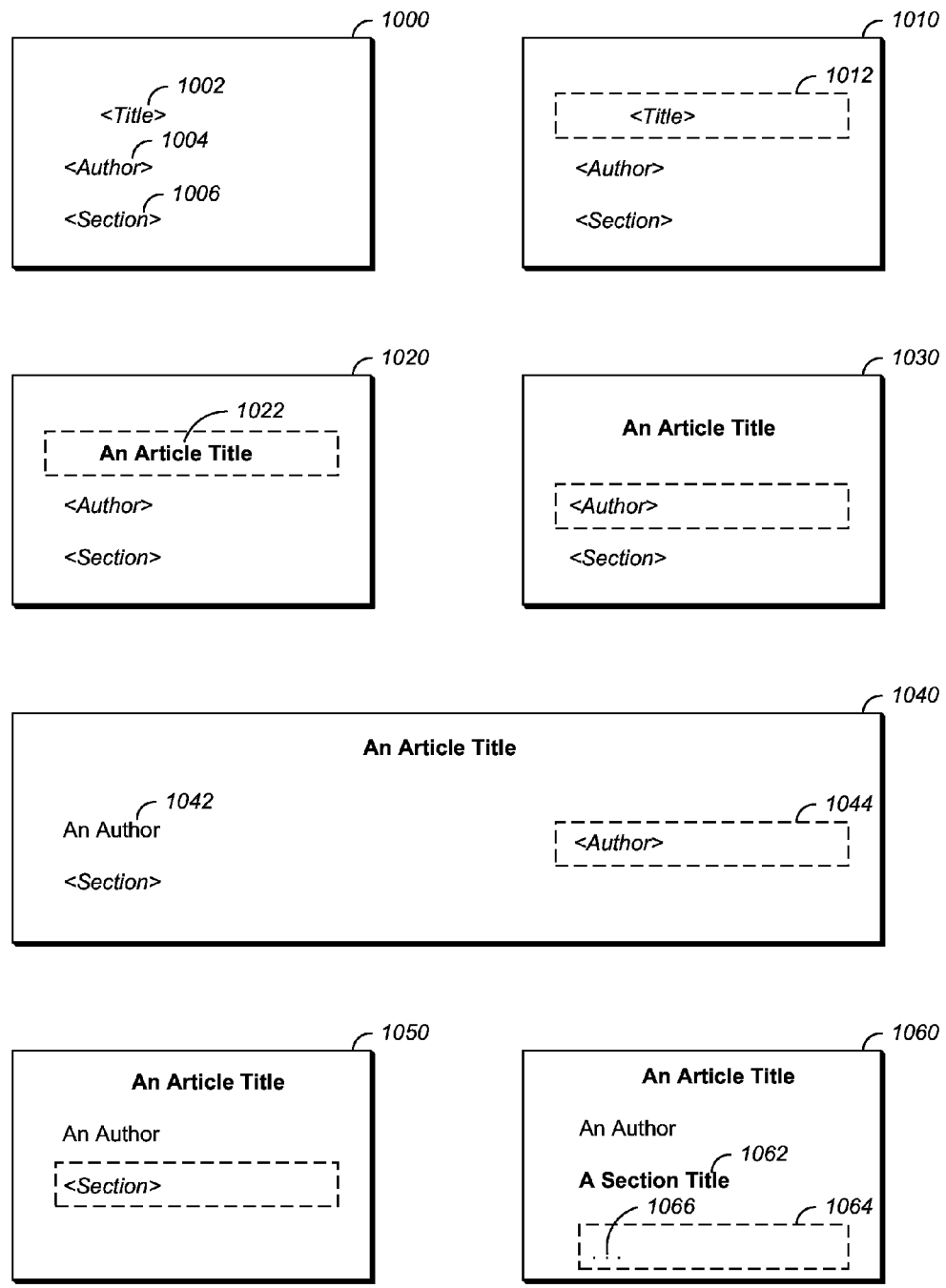
FIG. 10 shows a diagram of an example of a portion of an interface for template and content aware document and template editing of a document generated based on a template in accordance with implementations of this disclosure.
Figure 11:
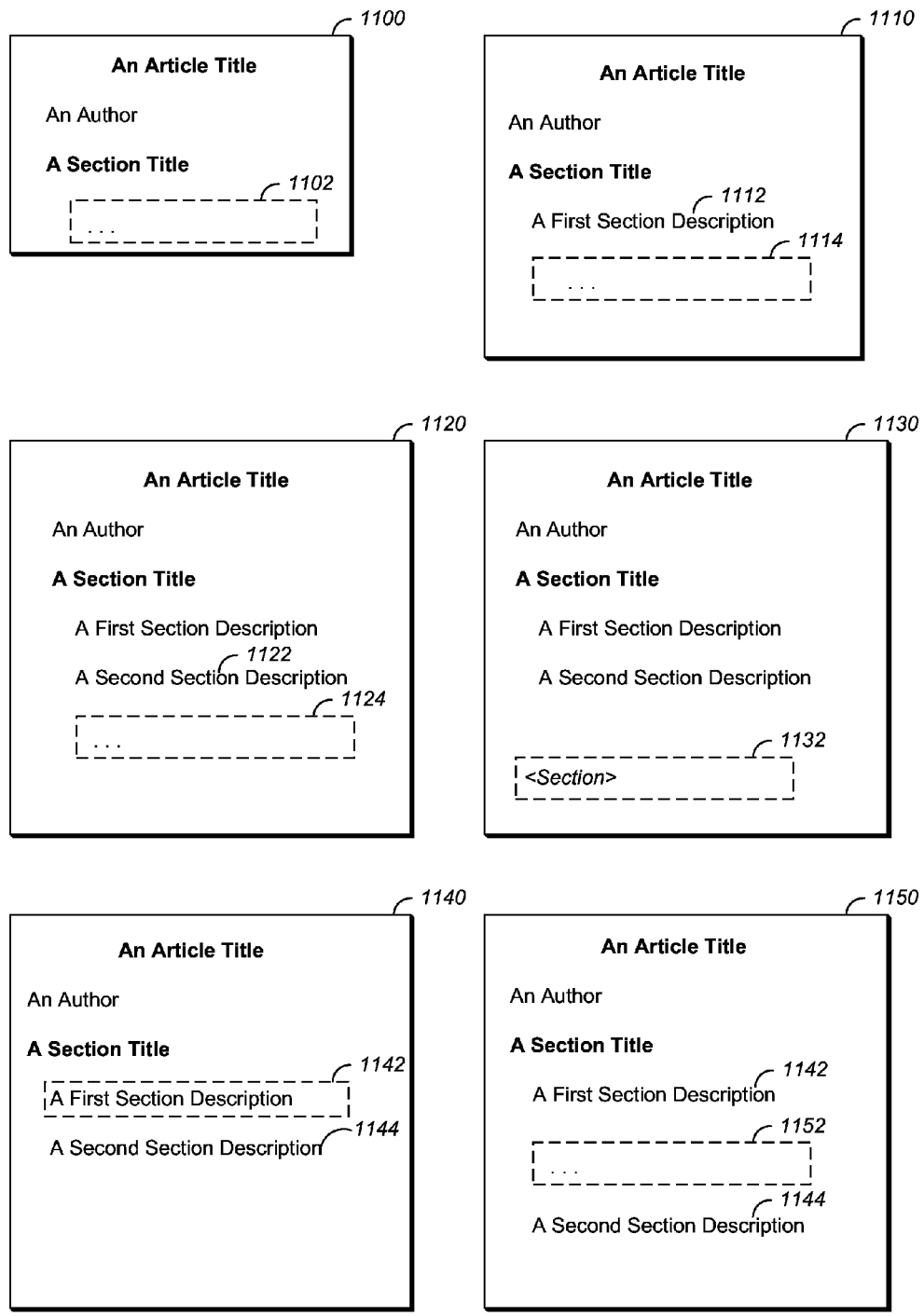
FIG. 11 shows another diagram of an example of a portion of an interface for template and content aware document and template editing of a document generated based on a template in accordance with implementations of this disclosure.
Figure 12:
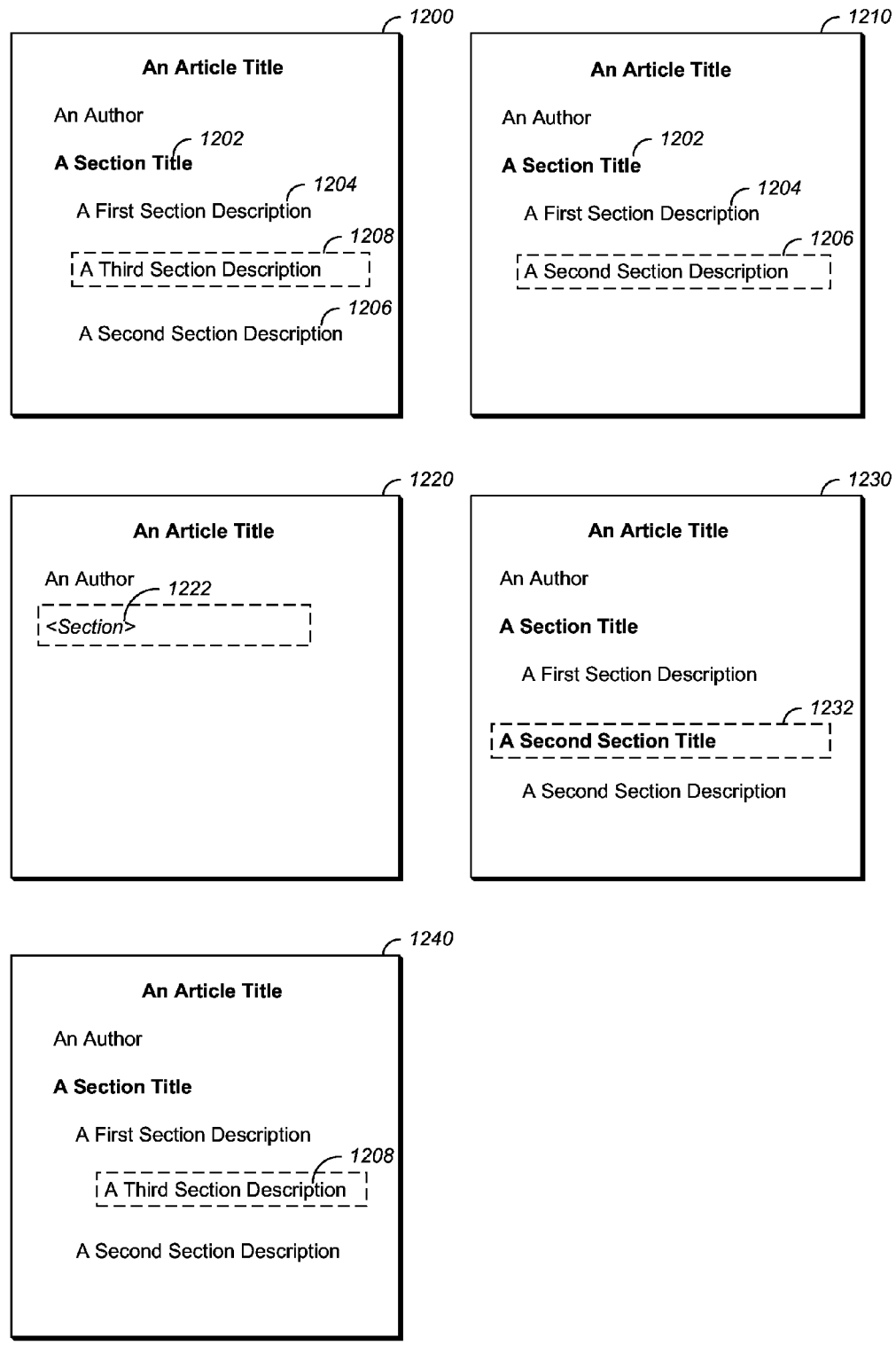
FIG. 12 shows another diagram of an example of a portion of an interface for template and content aware document and template editing of a document generated based on a template in accordance with implementations of this disclosure.

FIGS. 5, 10-16, 27, and 31 show examples of interfaces for template and content aware document and template editing of a document generated based on a template in accordance with implementations of this disclosure. The aspects shown in FIGS. 5, 10-16, 27, and 31 may include receiving input, such as the input receiving shown at 850 in FIG. 8, altering a document tree, such as the document tree altering shown at 860 in FIG. 8, and outputting a document, such as the document outputting shown at 870 in FIG. 8. For simplicity, FIGS. 10-12 are described in relation to Template 2 shown in FIG. 9.

FIG. 10 shows a diagram of an example of a portion of an interface for template and content aware document and template editing of a document generated based on a template in accordance with implementations of this disclosure. For example, a document generated based on Template 2 may be output by a document editor, such as the document editor 410 shown in FIG. 4, as a document interface 1000 shown in FIG. 10.

In some implementations, the interface 1000 may include a placeholder token for an object. For example, the productivity application may identify a rule in the template specification indicating an object that includes placeholder content, the productivity application may generate a document tree for a document associated with the template, which may include determining that the document includes placeholder content corresponding to the object, and the productivity application may output an interface for the document including the placeholder content as a placeholder token representing the object. In some implementations, the productivity application may distinguish a placeholder token from content of the document. For example, content may be output using a first style, such as black font color, and a placeholder indication may be output using a different style, such as grey font color, or an italicized font face. For example, FIG. 10 shows a placeholder token for the 'Title' object 1002, a placeholder token for the first 'Author' object 1004, and a placeholder token for the first 'Section' object 1006. For clarity, the placeholder token for the 'Title' object 1002, the placeholder token for the first 'Author' object 1004, and the placeholder token for the first 'Section' object 1006 are shown in FIG. 10 using italics.

In some implementations, the productivity application may receive input data setting the interface focus on an object represented by a placeholder token, such as the 'Title' object. In some implementations, the interface may be updated to include a text entry interface element 1012, as shown in document interface 1010. In some implementations, the productivity application may update the document tree to include the text entry interface element 1012, to indicate the current, in-focus, element, or both.

In some implementations, the productivity application may receive input data indicating text, such as a string of one or more character keystrokes, entered into a text entry interface element, such as the text entry interface element 1012 shown in document interface 1010, and the interface may be updated to include the text 1022 as shown in document interface 1020. In some implementations, the interface may be updated to omit the placeholder token. In some implementations, the productivity application may update the document tree to include the received text, to omit the placeholder token, or both.

In some implementations, the productivity application may receive input data removing focus from an object represented by a placeholder token, such as the text entry interface element 1012 shown in object interface 1010. For example, the productivity application may receive input data indicating a key press for the 'Enter' or 'Return' key. In some implementations, the productivity application may set focus to another object, such as the 'Author' object, and may update the interface to indicate focus on the second object as shown in document interface 1030. In some implementations, the productivity application may update the document tree to indicate the current element.

In some implementations, the productivity application may determine whether an object is associated with a one-or-more modifier, and may determine whether the object is associated with content. For example, as shown in document interface 1030, the 'Author' object may have focus, and the productivity application may receive input data indicating text and a completion indicator, such as the 'Enter' or 'Return' key. The productivity application may determine that the 'Author' object is associated with a one-or-more modifier, and the productivity application may update the interface to include the text 1042, to include another instance of the 'Author' object 1044, and to set focus on the other instance of the 'Author' object 1044 as shown in document interface 1040. In some implementations, the productivity application may update the document tree to include the input text 1042 and to include the second instance of the 'Author' object 1044.

In another example, an object instance, such as the second 'Author' object 1044, may have focus, the productivity application may receive input data indicating a change in focus, such as a completion indicator, the productivity application may determine that the object is not associated with content, and the productivity application may update the interface to omit the object and set focus on another object, such as the 'Section' object, as shown in document interface 1050. In some implementations, the productivity application may update the document tree to omit the second instance of the 'Author' object, to indicate the current element, or both.

In some implementations, the productivity application may determine whether an object, such as the 'Section' object, includes an object, such as the 'Description' object, that is associated with an optional modifier. For example, the 'Section' object may have focus, as shown in document interface 1050, and the productivity application may receive input data indicating text and a completion indicator, such as the 'Enter' or 'Return' key. The productivity application may update the interface, as shown in document interface 1060, to include the input text 1062, may determine that the 'Section' object includes a 'Description' object that is associated with the optional modifier, and may update the interface to include a text entry interface element associated with the optional object 1064. In some implementations, the productivity application may update the interface to include a placeholder token 1066, such as an ellipsis, representing the optional object. In some implementations, the productivity application may update the document tree to include the received text, to include the optional object, to include the placeholder token 1066, or any combination thereof.

FIG. 11 shows another diagram of an example of a portion of an interface for template and content aware document and template editing of a document generated based on a template in accordance with implementations of this disclosure. For example, a document generated based on Template 2 may be output as a document interface 1100 as shown in FIG. 11.

In some implementations, the productivity application may determine that the document includes an instance of an object that is associated with a zero-or-more modifier or a one-or-more modifier, and the productivity application may include other instances of the object in the document. For example, an optional object, such as the optional description object 1102 shown in document interface 1100, may have focus, the productivity application may receive input data indicating text and a completion indicator, and, as shown in document interface 1110, the productivity application may update the interface to include the text 1112 and to include another instance of the optional object 1114. In some implementations, the productivity application may update the document tree to include the received text 1112, the optional object 1114, or both.

In another example, the second instance of the optional 'Description' object 1114 may have focus, the productivity application may receive input data indicating text and a completion indicator, and, as shown in document interface 1120, the productivity application may update the interface to include the text 1122, and to include a third instance of the optional 'Description' object 1124. In some implementations, the productivity application may update the document tree to include the received text 1122, the third instance of the optional 'Description' object 1124, or both.

In another example, the third instance of the optional 'Description' object 1124 may have focus, the productivity application may receive input data indicating a completion indicator, the optional object may not be associated with content, and, as shown in document interface 1130, the productivity application may update the interface to omit the optional 'Description' object and to include another instance of the 'Section' object 1132. In some implementations, the productivity application may update the document tree to omit the optional 'Description' object 1124, to include the other instance of the 'Section' object 1132, or both.

In some implementations, the productivity application may insert an object between two objects. For example, as shown in document interface 1140, the document may include content associated with a first 'Description' object 1142, and content associated with a second 'Description' object 1144 adjacent to the first 'Description' object in the interface. The first 'Description' object 1142 may have focus, the productivity application may receive input data including a completion indicator, and the productivity application may update the interface, as shown in document interface 1150, to include a third 'Description' object 1152, between the first 'Description' object 1142 and the second 'Description' object 1144. In some implementations, the productivity application may update the document tree to include the third instance of the 'Description' object 1124.

FIG. 12 shows another diagram of an example of a portion of an interface for template and content aware document and template editing of a document generated based on a template in accordance with implementations of this disclosure. For example, a document generated based on Template 2 may be output as a document interface 1200 as shown in FIG. 12.

In some implementations, the productivity application may remove an object. For example, as shown in document interface 1200, a document may include a first 'Section' object 1202, which may include a first 'Description' object 1204, a second 'Description' object 1206, and a third 'Description' object 1208. The third 'Description' object 1208 may have focus, and the productivity application may receive input indicating a deletion of the content associated with the third 'Description' object 1208, which may include a completion indication. The productivity application may update the interface to omit the third 'Description' object 1208 as shown in document interface 1210. In some implementations, the productivity application may update the document tree to omit the third the 'Description' object 1208.

In some implementations, the productivity application may receive input data indicating the deletion of the content associated with an object, which may include the deletion of content associated with one or more objects included in the object. For example, the productivity application may receive input data indicating the deletion of the content associated with second 'Description' object 1206, deletion of the content associated with first 'Description' object 1204, and deletion of the content associated with 'Section' 'Title' object 1202. The productivity application may update the interface, as shown in document interface 1220, to omit the deleted content and to include a placeholder token 1222 representing the 'Section' object. In some implementations, the productivity application may update the document tree to omit the 'Section' object, the first 'Description' object, and the second 'Description' object.

In some implementations, the productivity application may receive input data changing the association of content from one object to another. For example, the third 'Description' object 1208 shown in document interface 1200 may have focus, the productivity application may receive input indicating text, such as the text 'A Second Section Title', and input data, such as the tab key or the shift-tab key sequence, indicating a change in association for the content from the 'Description' object 1208, to a 'Title' object of a 'Section' object. The productivity application may update the interface, as shown in document interface 1230, to omit the third 'Description' object, and to include the text as the content of a 'Title' object of a second 'Section' object 1232 in place of the omitted third 'Description' object. In some implementations, the productivity application may update the document tree to omit the third 'Description' object, to include the second 'Section' object, to associate the content with the second 'Section' object, and to change the association for the second 'Description' object from the first 'Section' object, to the second 'Section' object.

In some implementations, the productivity application may receive input data changing the relative horizontal positioning, or indentation, of an object. For example, the third 'Description' object 1208 shown in document interface 1200 may have focus, the productivity application may receive input indicating an increase in indentation, such as the tab key. The productivity application may update the interface to increase the indentation of the third 'Description' object 1208, as shown in document interface 1240. Although not explicitly shown in FIG. 12, the productivity application may receive input data indicating a decrease in indentation, such as the shift-tab key sequence, and the productivity application may update the interface to decrease the indentation of the current object.

Figure 13:
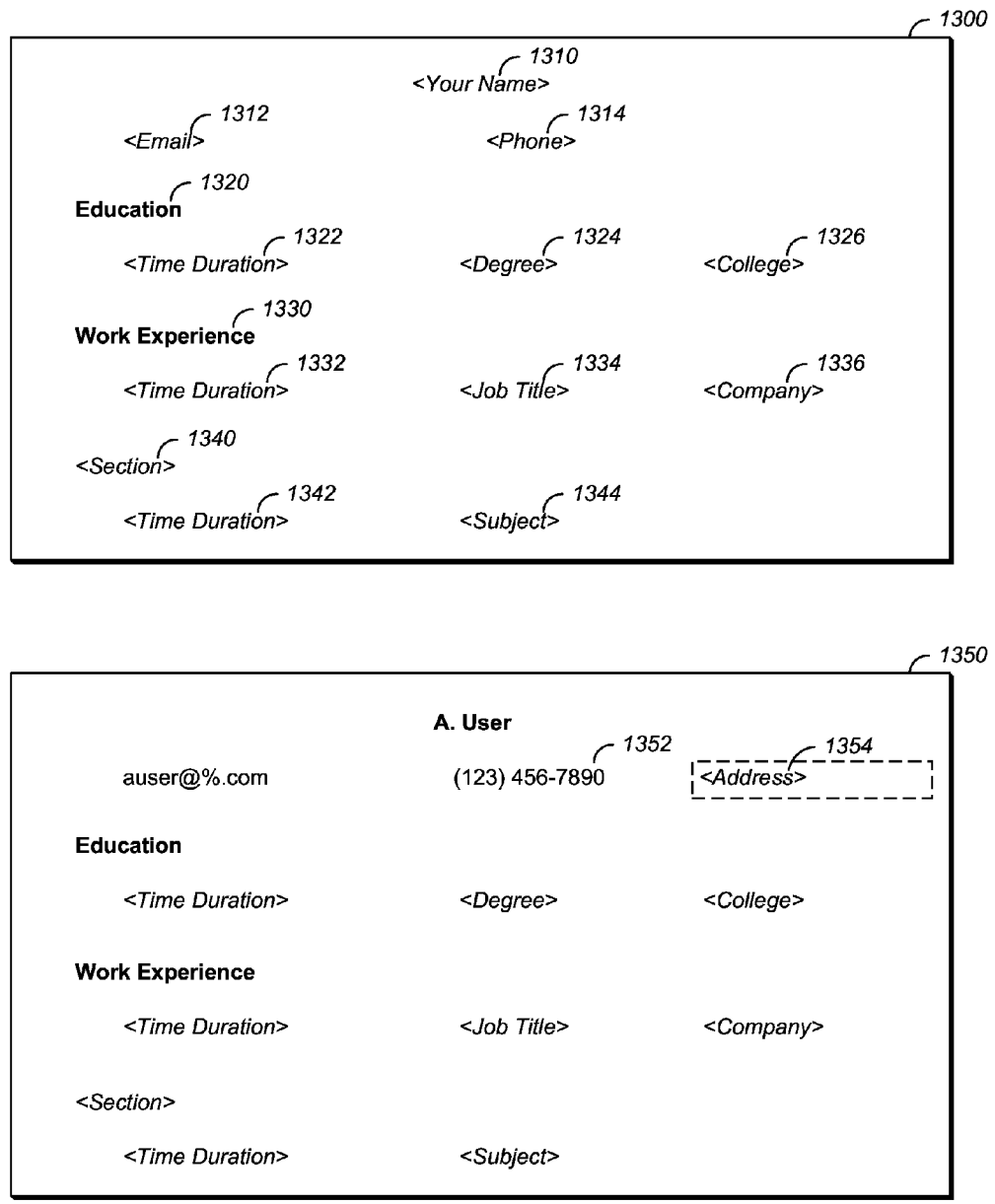
FIG. 13 shows another diagram of an example of a portion of an interface for template and content aware document and template editing of a document generated based on a template in accordance with implementations of this disclosure.
Figure 15:
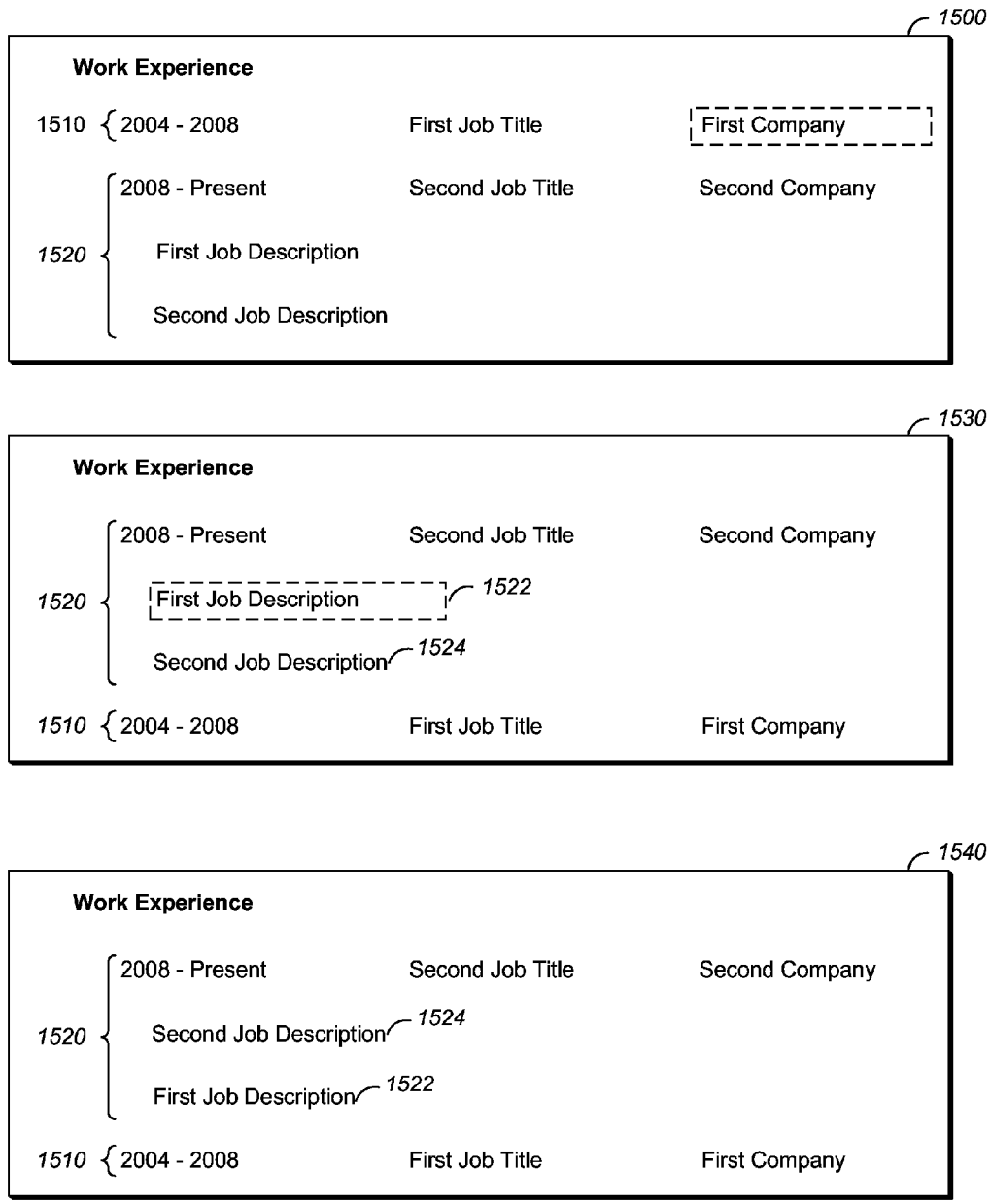
FIG. 15 shows another diagram of an example of a portion of an interface for template and content aware document and template editing of a document generated based on a template in accordance with implementations of this disclosure.

For simplicity, FIGS. 13-15 are described in relation to Template 3 shown in FIG. 9.

FIG. 13 shows another diagram of an example of a portion of an interface for template and content aware document and template editing of a document generated based on a template in accordance with implementations of this disclosure. For example, a document generated based on Template 3 may be output as a document interface 1300 as shown in FIG. 13.

In some implementations, an object definition may include express content. For example, in Template 3, the 'EducationTitle' object includes a the express content "Education" delimited using the string modifier, and the 'ExperienceTitle' object includes the express content "Work Experience" delimited using the string modifier. In some implementations, a document generated based a template that includes express content, such as Template 3, may include the express content. In some implementations, the productivity application may include the express content in the interface as content.

For example, as shown in FIG. 13, the document interface 1300 includes a 'Your Name' placeholder token 1310 representing the 'Name' object, an 'Email' placeholder token 1312 representing the 'Email' object, a 'Phone' placeholder token 1314 representing the 'Phone object, the 'Education' express content 1320, a 'Time Duration' placeholder token 1322 representing the 'Duration' object of a first 'EducationItem' object, a 'Degree' placeholder token 1324 representing the 'Degree' object of the first 'EducationItem' object, a 'College' placeholder token 1326 representing the 'College' object of the first 'EducationItem' object, the 'Work Experience' express content 1330, a 'Time Duration' placeholder token 1332 representing the 'Duration' object of a first 'Job' object, a 'Job title' placeholder token 1334 representing the 'JobTitle' object of the first 'Job' object, a 'Company' placeholder token 1336 representing the 'Company' object of the first 'Job' object, a 'Section' placeholder token 1340 representing the 'Title' object of a first 'Item' object of the first 'Section' object, a 'Time duration' placeholder token 1342 representing the 'Duration' object of the first 'Item' object of the first 'Section' object, and a 'Subject' placeholder token 1344 representing the 'Subject' object of the first 'Item' object of the first 'Section' object.

In some implementations, a template, such as Template 3, may include an optional object, which may be indicated by the optional modifier. For example, in Template 3 the 'ContactInfo' object includes an optional 'Address' object. In some implementations, the productivity application may omit the optional object from the interface, as shown in document interface 1300. In some implementations, the productivity application may receive input data setting focus on the optional object. For example, the 'Phone' object 1314 may have focus, the productivity application may receive input data indicating text, such as a phone number, and including a completion identifier. The productivity application may update the interface, as shown in document interface 1350, to include the text as content 1352 for the 'Phone' object, and to include a placeholder token 1354 for the optional 'Address' object. In some implementations, the productivity application may update the document tree to include the received text 1352, the placeholder token 1354, or both. In some implementations, the productivity application may receive input data including a completion indicator for the 'Address' object 1354, may determine that the 'Address' object 1354 is not associated with content, and may update the interface to omit the optional 'Address' object. In some implementations, the productivity application may update the document tree to omit the optional 'Address' object.

FIG. 14 shows another diagram of an example of a portion of an interface for template and content aware document and template editing of a document generated based on a template in accordance with implementations of this disclosure. For example, a document generated based on Template 3 may be output as a document interface 1400 as shown in FIG. 14.

In some implementations, the relative position of two instances of an object may be swapped. For example, as shown in document interface 1400, a document may include a first instance of an 'EducationItem' object 1410, which may include a first instance of a 'Duration' object 1412, a first instance of a 'Degree' object 1414, and a first instance of a 'College' object 1416. The document may include a second instance of the 'EducationItem' object 1420, which may include a second instance of a 'Duration' object 1422, a second instance of a 'Degree' object 1424, and a second instance of a 'College' object 1426. In an example, the first instance of the 'Duration' object 1412, the first instance of the 'Degree' object 1414, or the first instance of the 'College' object 1416 may have focus, the productivity application may receive input data indicating a position change, such as the Alt-Down key sequence, and the productivity application may swap the relative position of the first 'EducationItem' object 1410 with the second 'EducationItem' object 1420, as shown in document interface 1450. In another example, the second instance of the 'Duration' object 1422, the second instance of the 'Degree' object 1424, or the second instance of the 'College' object 1426 may have focus, the productivity application may receive input data indicating a position change, such as the Alt-Up key sequence, and the productivity application may swap the relative position of the second 'EducationItem' object 1420 with the first 'EducationItem' object 1410. In some implementations, the productivity application may update the document tree to indicate the position information.

FIG. 15 shows another diagram of an example of a portion of an interface for template and content aware document and template editing of a document generated based on a template in accordance with implementations of this disclosure. For example, a document generated based on Template 3 may be output as a document interface 1500 as shown in FIG. 15.

In some implementations, the relative position of two instances of an object may be swapped within another object. For example, as shown in document interface 1500, a document may include a first instance of a 'Job' object 1510, which may include a first instance of a 'Duration' object, a first instance of a 'JobTitle' object, and a first instance of a 'Company' object. The document may include a second instance of the 'Job' object 1520, which may include a second instance of the 'Duration' object, a second instance of the 'JobTitle' object, a second instance of the 'Company' object, a first instance of a 'Description' object 1522 for the second 'Job' object, and a second instance of the 'Description' object 1524 for the second 'Job' object.

In an example, the first instance of the 'Duration' object, the first instance of the 'JobTitle' object, or the first instance of the 'Company' object may have focus, the productivity application may receive input data indicating a position change, such as the Alt-Down key sequence, and the productivity application may swap the relative position of the first 'Job' object 1510 with the second 'Job' object 1520, as shown in document interface 1530. In some implementations, the productivity application may update the document tree to indicate the position information.

In another example, the first instance of the 'Description' object 1522 for the second 'Job' object, or the second instance of the 'Description' object 1524 for the second 'Job' object may have focus as shown in document interface 1530, the productivity application may receive input data indicating a position change, such as the Alt-Up key sequence, and the productivity application may swap the relative position of the first instance of the 'Description' object 1522 for the second 'Job' object and the second instance of the 'Description' object 1524 for the second 'Job' object as shown in document interface 1540. In some implementations, the productivity application may update the document tree to indicate the position information.

Figure 16:
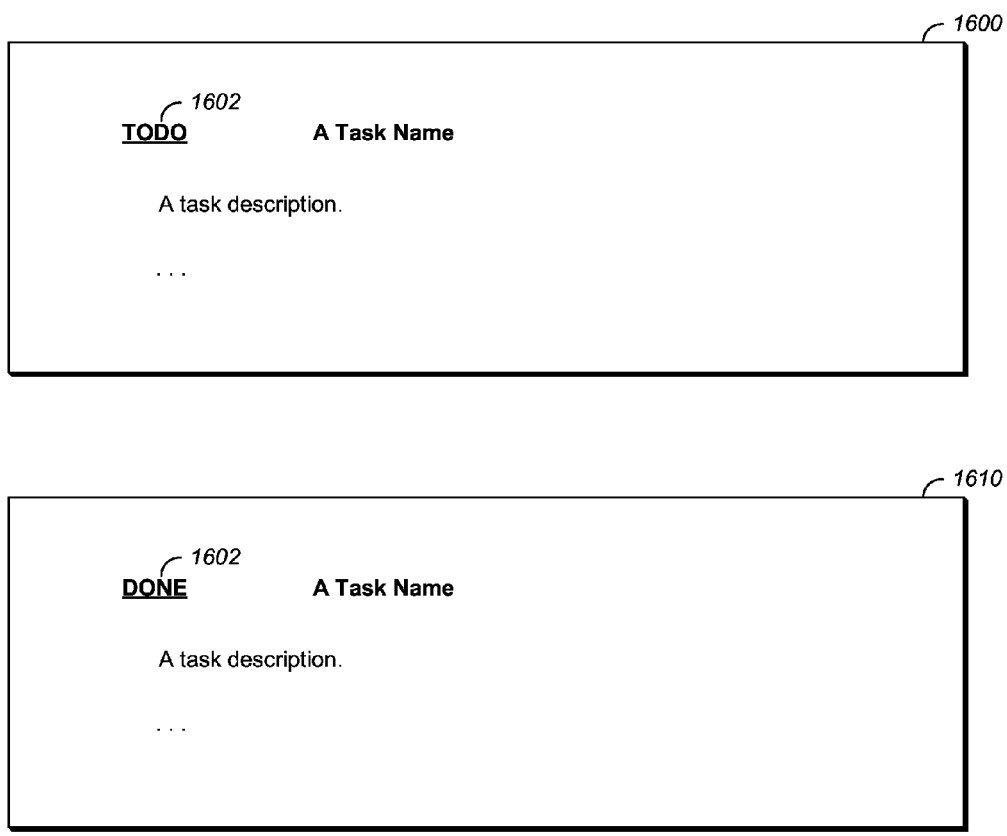
FIG. 16 shows another diagram of an example of a portion of an interface for template and content aware document and template editing of a document generated based on a template in accordance with implementations of this disclosure.

FIG. 16 shows another diagram of an example of a portion of an interface for template and content aware document and template editing of a document generated based on a template in accordance with implementations of this disclosure. For example, a document generated based on Template 1 may be output as a document interface 1600 as shown in FIG. 16.

In some implementations, an object, such as the 'Status' object 1602 shown in FIG. 16, may include a set of objects that are associated with an alternate modifier, such as (Pending|Finished), and the content included in the document and the interface may be alternated between the objects. For example, the content "TODO" of the 'Status' object 1602 may have focus, the productivity application may receive input data indicating a change in the content, such as the Tab key or the shift-tab key sequence, and the productivity application may update the interface to omit the content 'TODO' and include the content 'DONE' as shown in document interface 1610. In some implementations, the productivity application may update the document tree to omit the content 'TODO' and include the content 'DONE'. In some implementations, alternating between the objects may include indicating that an object is an active object and indicating that another object is an inactive objet.

In some implementations, the productivity application may distinguish the content of objects associated with an alternate modifier in the interface. For example, a first alternate may be output using a first style, such as red font color, and a second alternate may be output using a different style, such as green font color. For clarity, the 'TODO' and 'DONE' content is shown underlined.

Although not shown in FIGS. 8-16, template and content aware document and template editing may include validating content. For example, a date format may be defined for a date object and content input for an instance of the date object may be validated against the defined date format. In some implementations, content may be included in a document based on a data source, such as a database or another document or template. For example, a document may include a user identification object, the productivity application may receive input data indicating content for the user identification object, such as a user ID, and the productivity application may receive content for one or more other objects, such as a user name object or an e-mail object, from a data source based on the user ID.

Figure 17:
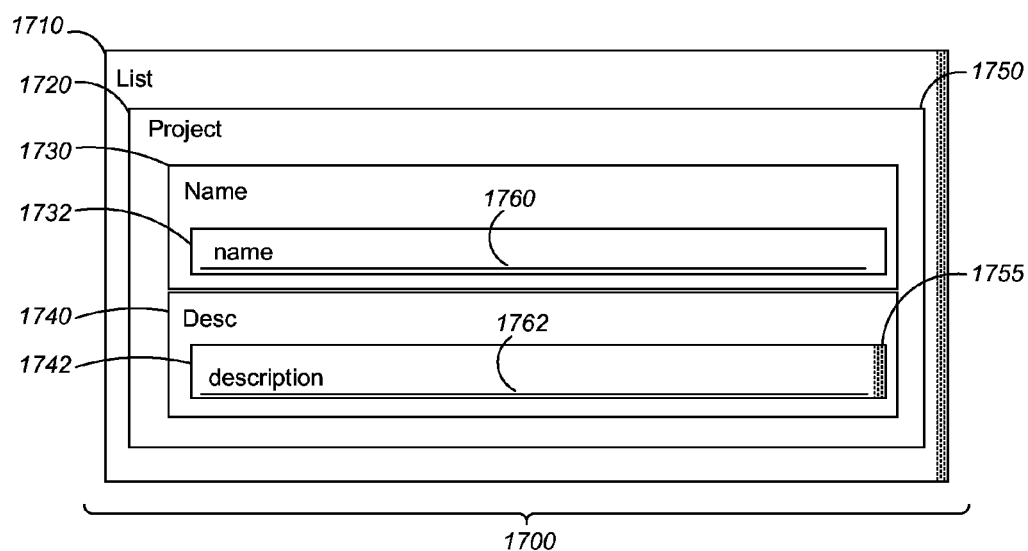
FIG. 17 shows a diagram of an example of a portion of a template implementation and a portion of a corresponding interface for template and content aware document and template editing of a template in accordance with implementations of this disclosure.

FIG. 17 shows a diagram of an example of a portion of a template implementation and a portion of a corresponding interface for template and content aware document and template editing of a template in accordance with implementations of this disclosure. In some implementations, a template, such as the template 420 shown in FIG. 4, may be created, accessed, or edited in an interface, such as an interface of the data model editor 440 shown in FIG. 4, an interface of the presentation editor 430 shown in FIG. 4, or an interface of a combined data model and presentation editor 450. For example, Template 4 may indicate a portion of a template for a list of projects, and template structure 1700 may be an interface, or a portion of an interface, for creating, accessing, or modifying Template 4. In some implementations, a template may be output by a template editor, such as the template editor 450 shown in FIG. 4, as a template interface as shown in FIG. 17.

In some implementations, template and content aware document and template editing of a template may include one or more user devices, such as the computing device 100 shown in FIG. 1 or the computing and communication devices 100A/100B shown in FIG. 2, creating, accessing, or editing one or more templates via a productivity application, which may be a networked application, such as the networked application 300 shown in FIG. 3, executed by a server, which may be a computing device, such as the computing device 100 shown in FIG. 1 or the computing and communication devices 100C shown in FIG. 2.

In some implementations, an interface for template and content aware document and template editing of a template may include a representation of a template structure 1700. In some implementations, the template structure 1700 may represent a template as a hierarchical collection of template elements or blocks 1710-1742.

In an example, Template 4 includes a first rule "List=Project+", which includes a 'List' object as the first, or root, object in the template and includes an object definition for the 'List' object indicating that the 'List' object includes a 'Project' object. The 'List' object may be represented in the template structure as a 'List' block 1710, and the 'Project' object may be represented in the template structure as a 'Project' block 1720 within the 'List' block 1710.

In another example, Template 4 includes an object definition for the 'Project' object that indicates that the 'Project' object includes a 'Name' object and a 'Desc' object, and the template structure 1700 includes a 'Name' block 1730 representing the 'Name' object and a 'Desc' block 1740 representing the 'Desc' object, within the 'Project' block 1720.

In another example, Template 4 includes an object definition for the 'Name' object of the 'Project' object that indicates that the 'Name' object includes a 'text' object, and the template structure 1700 includes a 'text' block 1732 representing the 'text' object within the 'Name' block 1730. Template 4 includes an object definition for the 'Desc' object of the 'Project' object that indicates that the 'Desc' object includes a 'text' object, and the template structure 1700 includes a 'text' block 1742 representing the 'text' object within the 'Desc' block 1740.

In some implementations, the interface may include a repeatable block indicator 1750/1752 that may indicate that a block is a repeatable block, which may indicate that a document created based on the template may include one or more instances of the object corresponding to the repeatable block. For example, Template 4 includes the rule "List=Project+", which indicates that the 'Project' object is associated with the one-or-more modifier, and interface represents the 'Project' block using a repeatable indicator 1750. Although the repeatable indicator 1750 is shown using multiple vertical lines along the right edge of the block, any indication that a block is a repeatable block may be used.

In some implementations, the interface may include an optional block indicator (not shown) that may indicate that a block is an optional block, which may indicate that a document created based on the template may include zero or more instances of the object corresponding to the optional block. Although not shown in FIG. 17, an optional block indicator may include using, for example, a broken boarder for the block, or any other indication that a block is a repeatable block may be used.

In some implementations, the interface may represent an object as a text entry block using, for example, a text entry indicator 1760/1762, and may include content, such as placeholder content, of the object. For example, Template 4 includes an object definition for the 'Name' object that indicates that the 'Name' object includes a 'text' object that includes the placeholder content "name", and the interface includes a text entry indicator 1760 and the placeholder content "name" within the 'text' block 1732 within the 'Name' block 1730. Although the text entry indicator 1760/ 1762 is shown as a horizontal line, any indication that a block includes an editable text entry may be used. In some implementations, an indication that a block includes an editable text entry may be omitted.

FIGS. 18-23 show examples of an interface for template and content aware document and template editing of a template in accordance with implementations of this disclosure. For simplicity FIGS. 18-23 are described in relation to Template 4 shown in FIG. 17.

Figure 18:
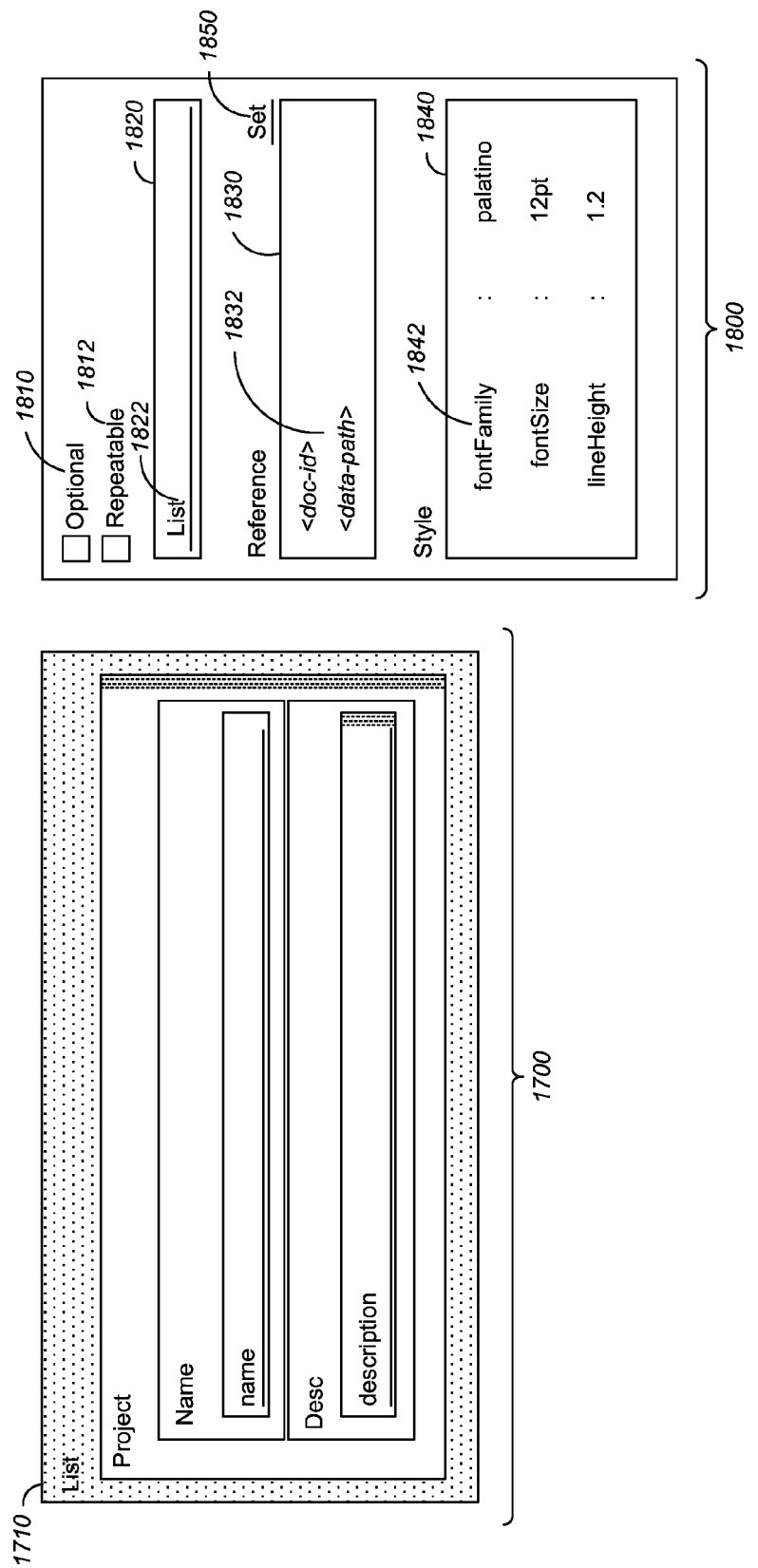
FIG. 18 shows an example of a portion of an interface for template and content aware document and template editing of a template in accordance with implementations of this disclosure.

FIG. 18 shows an example of a portion of an interface for template and content aware document and template editing of a template in accordance with implementations of this disclosure. In some implementations, a template, such as Template 4 shown in FIG. 17, may be created, accessed, or edited in a template editor interface, such as an interface of the combined data model and presentation editor 450 shown in FIG. 4, which may include a representation of a template structure 1700 and a representation of a block editor 1800. In some implementations, the template structure 1700 may represent a portion of a data model editor, such as the data model editor 440 shown in FIG. 4.

In some implementations, the block editor 1800 may include a representation of a portion of the data model editor. For example, the block editor 1800 may represent properties or parameters associated with the block. In some implementations, the block editor 1800 may include a representation of structural information, such as modifier information 1810/1812, object identification information 1820, data source information 1830, or any other structural information, or combination of information, associated with a block or a corresponding object or object definition.

In some implementations, the block editor 1800 may include a representation of a presentation editor, or a portion thereof, such as the presentation editor 430 shown in FIG. 4. For example, the block editor 1800 may include a representation of presentation information 1840, or any other presentation information, or combination of information, associated with a block or a corresponding object or object definition.

In some implementations, a block of the template structure 1700 may be selected in the interface. For example, the productivity application may receive input data, such as user input data, indicating a selection of a block, such as a mouse pointer hovering over a block or clicking on a block. In some implementations, the interface may include an indication of a selected block in the template structure 1700. For example, as shown in FIG. 18, the 'List' block 1710 may be the selected block and the interface may indicate that the 'List' block 1710 is the selected block by, for example, changing a fill color of the block or changing an outline color of the block. In FIG. 18, the selected block 1710 is indicated using stippling.

In some implementations, the block editor 1800 may represent information associated with the selected block 1710. For example, in FIG. 18, the 'List' block corresponding to the 'List' object, is the selected block 1710 and the block editor 1800 represents information, such as properties and parameters, of the 'List' object.

In some implementations, the block editor 1800 may include a representation of structural modifier information 1810/1812. For example, the object corresponding to the selected block may be associated with the optional modifier and the block editor 1800 may indicate that the selected block is optional (not shown). In another example, the object corresponding to the selected block may be associated with the one-or-more modifier and the block editor 1800 may indicate that the selected block is repeatable (not shown). In some implementations, the structural modifier information may be modified. For example, the productivity application may receive input data, such as user input data, selecting one or more of the modifiers and the template may be updated to include the modifier for the object corresponding to the selected block, or the productivity application may receive input data, such as user input, deselecting one or more of the modifiers and the template may be updated to remove the modifier for the object corresponding to the selected block. In the example shown in FIG. 18, the selected block is the 'List' block 1710 and the corresponding 'List' object is not optional and not repeatable as indicated in Template 4.

In some implementations, the block editor 1800 may include a representation of object identification information 1820. For example, the object identification information 1820 may include a name 1822 of the object associated with the selected block. In the example shown in FIG. 18, the selected block is the 'List' block 1710 and the object identification information 1820 includes the name 'List' of the corresponding 'List' object. In some implementations, the object identification information 1820 may be editable. For example, the productivity application may receive input data, such as user input data, creating or modifying the name of the object and the template may be updated to include the new or modified name for the object.

In some implementations, the block editor 1800 may include a representation of data source information 1830. In some implementations, an object may not be associated with data source information and the block editor 1800 may include placeholder data source information 1832 as the data source information 1830. In the example shown in FIG. 18, the selected block is the 'List' block 1710 and the corresponding 'List' object is not associated with data source information, as shown in Template 4, and the data source information 1830 includes placeholder data source information 1832. In some implementations, data source information 1830 may be editable. For example, the productivity application may receive input data, such as user input data, creating or modifying the data source information 1830 and the template may be updated to incorporate the received data source information. In some implementations, the productivity application may receive input data creating or modifying the data source information 1830, may update the interface to incorporate the received data source information, may omit updating the template, and may update the template in response to input, such as user input, indicating a request to update the data source information. For example, the block editor 1800 may include an interface element, such as the 'Set' link 1850 shown, or any other interface element capable of indicating a request to update the data source information, and the productivity application may update the template to incorporate the data source information 1830 in response to input indicating the 'Set' link 1850.

In some implementations, the block editor 1800 may include a representation of presentation information 1840. For example, the presentation information 1840 may include information for presentation of an instance of an object corresponding with the selected block 1710 in a document generated based on the template, which may include cascading style sheet information 1842, or any other information capable of describing the presentation of content. In the example shown in FIG. 18, the selected block is the 'List' block 1710 and the object definition for the corresponding 'List' object includes the presentation information shown in Template 4.

Figure 19:
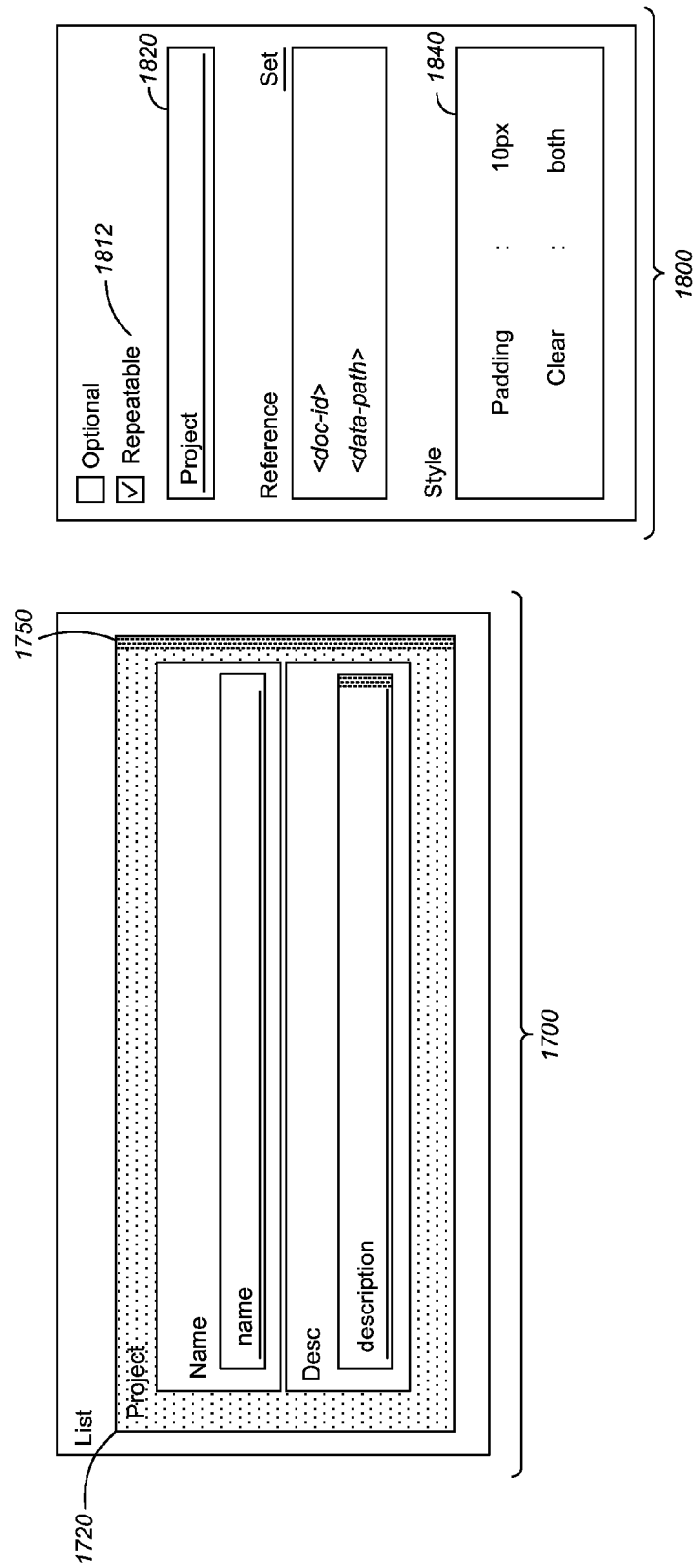
FIG. 19 shows an example of an interface for template and content aware document and template editing of a template in accordance with implementations of this disclosure.

FIG. 19 shows an example of an interface for template and content aware document and template editing of a template in accordance with implementations of this disclosure. In the example shown in FIG. 19, the selected block in the template structure 1700 is the 'Project' block 1720, which corresponds with the 'Project' object shown in Template 4. In Template 4, the object definition of the 'List' object indicates that the 'List' object includes the 'Project' object associated with the one-or-more modifier, the 'Project' block includes the repeatable block indicator 1750, and the block editor 1800 includes structural modifier information 1812 indicating that the object associated with the selected block is repeatable. In the example shown in FIG. 19, the object identification information 1820 includes the name 'Project' of the corresponding 'Project' object and the presentation information 1840 includes the presentation information indicated in the object definition for the 'Project' object shown in Template 4. In FIG. 19, the selected block 1720 is indicated using stippling.

FIG. 20 shows an example of an interface for template and content aware document and template editing of a template in accordance with implementations of this disclosure. In the example shown in FIG. 20, the selected block in the template structure 1700 is the 'Name' block 1730, which corresponds with the 'Name' object shown in Template 4. In the example shown in FIG. 20, the object identification information 1820 includes the name 'Name' of the corresponding 'Name' object and the presentation information 1840 includes the presentation information indicated in the object definition for the 'Name' object shown in Template 4. In FIG. 20, the selected block 1730 is indicated using stippling.

Figure 21:
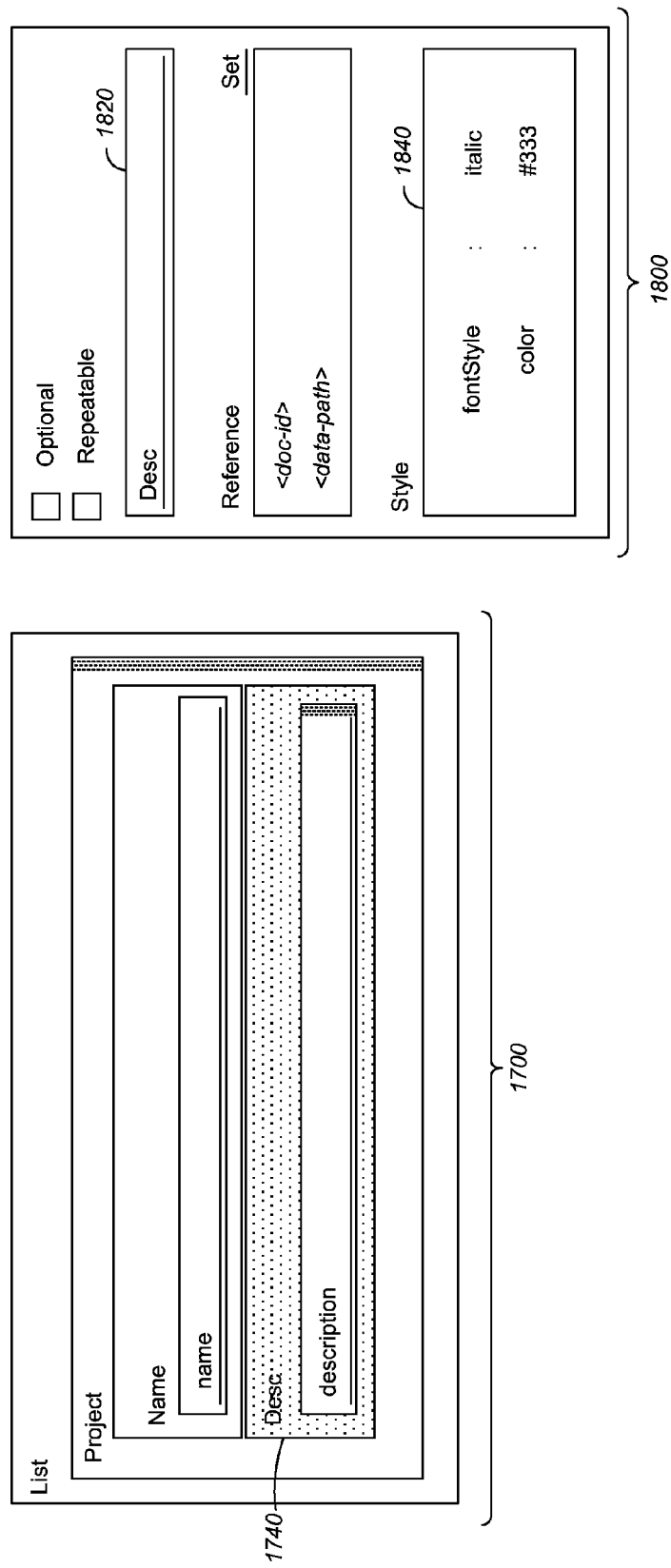
FIG. 21 shows an example of an interface for template and content aware document and template editing of a template in accordance with implementations of this disclosure.

FIG. 21 shows an example of an interface for template and content aware document and template editing of a template in accordance with implementations of this disclosure. In the example shown in FIG. 21, the selected block in the template structure 1700 is the 'Desc' block 1740, which corresponds with the 'Desc' object shown in Template 4. In the example shown in FIG. 21, the object identification information 1820 includes the name 'Desc' of the corresponding 'Desc' object and the presentation information 1840 includes the presentation information indicated in the object definition for the 'Desc' object shown in Template 4. In FIG. 21, the selected block 1740 is indicated using stippling.

Figure 22:
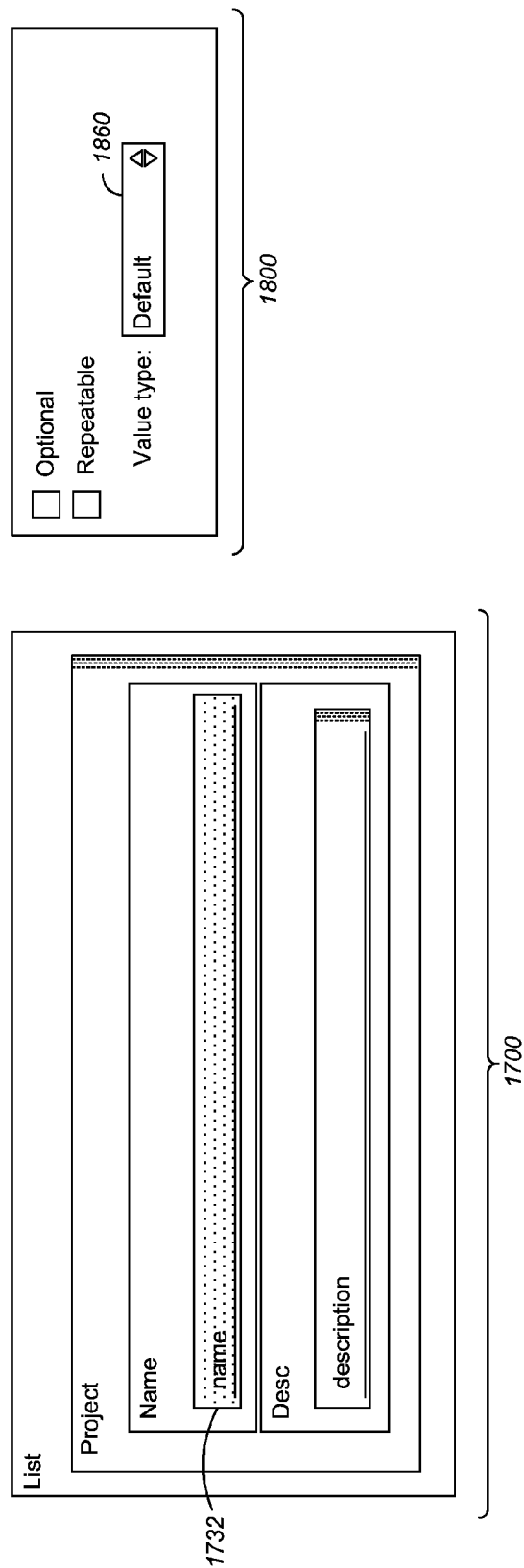
FIG. 22 shows an example of an interface for template and content aware document and template editing of a template in accordance with implementations of this disclosure.

FIG. 22 shows an example of an interface for template and content aware document and template editing of a template in accordance with implementations of this disclosure. In some implementations, the selected block may be a system object and the block editor 1800 may include a representation of value type information 1860 for the selected block. For example, in FIG. 22, the selected block in the template structure 1700 is the 'text' block 1732 of the 'Name' block and the value type information 1860 indicates that the value type for the corresponding 'text' object is a default type. In FIG. 22, the selected block 1732 is indicated using stippling.

Figure 23:
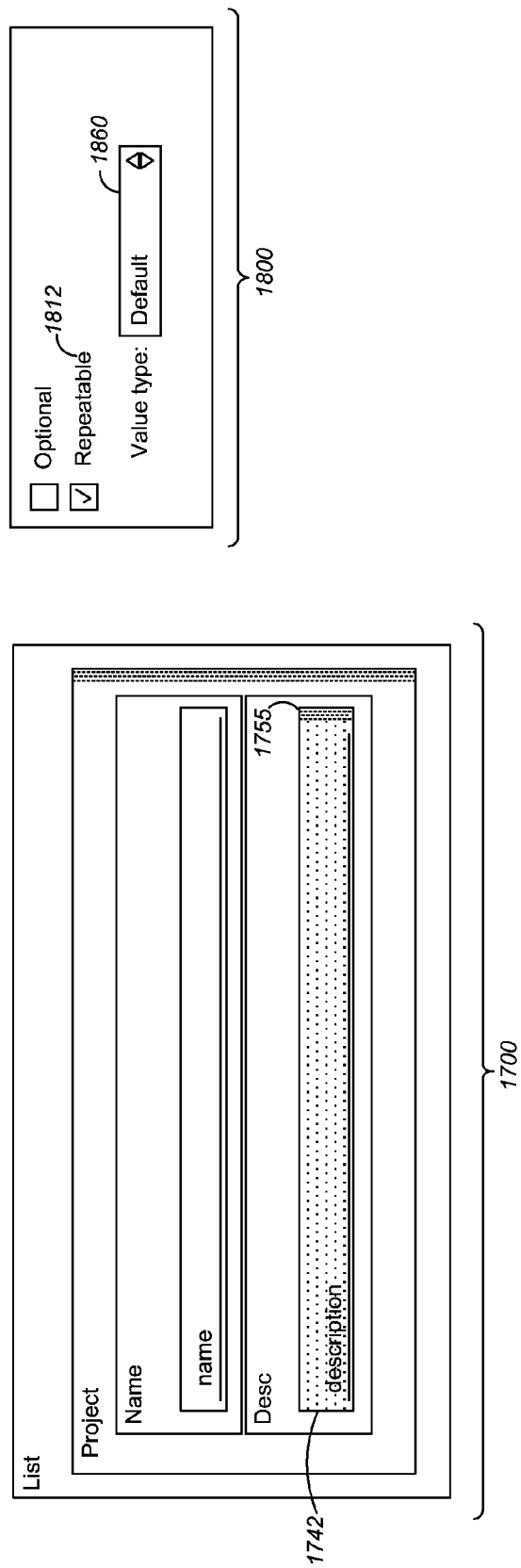
FIG. 23 shows an example of an interface for template and content aware document and template editing of a template in accordance with implementations of this disclosure.

FIG. 23 shows an example of an interface for template and content aware document and template editing of a template in accordance with implementations of this disclosure. In some implementations, the selected block may be a system object and the block editor 1800 may include a representation of value type information 1860 for the selected block. For example, in FIG. 22, the selected block in the template structure 1700 is the 'text' block 1732 of the 'Name' block and the value type information 1860 indicates that the value type for the corresponding 'text' object is a default type. In Template 4, the object definition of the 'Desc' object indicates that the 'Desc' object includes a 'text' object associated with the one-or-more modifier, the 'text' block of the 'Desc' block includes the repeatable block indicator 1755, and the block editor 1800 includes structural modifier information 1812 indicating that the object associated with the selected block is repeatable and value type information 1860 indicating that the value type for the corresponding 'text' object is 'default'. In FIG. 23, the selected block 1742 is indicated using stippling.

FIGS. 24-32 show examples of template and content aware document and template editing including dynamic content in accordance with implementations of this disclosure. FIGS. 24-27 show examples of template and content aware document and template editing dynamic content generation in accordance with implementations of this disclosure. The template described in the examples shown in FIGS. 24-27 is a template for a list of projects and the document described in the examples shown in FIGS. 24-27 is a list of projects. FIGS. 28-31 show examples of template and content aware document and template editing dynamic content filtering in accordance with implementations of this disclosure. The template described in the examples shown in FIGS. 28-31 is a template for a resume and the document described in the examples shown in FIGS. 28-31 is a list of projects. The resume template and resume document described in the examples shown in FIGS. 28-31 include elements, such as content and structure, from the project list document and project list template described in the examples shown in FIGS. 24-27 as described herein.

Figure 24:
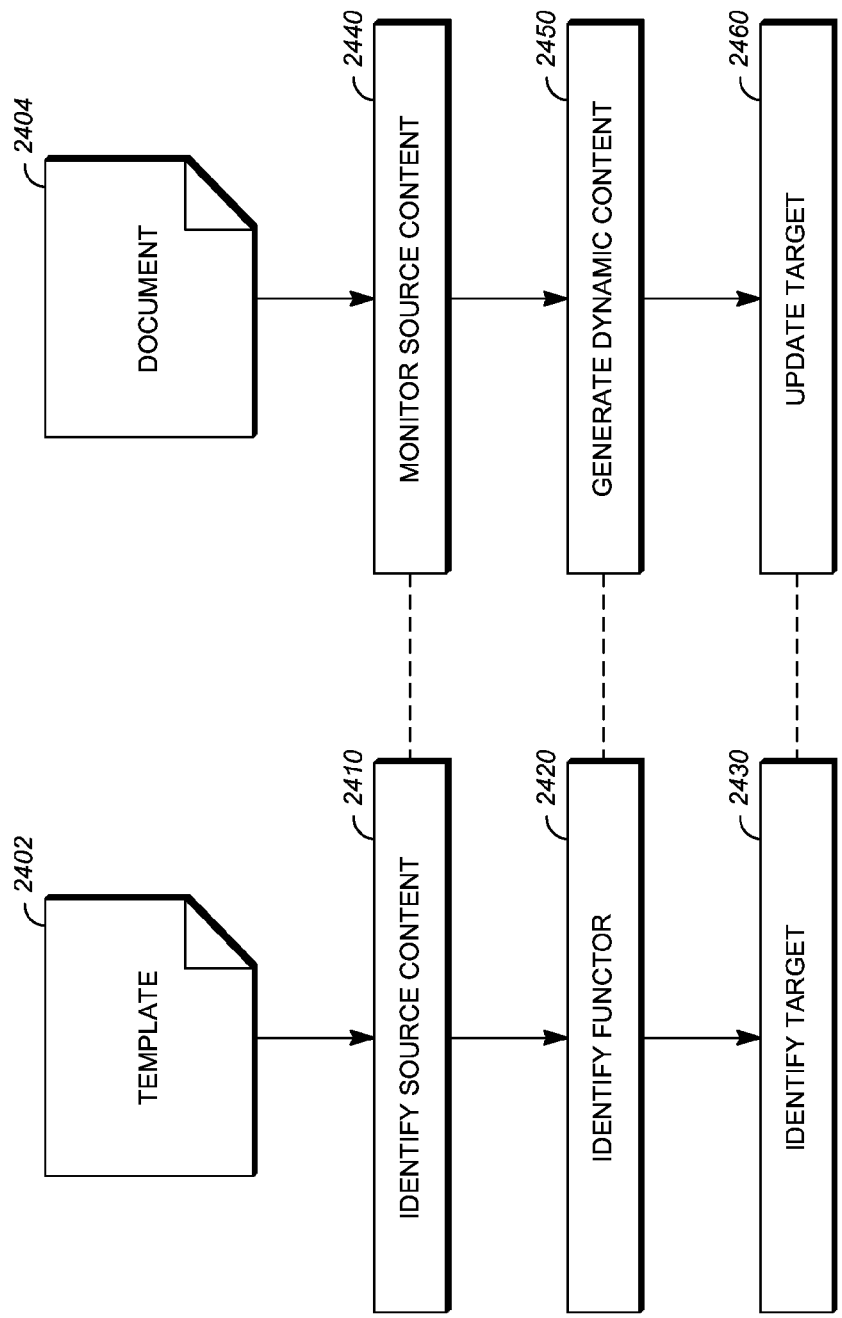
FIG. 24 is a block diagram of an example of template and content aware document and template editing dynamic content generation in accordance with implementations of this disclosure.

FIG. 24 is a block diagram of an example of template and content aware document and template editing dynamic content generation in accordance with implementations of this disclosure. Implementations of template and content aware document and template editing dynamic content generation may include one or more user devices, such as the computing device 100 shown in FIG. 1 or the computing and communication devices 100A/100B shown in FIG. 2, creating, accessing, or editing one or more documents or templates via a productivity application, which may be a networked application, such as the networked application 300 shown in FIG. 3, executed by a server, which may be a computing device, such as the computing device 100 shown in FIG. 1 or the computing and communication devices 100C shown in FIG. 2.

Implementations of template and content aware document and template editing dynamic content generation may include creating, accessing, or modifying a template 2402, a document 2404, or both. For example, template and content aware document and template editing dynamic content generation may include creating, accessing, or modifying a template 2402 and creating, accessing, or modifying a document 2404 generated based on the template.

In some implementations, creating, accessing, or modifying a template 2402 may include creating or modifying data source information at 2410, creating or modifying data relationship information at 2420, creating or modifying target information at 2430, or a combination thereof.

In some implementations, creating or modifying data source information at 2410 may include identifying an object, such as an object from the template 2402 for use as a data source. For example, a template, such as Template 4 in FIG. 17, may include includes a 'List' object that includes a 'Project' object that includes a 'Name' object, and the 'Name' object may be identified as a source object for use as a data source. In some implementations, creating or modifying data source information at 2410 may include identifying a data source path that includes an expression of the object hierarchy of the object identified as the data source. For example, Template 4 in FIG. 17 includes a 'List' object that includes a 'Project' object that includes a 'Name' object and a 'Desc' object, the 'Name' object may be identified as a data source, and "List.Project.Name" may be identified as the data source path.

In some implementations, creating or modifying data relationship information at 2420 may include identifying a functional relationship between the data source identified at 2410 and the target identified at 2430. In some implementations, the data relationship information may be expressed using a functor, a filter, or by any other expression capable of describing a relationship between a data source and a target. In some implementations, a functor may indicate a homomorphism between the structure of the content indicated by the data source and the structure of the target, which may be evaluate to transform the information included in the source content for inclusion in the target and preserve the content and structure of the source document.

In some implementations, instances of an object, such as an object associated with the one-or-more modifier, in a document may be identified as a set, array, or vector of object instances. For example, Template 4 in FIG. 17 includes the rule "List=Project+", which may indicate that a document generated based on Template 4 may include a 'List' object that may include one-or-more 'Project' objects which may be identified as an array or vector of 'Project' object instances. The 'Project' object may be identified as the data source, "List. Project" may be identified as the data source path, and the functor 'length' may indicate a length, a count, or a cardinality of the vector, array, or set of 'Project' object instances. In some implementations, the productivity application may include one or more defined functors, such as the 'length' functor. In some implementations, the one or more functors may be created or modified. For example, a functor may be created or modified using a scripting programming language.

In some implementations, creating or modifying target information at 2430 may include identifying an object from the template 2402 for use as a target object to receive dynamic content based on the data source information and the functor. In some implementations, creating or modifying target information at 2430 may include receiving input data, such as user input data, indicating the functor and the data source information for creating or updating a value of an object, such as a system object that has a 'Dynamic' value type, and updating the template to include the functor and the data source information as the value information for the object.

In some implementations, creating or modifying a document 2404, such as a document generated based on the template 2402, may include monitoring a data source at 2440, generating dynamic content at 2450, creating or modifying a target at 2460, or a combination thereof. For example, the template 2402 may include a source object, a target object, and a dynamic content definition, which may indicate a functor and the data source information for the target object; a document 2404 generated based on the template 2402 may include an instance of the source object and an instance of the target object; and the productivity application may dynamically, or automatically, generate content for the target object based on the functor and the content of the source object identified by the data source information.

In some implementations, monitoring a data source at 2440 may include identifying one or more instances of the source object in the document 2404, identifying content of the source object instances in the document 2404, identifying a change in the content of the source object instances in the document 2404, or a combination thereof. In some implementations, the productivity application may monitor the document 2404, the template 2402, or both. For example, a change in the content of the data source may be identified in response to an increase or decrease in the cardinality of the set of source object instances in the document 2404, a modification of the content of one or more instances of the source object in the document 2404, a modification of the data source information in the template 2402, or a modification of the source object in the template 2402. In some implementations, monitoring the data source at 2440 may include identifying a change in the content of the source object instances in the document 2404 periodically. In some implementations, monitoring the data source at 2440 may include identifying a change in the content of the source object instances in the document 2404 in response to an event, such as an event triggered by a change to the document 2404 or the template 2402.

In some implementations, generating dynamic content at 2450 may include applying the functor to the content of the source object instances identified by the data source information. For example, the productivity application may determine a 'length' of a vector of source object instances and may generate a value, such as an integer value or a string of text, indicating the cardinality of the set of source object instances.

In some implementations, creating or modifying a target at 2460 may include updating the document 2404 to include, modify, or remove an instance of the target object. For example, generating the document 2404 based on the template 2402 may include omitting an instance of the source object and an instance of the target object from the document 2404 and including an instance of the source object that includes placeholder content and an instance of the target object that includes placeholder content in an interface for the document 2404. The productivity application may receive input data, such as user input data, indicating direct content for the instance of the source object in the document 2404. The productivity application may update the document 2404 to incorporate the direct content, may identify the change of the content of an instance of the source object, may apply the functor to the source object to generate dynamic content, and may update the document 2404 to incorporate an instance of the target object that includes the generated content as dynamic content.

Although shown sequentially in FIG. 24, aspects of template and content aware document and template editing dynamic content generation may be performed in a different sequence, and some aspects may be performed concurrently. For example, target information, data source information, and data relationship information may be identified in any order or concurrently.

FIG. 25 shows an example of an implementation of a document template for template and content aware document and template editing dynamic content generation in accordance with implementations of this disclosure.

As shown, Template 5 includes a 'List' object 2500 that includes a repeatable 'Project' object 2510. The 'Project' object 2510 includes a 'Name' object 2520, a 'Desc' object 2530, a 'Size' object 2540, and a 'Members' object 2550. The Name' object 2520 includes a 'text' object 2522 that include the placeholder content "name". The 'Desc' object 2530 includes a repeatable 'text' object 2532 that includes the placeholder content "description". The 'Size' object 2540 includes a 'SizeLabel' object 2542 and a 'Value' object 2544. The 'SizeLabel' object 2542 includes the express content "Team Size:". The 'Value' object 2544 includes a 'text' object 2546 that includes the placeholder content "team size". The 'Members' object 2550 includes a 'MemberLabel' object 2552 and an 'Employee' object 2554. The 'MemberLabel' object 2552 includes the express content "Members:". The 'Employee' object 2554 includes a 'text' object 2556 that includes the placeholder content "UserIdentifier".

In some implementations, a template may include a dynamic content definition. For example, Template 5 the dynamic content definition 2560 "Length List.Projects.Members.Employee". In some implementations, a document generated based on Template 5 may include a list of projects.

Figure 26:
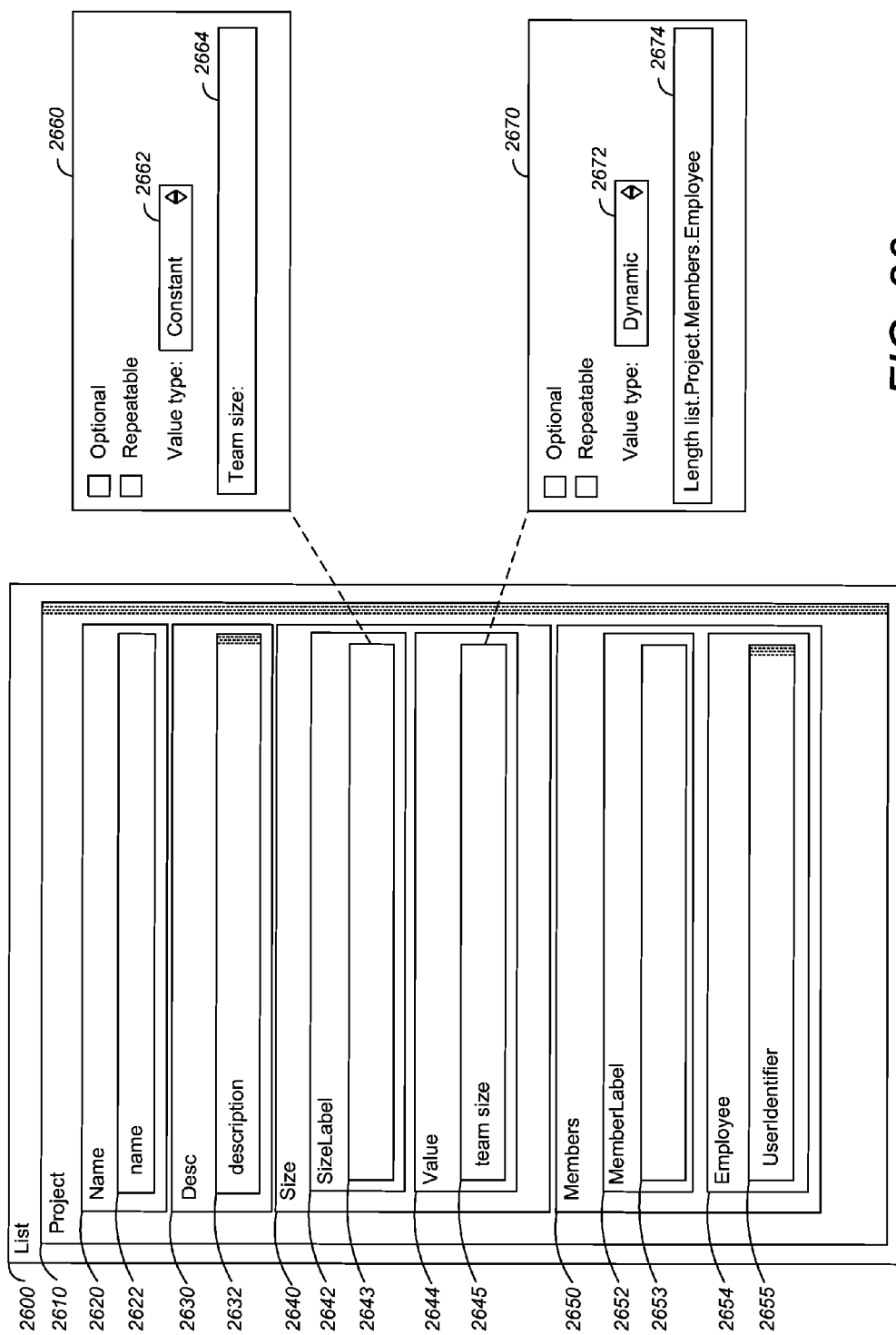
FIG. 26 shows an example of a portion of an interface for template and content aware document and template editing of a template in accordance with implementations of this disclosure.

FIG. 26 shows an example of a portion of an interface for template and content aware document and template editing of a template in accordance with implementations of this disclosure. The example shown in FIG. 26 includes a template structure representing Template 5 shown in FIG. 25. The template structure includes a 'List' block 2600 that includes a repeatable 'Project' block 2610. The 'Project' block 2610 includes a 'Name' block 2620, a 'Desc' block 2630, a 'Size' block 2640, and a 'Members' block 2650. The 'Name' block 2620 includes a 'text' block 2622 that include the placeholder content "name". The 'Desc' block 2630 includes a repeatable 'text' block 2632 that includes the placeholder content "description". The 'Size' block 2640 includes a 'SizeLabel' block 2642 and a 'Value' block 2644. The 'SizeLabel' block 2642 includes a 'text' block 2643. The 'Value' block 2644 includes a 'text' block that includes the placeholder content "team size". The 'Members' block 2650 includes a 'MemberLabel' block 2652 and an 'Employee' block 2654. The 'MemberLabel' block 2652 includes a 'text' block 2653. The 'Employee' block 2654 includes a 'text' block that includes the placeholder content "UserIdentifier".

In some implementations, a block corresponding to a system object, such as the 'text' block 2643 of the 'SizeLabel' block 2642 of the 'Size' block 2640 of the template structure, may be a selected block, the template may indicate that the 'text' object corresponding to the selected block 2643 has a value type of 'Constant' and includes the express content "Team size:", and a block editor 2660 of the interface may include a representation of the value type information 2662 and the express content 2664 for the 'text' object.

In some implementations, a block corresponding to a system object, such as the 'text' block 2645 of the 'Value' block 2644 of the 'Size' block 2640 of the template structure, may be a selected block, the template may indicate that the corresponding 'text' object has a value type of 'Dynamic' and may include the dynamic content definition "Length List.Projects.Members.Employee", and a block editor 2670 of the interface may include a representation of the value type information 2672 and the dynamic content definition 2674 for the 'text' object.

FIG. 27 shows a diagram of an example of a portion of an interface for template and content aware document and template editing of a document generated based on a template in accordance with implementations of this disclosure. For example, the document 2700 shown in FIG. 27 may be a document generated based on Template 5 shown in FIGS. 25 and 26.

In some implementations, a document may include an instance of an object and the interface may omit a representation of the object. For example, the document 2700 may include an instance of the 'List' object 2500 shown in FIG. 25 and may include instances of objects within the 'List' object instance, and the interface may omit a representation of an instance of the 'List' object and may include a representation of instances of objects within the 'List' object instance.

In the example shown, the document 2700 includes three instances 2710/2712/2714 of the 'Project' object 2510 indicated in Template 5. The first instance 2710 of the 'Project' object includes four members corresponding to four instances 2712 of the 'text' object 2556 of the 'Employee' object 2554 indicated in Template 5, and a team size value of 4 corresponding to an instance 2714 of the 'text' object 2546 of the 'Value' object 2544 of the 'Size' object 2540 indicated in Template 5. The second instance 2720 of the 'Project' object includes two members corresponding to two instances 2722 of the 'text' object 2556 of the 'Employee' object 2554 indicated in Template 5, and a team size value of 2 corresponding to an instance 2724 of the 'text' object 2546 of the 'Value' object 2544 of the 'Size' object 2540 indicated in Template 5. The third instance 2730 of the 'Project' object includes three members corresponding to three instances 2732 of the 'text' object 2556 of the 'Employee' object 2554 indicated in Template 5, and a team size value of 3 corresponding to an instance 2734 of the 'text' object 2546 of the 'Value' object 2544 of the 'Size' object 2540 indicated in Template 5.

In some implementations, the team member information 2712/2722/2724 may be direct content, such as content received from user input for the document 2700. In some implementations, the team size values 2714/2724/2734 may be generated dynamic content. For example, the productivity application may identify the four instances 2712 of the 'text' object for the first instance 2710 of the 'Project' object, the two instances 2722 of the 'text' object for the second instance 2720 of the 'Project' object, and the three instances 2732 of the 'text' object for the third instance 2730 of the 'Project' object, and may update the document 2700 to incorporate the dynamic content '4' for team size value 2714 of the first project 2710, the dynamic content '2' for the team size value 2724 of the second project 2720, and the dynamic content '3' for the team size value 2734 of the third project 2730.

Figure 28:
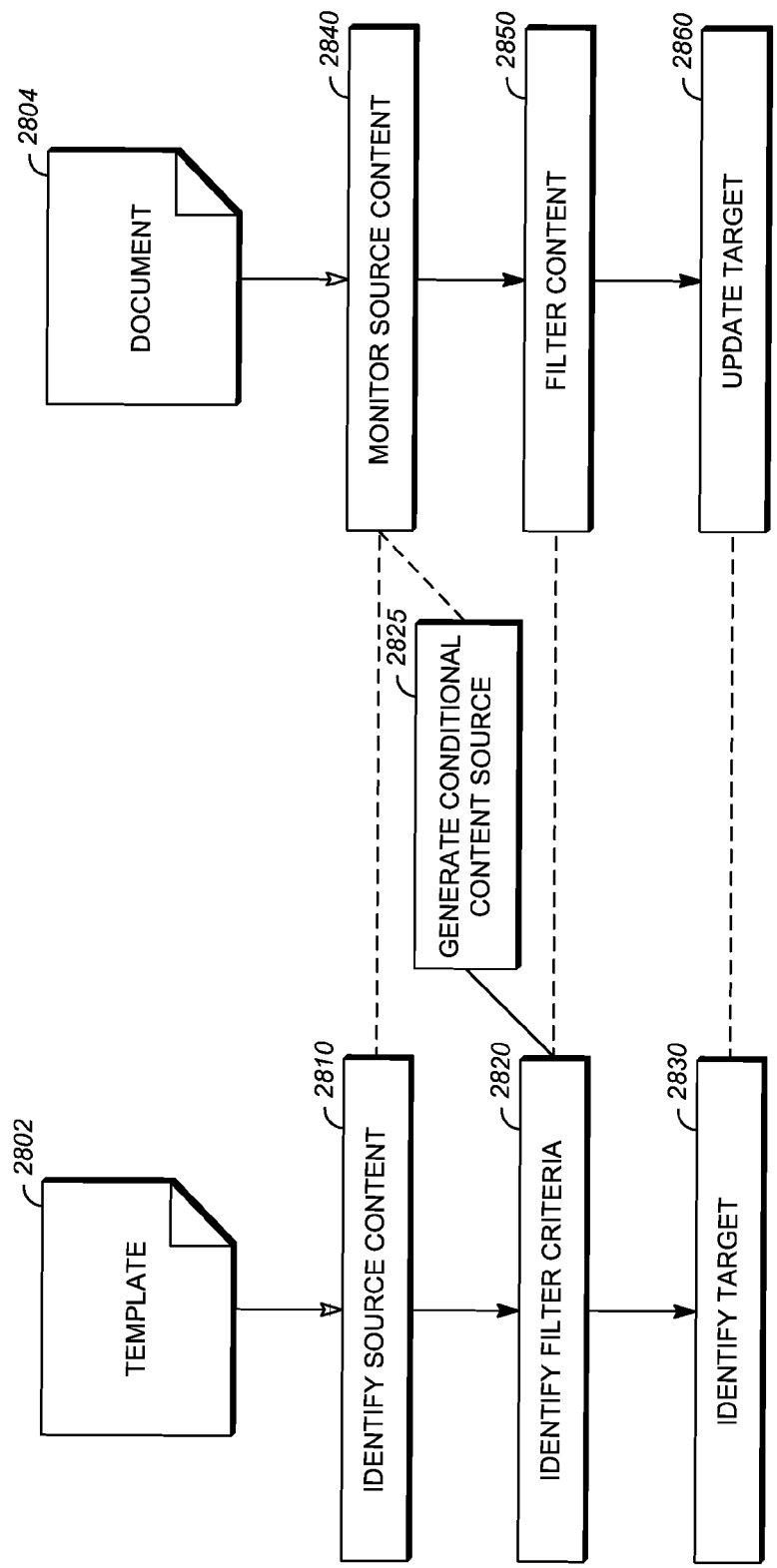
FIG. 28 is a block diagram of an example of template and content aware document and template editing dynamic content filtering in accordance with implementations of this disclosure.

FIG. 28 is a block diagram of an example of template and content aware document and template editing dynamic content filtering in accordance with implementations of this disclosure. Implementations of template and content aware document and template editing dynamic content filtering may include one or more user devices, such as the computing device 100 shown in FIG. 1 or the computing and communication devices 100A/100B shown in FIG. 2, creating, accessing, or editing one or more documents or templates via a productivity application, which may be a networked application, such as the networked application 300 shown in FIG. 3, executed by a server, which may be a computing device, such as the computing device 100 shown in FIG. 1 or the computing and communication devices 100C shown in FIG. 2.

In some implementations, template and content aware document and template editing may include dynamic content filtering. In some implementations, dynamic content filtering may include identifying content, such as content from another document, and identifying a portion of the content to include in a document as dynamic content. In some implementations, identifying a portion of the content to include in a document as dynamic content may include evaluating filter criteria.

Implementations of template and content aware document and template editing dynamic content filtering may include creating, accessing, or modifying a template 2802, a document 2804, or both. For example, template and content aware document and template editing dynamic content filtering may include creating, accessing, or modifying a template 2802 and creating, accessing, or modifying a document 2804 generated based on the template.

In some implementations, creating, accessing, or modifying a template 2802 may include creating or modifying a dynamic content definition, which may include creating or modifying data source information at 2810, creating or modifying filter criteria at 2820, creating or modifying target information at 2830, or a combination thereof.

In some implementations, creating or modifying data source information at 2810 may include identifying an object for use as a data source. In some implementations, identifying an object for use as a data source may include identifying a source document and a source object for use as a data source. For example, identifying an object for use as a data source for a current template, such as the template 2802, may include identifying a source object from a source document, such as the document 2404 shown in FIG. 24, which may be a document generated based on a source template, such as the template 2402 shown in FIG. 24. In some implementations, identifying a source document and a source object for use as a data source may include indicating an identifier, which may be a globally unique identifier, uniquely identifying the source document. In some implementations, creating or modifying data source information at 2810 may include identifying a data source path, or content query, that includes an expression of the object hierarchy of the object identified as the data source.

In some implementations, creating or modifying filter criteria at 2820 may include identifying a functional relationship between the data source identified at 2810 and the target identified at 2830. The data relationship information may be expressed as a functor, a filter, or by any other expression capable of describing a relationship between a data source and a target. In some implementations, the filter criteria may include an expression, which may indicate a condition precedent for including content from the data source in the current document as dynamic content. In some implementations, the expression may indicate symbols, such as objects, and may indicate an operator, or combination of operators, for evaluating the symbols. For example, the expression may indicate a first object (the source criterion), an equality operator, and a second object (the target criterion), and the content of an instance of the first object may equal the content of an instance of the second object, and content from the data source may be included as dynamic content.

For example, the criteria may include the expression "SourceObject if SourceObject.text=red", and the source document may include a first instance of the 'text' object of the 'SourceObject' object that includes the content "red", a second instance of the 'text' object of the 'SourceObject' object that includes the content "blue", and a third instance of the 'text' object of the 'SourceObject' object that includes the content "red". The filter criteria may be evaluated using the content, "red", of the first instance of the 'text' object of the 'SourceObject' object as the source criterion and the value "red" as the target criterion, and the first instance of the 'SourceObject' object may be included as dynamic content. The filter criteria may be evaluated using the content, "blue", of the second instance of the 'text' object of the 'SourceObject' object as the source criterion and the value "red" as the target criterion, and the second instance of the 'SourceObject' object may omitted from the dynamic content. The filter criteria may be evaluated using the content, "red", of the third instance of the 'text' object of the 'SourceObject' object as the source criterion and the value "red" as the target criterion, and the third instance of the 'SourceObject' object may be included as dynamic content.

In some implementations, creating or modifying filter criteria at 2820 may include generating conditional content source information at 2825. In some implementations, generating conditional content source information at 2825 may include identifying an object, such as an object of the template 2802, as a conditional content source. For example, the filter criteria may indicate a conditional content source, which may be an object, such as an object of the template 2802, and the productivity application may include content from the data source filtered using content of an instance of the object identified as the conditional content source. For example, the current template 2802 may include a 'Color' object that may be identified as the conditional content source, the filter criteria may include the expression "SourceObject if SourceObject.text=this.Color", the source document may include a first instance of the 'text' object of the 'SourceObject' object that includes the value "red", a second instance of the 'text' object of the 'SourceObject' object that includes the value "blue", and a third instance of the 'text' object of the 'SourceObject' object that includes the value "red", the data source may be evaluated using the content of the 'text' object instances as the source criterion and the content of the 'Color' object instance as the target criterion, and the first instance of the 'SourceObject' object and the third instance of the 'SourceObject' object may be included as dynamic content and the second instance of the 'SourceObject' object may be omitted from the dynamic content. In some implementations, the current document may be identified using the identifier 'this'.

In some implementations, the conditional content source information may indicate a non-content data source. For example, a user may generate a document based on a template using the productivity application, and the conditional content source information may indicate, as a non-content data source, an identifier that identifies the user.

In some implementations, creating or modifying target information at 2830 may include identifying an object from the template 2802 for use as a target object, or destination, for data identified based on the data source information and the filter criteria. In some implementations, creating or modifying target information at 2830 may include receiving input data, such as user input data, indicating the data source information, the filter criteria, or both, for creating or updating a value of an object, such as a system object that has a 'Dynamic' value type. In some implementations, creating or modifying target information at 2830 may include updating the template to include the data source information, the filter criteria, or both, as the value of the object.

In some implementations, creating or modifying a document 2804, such as a document generated based on the template 2802, may include monitoring a data source at 2840, filtering content at 2850, creating or modifying a target at 2860, or a combination thereof.

In some implementations, monitoring a data source at 2840 may include identifying one or more instances of the source object in the source document, identifying content of the source object instances, identifying a change in the content of the source object instances, or a combination thereof. In some implementations, the productivity application may monitor the current document 2804, the source document, the template 2802, or a combination thereof. For example, a change in the content of the source object instances in the source document may be identified in response to a change of a source object in the source document, a change in a conditional content source of the current document 2804, a modification of the data source information in the template 2802, a modification of the source object in the template 2802, or a modification of a source template. In some implementations, monitoring the data source at 2840 may include identifying a change periodically. In some implementations, monitoring the data source at 2840 may include identifying a change in response to an event, such as an event triggered by a change to the current document 2804, the source document, or the current template 2802, or a source template.

In some implementations, filtering content at 2850 may include identifying the content of one or more source object instances from the source document as source content, identifying the content of the conditional content source, and filtering the source content based on the content of the conditional content source.

In some implementations, creating or modifying a target at 2860 may include updating the document 2804 to include, modify, or remove an instance of the target object. For example, generating the document 2804 based on the template 2802 may include omitting an instance of an object identified as the conditional content source and an instance of the target object from the document 2804 and including an instance of the object identified as the conditional content source that includes placeholder content and an instance of the target object that includes placeholder content in an interface for the document 2804. The productivity application may receive input data, such as user input data, indicating direct content for the instance of the object identified as the conditional content source in the document 2804. The productivity application may update the document 2804 to incorporate the direct content, may identify the change of the content of the instance of the object identified as the conditional content source, may identifying the content of one or more instances of the source object from the source document, may filter the source content based on the content of the instance of the object identified as the conditional content source, and may update the document 2804 to incorporate an instance of the target object that includes the filtered source content as dynamic content.

Although shown sequentially in FIG. 28, aspects of template and content aware document and template editing dynamic content filtering may be performed in a different sequence, and some aspects may be performed concurrently. For example, target information, data source information, and filter criteria may be identified in any order or concurrently.

FIG. 29 shows an example of an implementation of a document template for template and content aware document and template editing dynamic content filtering in accordance with implementations of this disclosure.

As shown, Template 6 includes a 'Resume' object 2910 that includes a 'UserIdentifier' object 2912, a 'Projects' object 2914, and a 'Section' object 2916. The 'UserIdentifier' object includes a 'text' object 2920 that includes the placeholder content "Your User Identifier". The 'Projects' object 2914 includes a 'Header' object 2922 and an optional, repeatable 'Project' object 2930, which includes a dynamic content definition 2940. In some implementations, a document generated based on Template 6 may be a resume.

Figure 30:
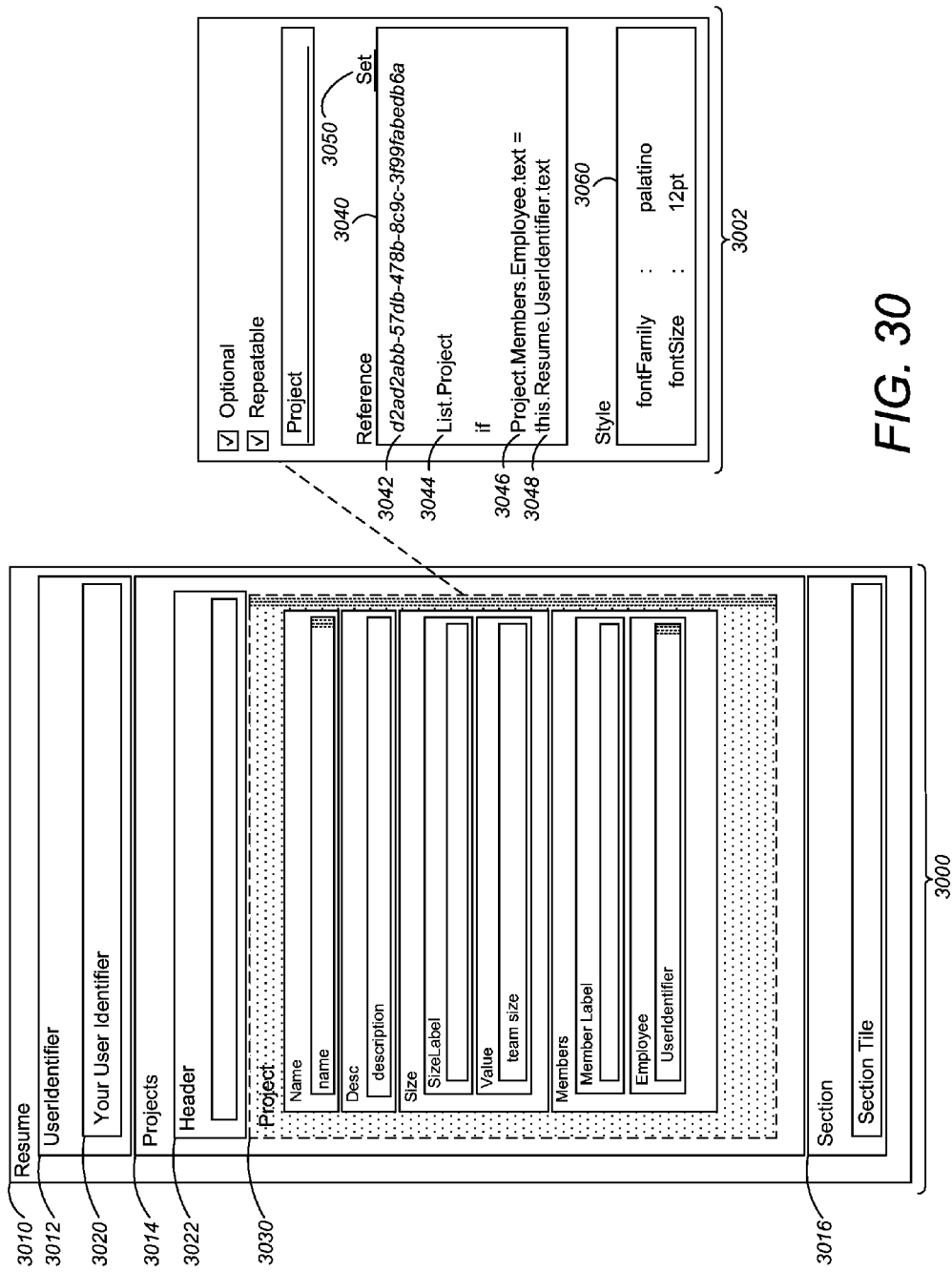
FIG. 30 shows an example of a portion of an interface for template and content aware document and template editing of a template in accordance with implementations of this disclosure.

FIG. 30 shows an example of a portion of an interface for template and content aware document and template editing of a template in accordance with implementations of this disclosure. The example shown in FIG. 30 includes a representation of a portion of an interface for editing Template 6 shown in FIG. 29. In some implementations, an interface for template and content aware document and template editing of a template may include a template structure 3000, a block editor 3002, or both.

In some implementations, a template structure, such as template structure 3000 may represent objects defined in a corresponding template. For example, the template structure 3000 may represent the 'Resume' object 2910 as a 'Resume' block 3010 that includes a 'UserIdentifier' block 3012 representing the 'UserIdentifier' object 2912, a 'Projects' block 3014 representing the 'Projects' object 2914, and a 'Section' block 3016 representing the 'Section' object 2916. The 'UserIdentifier' block 3012 of the template structure 3000 may include a 'text' block 3020 representing the 'text' object 2920, which includes the placeholder content "Your User Identifier". The 'Projects' block 3012 of the template structure 3000 may include a 'Header' block 3022 representing the 'Header' object 2922 and a 'Project' block 3030 representing the 'Project' object 2930, which may be indicated as optional and repeatable. In FIG. 30, the 'Project' block 3030 is indicated as a selected block using stippling.

In some implementations, an object definition may include a dynamic content definition that includes a reference to a source content object. For example, the object definition for the 'Project' object 2930 in Template 6 includes a dynamic content definition 2940, which includes a reference to the 'Project' object 2510 of Template 5 shown in FIG. 25. Although not shown in FIG. 29, in some implementations, the object definition from the source template for the source object indicated in the dynamic content definition in the current template, which may include objects, and object definitions included in the source object in the source template, may be included in the current template. For example, the object definition for the 'Project' object 2930 may include the dynamic content definition 2940 and may include the object definition from the source template (Template 5) of the 'Project' object 2510 identified as the source object in the dynamic content definition 2940, which may include the rules from the source template (Template 5) for objects included in the source object 2510, such as the 'Name' object 2520, the 'Desc' object 2530, the 'Size' object 2540, and the 'Members' object 2550.

In some implementations, a template structure may include a representation a template structure, or a portion of a template structure, that represents a source content object referenced in a dynamic content definition. For example, the template structure 3000 shown in FIG. 30 includes the 'Project' block 3030, which includes a representation of a portion of the template structure shown in FIG. 26, which represents the 'Project' object 2510 of Template 5 referenced in the dynamic content definition.

In some implementations, the portion of the template structure shown in FIG. 26 included in the template structure 3000 shown in FIG. 30 may be included based on data source information, filter criteria, conditional content source information, target information, or a combination thereof. For example, the dynamic content definition 2940 shown in FIG. 29 may include data source information, filter criteria, conditional content source information, or a combination thereof. In some implementations, the interface may indicate that one or more blocks, such as the blocks included in the 'Project' block 3030 are included in the template structure based on a dynamic content definition. For example, the blocks included in the 'Project' block 3030, may be represented using a smaller font, as shown in FIG. 30.

In some implementations, a block of the template structure 3000 may be a selected block in the interface and the block editor 3002 may include a representation of template information for the selected block. For example, in FIG. 30, the 'Project' block 3030 is the selected block and the block editor 3002 includes a representation of template information for the 'Project' block 3030.

In some implementations, an object definition, such as the object definition 2940 for the 'Project' object 2930, may include dynamic content information, such as the data source information identified at 2810 in FIG. 28, the filter criteria identified at 2820 in FIG. 28, the conditional content source information identified at 2825 in FIG. 28, or a combination thereof, and the block editor 3002 may include a representation of the dynamic content information 3040.

In some implementations, the dynamic content information 3040 may include a document identifier 3042, which may identify a source document, such as the document 2404 shown in FIG. 24, which may correspond with the document 2700 shown in FIG. 27, which may be a document generated based on a source template, such as the template 2402 shown in FIG. 24, which may correspond with Template 5 shown in FIG. 25.

In some implementations, the dynamic content information 3040 may include data source information 3044, which may identify a source object, such as the 'Project' object 2510 of the 'List' object 2500 of Template 5 shown in FIG. 25. In some implementations, the dynamic content information 3040 may include filter criteria, which may indicate criteria for filtering the dynamic content. In some implementations, the dynamic content information 3040 may include source criterion information 3046, which may identify a source criterion, which may be used for filtering the dynamic content.

In some implementations, the dynamic content information 3040 may include conditional content source information 3048, which may identify target criterion information, such as the content of an instance of an object, for filtering the dynamic content. Although the source criterion information 3046 and the target criterion information 3048 are shown using document queries expressed as dot delimited paths, any expression capable of identifying the information may be used. In some implementations, the object identifier 'this' may indicate the current document. For example, the path 'this.Resume' may indicate a 'Resume' object of the current document.

In the example shown in FIG. 30, the document identifier 3042 may indicate the document 2700 shown in FIG. 27 (the source document), which may be based on the template shown in FIG. 26 (the source template). The data source information 3044 may indicate the 'Project' object 2610 of the 'List' object 2600 of the template represented in FIG. 26 as the source object. The source criterion 3046 may indicate the 'text' object 2655 of the 'Employee' object 2654 of the 'Members' object 2650 of the 'Project' object 2610 of the 'List' object 2600 of the template represented in FIG. 26 as the filter antecedent. The target criterion information 3048 may indicate the 'text' object 3020 of the 'UserIdentifier' object 3012 of the 'Resume' object 3010 of the current document.

In some implementations, the productivity application may include the template structure of the source object in the template structure of the current template 3000. For example, as shown, the document identifier 3042 may indicate the document 2700 shown in FIG. 27 (the source document), which may be based on the template shown in FIG. 26 (the source template), the data source information 3044 indicates the 'Project' object 2610 of the 'List' object 2600 of the source template as the source criterion, and the template structure 3000 for the current template includes a representation of the objects included in the 'Project' object 2610 of the 'List' object 2600 of the source template.

In some implementations, the template structure of the source object (dynamic structure) may be included in the current template in response to input, such as user input. For example, the productivity application may receive input data indicating the dynamic template information, the productivity application may identify a source document and a source object based on the dynamic content information, the productivity application may identify a source template based on the source document, and the productivity application may include the structure from the source object in the current template. In some implementations, the productivity application may incorporate the template structure of the source object in response to input indicating a request to incorporate dynamic structure, such as a selection of the 'Set' link 3050.

In some implementations, the block editor 3002 may include a representation of presentation information 3060 for the selected block. For example, although not shown in FIG. 30, the 'Name' object of the 'Project' object may be the selected block and the block editor 3002 may include presentation information for the 'Name' object. In some implementations, the presentation information may be dynamic presentation information, which may include presentation information included for the dynamic content in the current document based on presentation information indicated for the source content in the source template. For example, the source template may include presentation information for the source object corresponding to the selected block and the presentation information from the source object may be included in the current template.

In some implementations, the presentation information may be presentation information included in the template directly, such as presentation information received as input data from a template presentation editor interface. For example, the productivity application may receive input data indicating a change for the presentation information of a block of dynamic content via a template editor interface for editing the current template, and may update the template to incorporate the revised information.

In some implementations, the productivity application may prevent modification of the structure of the template structure included based on the dynamic content definition. For example, the productivity application may prevent the addition, deletion, or modification of dynamic structure incorporated in the current template. In some implementations, the productivity application may prevent modification of the presentation information of the dynamic template information. In some implementations, the template structure from the source template included as dynamic content in the current template based on the dynamic content definition may be modified or deleted in current template.

Figure 31:
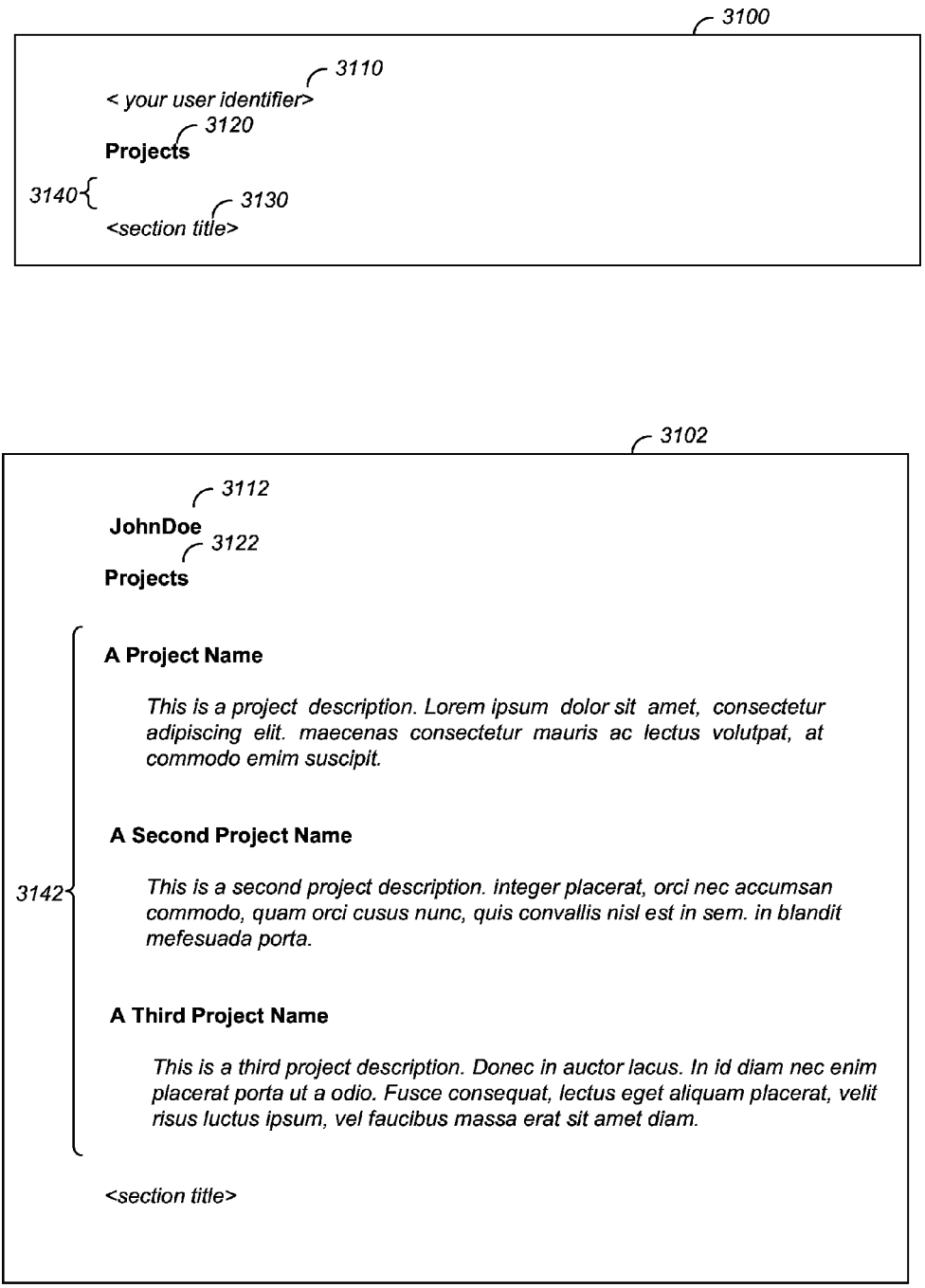
FIG. 31 shows a diagram of examples of a portion of an interface for template and content aware document and template editing of a document generated based on a template in accordance with implementations of this disclosure.

FIG. 31 shows a diagram of examples of a portion of an interface for template and content aware document and template editing of a document generated based on a template in accordance with implementations of this disclosure. For example, the document (current document) shown in FIG. 31 may be a resume document generated based Template 6 shown in FIGS. 29 and 30.

In some implementations, the current document may be generated based on the current template as shown in interface 3100. For example, the generated document may include an instance 3110 of the 'text' object 2920 of the 'UserIdentifier' object 2912 of the 'Resume' object 2910 indicated in Template 5, and the 'text' object instance 3110 may include the placeholder content "<Your User Identifier>" indicated in the Template 5. The generated document may include an instance 3120 of the 'Projects' object 2914 indicated in the Template 5, and the 'Projects' object instance 3120 may include the express content "Projects" indicated in Template 5. The generated document may include an instance 3130 of the 'Section' object 2916 of the 'Resume' object 2910 indicated in Template 5, and the 'Section' object instance 3130 may include the placeholder content "<section title>" indicated in Template 5.

In some implementations, generating the document may include monitoring the data source, such as the data source monitoring shown at 2840 in FIG. 28, filtering the source content, such as the content filtering shown at 2850 in FIG. 28, or a combination thereof. In some implementations, monitoring the data source may include identifying an instance of an object indicated by conditional content source information indicated in the dynamic content definition 3140 and identifying content of the conditional content source object instance 3110 for use as criteria for filtering the dynamic content.

In some implementations, the current document may omit dynamic content 3140, which may include placeholder content or express content. For example, the 'Projects' object instance 3120 may correspond to the 'Projects' object 2914 indicated in Template 6, which may include the 'Project' object 2930, which may be associated with dynamic content from the document 2700 shown in FIG. 27, which may include instances 2710/2720/2730 of the 'Project' object 2510 of the 'List' object 2500 of Template 5, and the current document may omit the 'Project' object 3140.

In some implementations, the current document may omit the dynamic content 3140 based on the dynamic content definition 2940 indicated in Template 6 (the current template). For example, as shown in interface 3100, the instance 3110 of the object identified in the conditional content source information includes placeholder content, and the content of the instances of the source objects of the source document may be omitted dynamic content 3140 in the current document. The space for the omitted dynamic content 3140 is shown for clarity in the FIG. 31 and may be omitted from an interface.

In some implementations, the current document may be created, accessed, or modified, as shown in interface 3102. In some implementations, creating, accessing, or modifying the current document may include monitoring the data source, such as the data source monitoring shown at 2840 in FIG. 28, which may include monitoring one or more instances of the object indicated as the conditional content source in the dynamic content definition indicated in the current template. In some implementations, monitoring the instance of the object indicated as the conditional content source may include identifying a change in the content of an instance of the conditional content source object and evaluating the criteria indicated in the dynamic object definition based on the changed content.

In some implementations, evaluating the criteria may include determining whether the criteria is satisfied based on the changed content of the instance of the conditional content source object and content from the source document. In some implementations, the productivity application may determine that the criteria indicated in the dynamic content definition is satisfied based on the changed content of the instance of the conditional content source object and may update the current document, the interface, or both, to incorporate content from the source document indicated by the dynamic content definition as dynamic content.

For example, the productivity application may receive input data indicating content, which may be direct content, such as the text 'JohnDoe', for the user identifier and may update the current document, the interface, or both, to incorporate the input data in the instance 3112 of the 'text' object 2920 of the 'UserIdentifier' object 2912. The productivity application may evaluate the criteria "Project.Members.Employee.text=this.Resume.UserIdentifier.text" indicated in the dynamic contend definition 2940 for the 'Project' object 2930 of the current template. The productivity application may determine that 'this.Resume.UserIdentifier.text' indicates the instance 3112 of the 'text' object 2920 of the 'UserIdentifier' object 2912 which includes the content 'JohnDoe'. The productivity application may determine that the document identifier 3042 of the dynamic content definition 2940/3040 shown in FIGS. 29 and 30 indicates the document 2700 (the solurce document) shown in FIG. 27, that 'Project.Members.Employee.text' indicates the instances 2712/2722/2732 in the source document of the 'text' object 2556 of the 'Employee' object 2554 of the 'Members' object 2550 of the 'Project' object 2510 of the 'List' object 2500 of Template 5 (the source template), and may identify the content of 'text' object instances 2712 as 'JohnDoe', JaneDoe, JimDoe, and JuneDoe, the content of the 'text' object instances 2722 as 'JohnDoe' and JuneDoe, and the content of the 'text' object instances 2732 as 'JohnDoe', JessicaDoe, and JaneDoe. The productivity application may determine that at least one of the identified 'text' object instances 2712 for the first 'Project' object instance 2710, at least one of the identified 'text' object instances 2722 for the second 'Project' object instance 2720, and at least one of the identified 'text' object instances 2732 for the third 'Project' object instance 2730 includes content that satisfies the criteria ("JohnDoe"="JohnDoe"), and may update the current document, the interface, or both, to include the content of the first the first 'Project' object instance, the second 'Project' object instance, and the third 'Project' object instance as dynamic content 3142.

In some implementations, including dynamic content in the current document may include using data model information, presentation information, or both indicated for the source content in the source template. For example, the presentation information for project names and descriptions in the dynamic content 3142 may be indicated in the source template, Template 5.

In some implementations, including dynamic content in the current document may include using presentation information indicated for the source content in the current template. For example, the presentation information in Template 5 indicates that the 'Size' objects 2540 and the 'Members' objects 2550 are visible as shown in the document 2700 in FIG. 27. Although not shown in Template 6 in FIG. 29, Template 6 may include presentation information for the dynamic content. For example, Template 6 may include presentation information indicating that the 'Size' objects 2540 and the 'Members' objects 2550 are hidden, and the instances of the 'Size' objects 2540 and the 'Members' objects 2550 in the dynamic content may be hidden as shown in the document interface 3102 in FIG. 27.

In another example, not shown in FIG. 31, the productivity application may receive the input data 'JaneDoe' for the user identifier 3112, may update the current document, the interface, or both, to include the content of the first the first 'Project' object instance and the third 'Project' object instance as dynamic content 3142, and may filter the source content to omit the content of the second 'Project' object instance from the current document.

In some implementations, the productivity application may receive the input data deleting the content of the user identifier 3112, and may update the current document, the interface, or both, to omit the instance of the 'Project' object from the current document as shown in interface 3100.

Although the dynamic content definition 2940/3040 shown in FIGS. 29 and 30 includes source criterion 3046 and target criterion information 3048, in some implementations, a dynamic content definition may omit the filter criteria, the conditional content source information, or both. For example, a dynamic content definition may include a document identifier and data source information and may omit filter criteria and conditional content source information. In some implementations, generating, accessing, or modifying the current document may include incorporating content from the source document indicated by the data source information and may omit filtering the content. For example, the data source information indicated for the 'Project' object in the current template may indicate the data source "List.Project" and may omit filter criteria and conditional content source information, and the productivity application may incorporate the content of one or more 'Project' object instances from the source document as dynamic content in the current document.

In some implementations, the productivity application may perform dynamic content filtering in response to a change in the current template. For example, the current document may include the dynamic content 3142 from the source document 2700 as shown in interface 3102, the productivity application may identify a change in the data source information in Template 6 from 'List.Project' to 'List.Project.Name' and may update the current document to include the content of the instances of the 'Name' object from the source document 2700 and omit the other content of the source document 2700. In another example, the productivity application may identify a change in the source document identifier in Template 6 indicating a change from a first source document generated based on Template 5 to a second source document generated based on Template 5, and the productivity application may update the current document to include the content of the second source document and omit the content of the first source document.

In some implementations, the productivity application may perform dynamic content filtering in response to a change in the source content. For example, the instance of the object identified as the conditional content source in the current document may include the content 'JohnDoe', as shown in interface 3102, and the productivity application may include a first instance of the 'Project' object 2710 from the source document 2700 shown in FIG. 27, a second instance of the 'Project' object 2720 from the source document 2700 shown in FIG. 27, and a third instance of the 'Project' object 2730 from the source document 2700 shown in FIG. 27 in the current document, as shown in interface 3102, based on the dynamic content definition. The source document 2700 may be modified to remove the content 'JohnDoe' from the first instance 2710 of the 'Project' object in the source document 2700. The productivity application may identify the change in the source document 2700, may evaluate the dynamic content definition, and may update the current document to omit the instance 2710 of the first 'Project' object from the current document.

In some implementations, the productivity application may perform dynamic content filtering in response to a change in the source template. For example, the source template, Template 5, may be updated to include a 'Date' object that includes the express content "Date:", and the productivity application may update the current document to include instances of the 'Date' object that include the express content "Date:".

In some implementations, dynamic content generation as shown in FIGS. 24-27 and dynamic content filtering as shown in FIGS. 28-31 may be combined. In some implementations, a dynamic content definition may include a source document identifier, data source information, filter criteria, and conditional content source information, and the data source information, the filter criteria, the conditional content source information, or a combination thereof, may include a functor. For example, the data source information for the dynamic content definition shown in Template 6 may be "Length List.Project" and the document shown in FIG. 31 may include the dynamic content "3". In another example, the filter criteria and conditional content source information for the dynamic content definition shown in Template 6 may be "Length (Project.Members.Employee.text=this.Resume.UserIdentifier.text)<=2" and the document shown in FIG. 31 may include the dynamic content 3142 shown in interface 3102.

In some implementations, template and content aware document and template editing may include generating and sending notifications. For example, monitoring source content, such as the source content monitoring shown at 2840 in FIG. 28, may include generating and outputting one or more notifications in response to detecting a change in the source content. In some implementations, updating target information, such as the target information updating shown at 2860 in FIG. 28, may be performed in response to receiving information, such as user input data, indicating a request to update.

Figure 32:
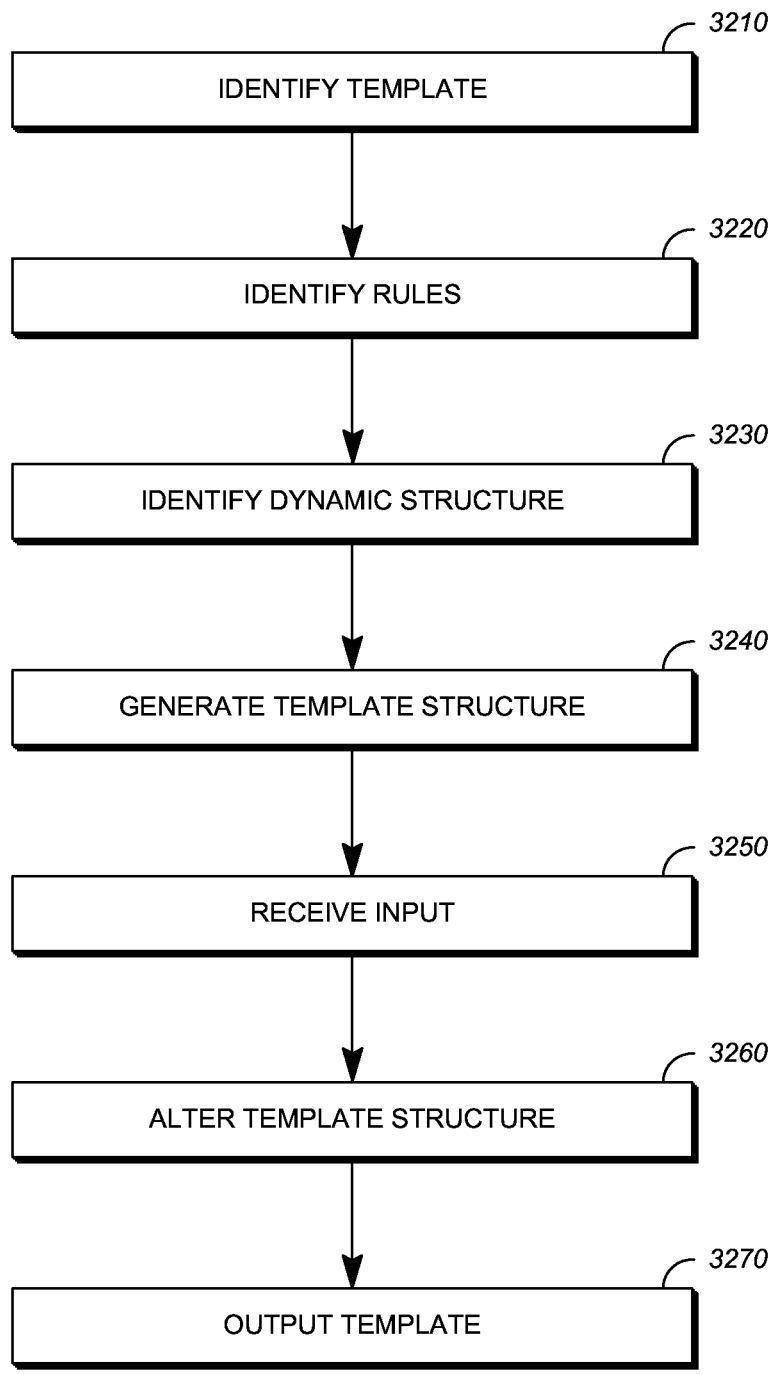
FIG. 32 is a block diagram of template and content aware document and template editing of a template in accordance with implementations of this disclosure.

FIG. 32 is a block diagram of template and content aware document and template editing of a template in accordance with implementations of this disclosure. Implementations of template and content aware document and template editing of a template may include one or more user devices, such as the computing device 100 shown in FIG. 1 or the computing and communication devices 100A/100B shown in FIG. 2, creating, accessing, or editing one or more documents via a productivity application, which may be a networked application, such as the networked application 300 shown in FIG. 3, executed by a server, which may be a computing device, such as the computing device 100 shown in FIG. 1 or the computing and communication devices 100C shown in FIG. 2. Implementations of template and content aware document and template editing of a template can include identifying a template at 3210, identifying rules at 3220; identifying dynamic structure at 3230, generating template structure at 3240, receiving input data at 3250, altering the template structure at 3260, outputting the template at 3270, or a combination thereof.

In some implementations, a document template may be identified at 3210. For example, a user may initiate a productivity application, such as a networked productivity application, and a template may be identified in response to user input indicating the template, such as the selection of a template from a list of templates.

In some implementations, template rules may be identified at 3220. For example, a template identified at 3210 may be associated with a template specification that may include a sequence of template rules.

In some implementations, dynamic structure may be identified at 3230. For example, the template specification identified at 3220 may include a rule including dynamic content information, such as the dynamic content information 3040 shown in FIG. 30, and dynamic structure may be identified based on the dynamic content information. In some implementations, the dynamic structure may include a template structure, or a portion of a template structure, of a source template. In some implementations, the dynamic content information may indicate a source document generated based on a source template, and identifying the dynamic structure may include a template structure, or a portion of a template structure, for the source template.

In some implementations, a dynamic content definition may include an identifier, such as a GUID, identifying a source template other than the current template. For example, the source template may be a 'Project' template, multiple 'Project' documents, each including information related to a project, may be generated based on the 'Project' template, a template ID identifying the 'Project' template may be included in a dynamic content definition in a 'Projects' template, and a document generated based on the 'Projects' template may include content from each of the 'Project' documents as dynamic content based on the dynamic content definition.

In some implementations, a template structure may be generated at 3240. For example, the template structure may include the objects indicated in the template specification, which may include the dynamic structure identified at 3230.

In some implementations, input data may be received at 3250. For example, the productivity application may generate and present an interface, such as a user interface, for interacting with the template generated at 3230, which may include using the template structure generated at 3240, and may receive input data via the interface. In some implementations, the productivity application may receive input data indicating, for example, a mouse click on a text field, a change of focus, a keystroke, such as the enter key or the tab key, a combination of keystrokes, such as shift-tab, alt-up, or alt-down, or any other input related to the template.

In some implementations, the template structure may be altered at 3260. For example, the template structure may be altered in response to the input received at 3250. In some implementations, alterations to the template structure may be based on a current state of the productivity application interface, the input data received at 3250, the template specification, or a combination thereof. For example, objects may be added, modified, or removed from the template structure.

In some implementations, the template may be output at 3270. For example, the template may be stored on a memory, such as memory 150 shown in FIG. 1, or transmitted via a communication network, such as the network 220 shown in FIG. 2. In some implementations, outputting the template may include presenting an interface, such as a user interface, for viewing and interacting with the template, such as the interfaces shown in FIGS. 17-23, 25, and 30.

Other implementations of the diagrams of template and content aware document and template editing as shown in FIGS. 4-30 are available. In implementations, additional elements of template and content aware document and template editing can be added, certain elements can be combined, and/or certain elements can be removed. For example, in some implementations, generating a document tree as shown at 840 in FIG. 8 can be skipped and/or omitted.

Template and content aware document and template editing, or any portion thereof, can be implemented in a device, such as the computing device 100 shown in FIG. 1. For example, a processor, such as the processor 140 shown in FIG. 1, can implement template and content aware document and template editing, or any portion thereof, using instruction, such as the instructions 160 shown in FIG. 1, stored on a tangible, non-transitory, computer readable media, such as the memory 150 shown in FIG. 1.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the computing and communication devices as described herein (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the computing and communication devices do not necessarily have to be implemented in the same manner.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A non-transitory computer-readable storage medium, comprising executable instructions that, when executed by a processor, facilitate performance of operations comprising:
    identifying a current document template, the current document template including a plurality of rules describing objects and object definitions, the object definitions describing relationships between objects, object structures, and object presentation, and the object definitions comprising content definitions for dynamic content, direct content, indirect content, and placeholder content;
    generating a current document, the current document being a document of objects, based on the current document template, wherein generating the current document includes:
        identifying, as an identified content definition, a content definition from a rule from the plurality of rules;
        including direct content, indirect content, and placeholder content in the current document based on the identified content definition;
        including dynamic content in the current document based on the identified content definition being a dynamic content definition by:
            identifying a source document indicated in the dynamic content definition, wherein the source document and the current document differ,
            identifying a data source indicated in the dynamic content definition, the data source indicating content included in the source document,
            identifying a source criterion indicated in the dynamic content definition, the source criterion indicating content included in the data source,
            identifying a target criterion indicated in the dynamic content definition, the target criterion include content included in the current document,
            including a portion of the content included in the data source as dynamic content in the current document based on an evaluation of the source criterion and the target criterion;
    storing or transmitting at least a portion of the current document as a sequence of tokens that correspond to object instances of the plurality of rules;
    monitoring the data source, wherein monitoring the data source includes detecting a change in the content included in the data source; and
    updating the dynamic content in the current document in response to the change.

2. The non-transitory computer-readable storage medium of claim 1, wherein including dynamic content in the current document includes identifying an instance of an object indicated as the data source.

3. The non-transitory computer-readable storage medium of claim 2, wherein including dynamic content in the current document includes:
    identifying an instance of a target object in the current document;
    identifying a relationship between the target object and the data source;
    determining the dynamic content based on the instance of the object indicated as the data source and the relationship; and
    including the dynamic content in the instanced of the target object.

4. The non-transitory computer-readable storage medium of claim 3, wherein identifying the relationship between the target object and the data source includes identifying a functor in the dynamic content definition.

5. The non-transitory computer-readable storage medium of claim 3, wherein determining the dynamic content based on the instance of the object indicated as the data source and the relationship includes identifying, as the dynamic content, a cardinality of a set of instances of the object indicated as the data source.

6. The non-transitory computer-readable storage medium of claim 2, wherein including dynamic content in the current document includes identifying a source document indicated in the dynamic content definition, wherein the source document includes the instance of the object indicated as the data source.

7. The non-transitory computer-readable storage medium of claim 6, wherein the source document is the current document.

8. The non-transitory computer-readable storage medium of claim 6, wherein the source document and the current document differ.

9. The non-transitory computer-readable storage medium of claim 1, wherein including dynamic content in the current document includes:
    evaluating the content included in the source document based on the source criterion; and
    including the content included in the source document in the current document as the dynamic content based on a result of evaluating the content.

10. The non-transitory computer-readable storage medium of claim 9, wherein including the content included in the source document in the current document as the dynamic content based on a result of evaluating the content includes omitting a portion of the content included in the source document from the dynamic content based on the result of evaluating the content.

11. The non-transitory computer-readable storage medium of claim 9, wherein evaluating the content based on the source criterion includes:
    identifying a source criterion indicated in the dynamic content definition;
    identifying a target criterion indicated in the dynamic content definition; and
    evaluating the source criterion based on the target criterion.

12. A system for generating a document from a template, comprising:
    a memory; and
    a processor, the memory includes instructions executable by the processor to:

identify a current document template, the current document template including a plurality of rules describing objects and object definitions, the object definitions comprising content definitions;
generate a current document, the current document being a document of objects, based on the current document template by instructions to:
  identity a dynamic content definition for a content definition of a rule from the plurality of rules,
  identify a data source indicated in the dynamic content definition,
  identify a source criterion indicated in the dynamic content definition, the source criterion indicating content included in the data source
  identify a functor indicated in the dynamic content definition,
  identify a target criterion indicated in the dynamic content definition, the target criterion include content included in the current document,
  include a portion of the content included in the data source as dynamic content in the current document based on an evaluation of the source criterion, the target criterion, and the functor;
store or transmit at least a portion of the current document as a sequence of tokens that correspond to object instances of the plurality of rules;
monitor the data source by instructions to detect a change in the content included in the data source; and
update the dynamic content in the current document in response to the change.

13. The system of claim 12, wherein the instructions executable by the processor to include a portion of the content include instructions to identify an instance of an object indicated as the data source.

14. The system of claim 12, wherein the instructions executable by the processor to include a portion of the content includes instruction to identify a cardinality of a set of instances of an object indicated as the data source.

15. A method for generating a document from a template, comprising:
identifying a current document template, the current document template including a plurality of rules describing objects and object definitions, the object definitions describing relationships between objects, object structures, and object presentation, and the object definitions comprising content definitions for dynamic content and placeholder content;
generating a current document, the current document being a document of objects, based on the current document template, wherein generating the current document includes:
  identifying a rule from the plurality of rules, the rule indicating an object and an object definition for the object, the object definition including a content definition;
  including dynamic content in the current document for a dynamic content definition by:
    identifying a source document indicated in the dynamic content definition, wherein the source document and the current document differ,
    identifying a data source indicated in the dynamic content definition, the data source indicating content included in the source document,
    identifying a source criterion indicated in the dynamic content definition, the source criterion indicating content included in the data source,
    identifying a target criterion indicated in the dynamic content definition, the target criterion include content included in the current document,
    including a portion of the content included in the data source as dynamic content in the current document based on an evaluation of the source criterion and the target criterion;
  including placeholder content in the current document for a placeholder content definition; and
storing or transmitting at least a portion of the current document as a sequence of tokens that correspond to object instances of the plurality of rules;
monitoring the data source, wherein monitoring the data source includes detecting a change in the content included in the data source; and
updating the dynamic content in the current document in response to the change.

16. The method of claim 15, further comprising:
omitting a portion of the content included in the data source from the dynamic content based on the evaluation.

* * * * *